US012664907B2

(12) United States Patent (10) Patent No.: US 12,664,907 B2
Krasley (45) **Date of Patent: \*Jun. 23, 2026**

(54) METHODS AND SYSTEMS FOR ADAPTIVE APPAREL DESIGN AND APPAREL INFORMATION ARCHITECTURE

(71) Applicant: SHIMMY TECHNOLOGIES, INC., Brooklyn, NY (US)

(72) Inventor: Sarah Krasley, Brooklyn, NY (US)

(73) Assignee: SHIMMY TECHNOLOGIES, INC., Brooklyn, NY (US)

( * ) Notice: Subject to any disclaimer, the term of this patent is extended or adjusted under 35 U.S.C. 154(b) by 354 days.

This patent is subject to a terminal disclaimer.

(21) Appl. No.: 18/180,244

(22) Filed: Mar. 8, 2023

(65) Prior Publication Data

US 2023/0298477 A1 Sep. 21, 2023

Related U.S. Application Data

(63) Continuation of application No. PCT/US2020/049682, filed on Sep. 8, 2020.

(51) Int. Cl.
| | |
|---|---|
| *G09B 5/06* | (2006.01) |
| *G06F 30/12* | (2020.01) |
| *G06Q 10/101* | (2023.01) |
| *G06Q 50/20* | (2012.01) |
| *G06T 19/00* | (2011.01) |
| *G09B 19/20* | (2006.01) |
| *G06F 113/12* | (2020.01) |

(52) U.S. Cl.
CPC .............. *G09B 5/06* (2013.01); *G06F 30/12* (2020.01); *G06Q 10/101* (2013.01); *G06Q 50/2057* (2013.01); *G06T 19/00* (2013.01);

*G09B 19/20* (2013.01); *G06F 2113/12* (2020.01); *G06T 2219/004* (2013.01)

(58) Field of Classification Search
CPC .......... G09B 5/06; G09B 19/00; A41H 42/00; A41H 3/04; A41H 1/02; A41H 1/00; A41H 3/00; A41H 1/10; A41H 43/02; A41H 3/02; A41H 3/06; A41H 3/08; A41H 43/005; A41H 3/007
See application file for complete search history.

(56) References Cited

U.S. PATENT DOCUMENTS

| | | | |
|---|---|---|---|
| 2004/0049309 A1 | 3/2004 | Gardner et al. | |
| 2007/0105080 A1 | 5/2007 | Hersh | |
| 2008/0124687 A1 | 5/2008 | Post | |
| 2014/0114620 A1 | 4/2014 | Grinspun et al. | |
| 2018/0005163 A1 | 1/2018 | Ramo et al. | |
| 2019/0279527 A1* | 9/2019 | Rohlfs ...................... | G06T 7/20 |
| 2021/0217214 A1* | 7/2021 | Lee ........................ | G06T 15/005 |

OTHER PUBLICATIONS

Int'l Search Report and Written Opinion issued Jan. 26, 2021 in Int'l Application No. PCT/US2020/049682.

* cited by examiner

*Primary Examiner* — Robert J Utama
(74) *Attorney, Agent, or Firm* — Duane Morris LLP; Thomas J. Kowalski

(57) ABSTRACT

Systems and methods for training a user to label, plan, and code digital files for three-dimensional garment design are provided. Systems and methods regarding a training and recruitment paradigm delivered over mobile to upskill users with manufacturing skills and then staff a newly reshored manufacturing industry over time are also provided.

52 Claims, 48 Drawing Sheets

706

702

704

702      708      710

712

METHODS AND SYSTEMS FOR ADAPTIVE APPAREL DESIGN AND APPAREL INFORMATION ARCHITECTURE

RELATED APPLICATIONS AND INCORPORATION BY REFERENCE

This application is a continuation of International Application No. PCT/US2020/049682 filed Sep. 8, 2020 and published as International Publication No. WO 2022/055473 on Mar. 17, 2022.

Reference is made to international patent application Serial No. PCT/US20/21740 filed 9 Mar. 2020, which claims priority to U.S. provisional patent application Ser. No. 62/815,280 filed 7 Mar. 2019.

The foregoing applications, and all documents cited therein or during their prosecution ("appln cited documents") and all documents cited or referenced in the appln cited documents, and all documents cited or referenced herein ("herein cited documents"), and all documents cited or referenced in herein cited documents, together with any manufacturer's instructions, descriptions, product specifications, and product sheets for any products mentioned herein or in any document incorporated by reference herein, are hereby incorporated herein by reference, and may be employed in the practice of the invention. More specifically, all referenced documents are incorporated by reference to the same extent as if each individual document was specifically and individually indicated to be incorporated by reference.

FIELD OF THE INVENTION

This invention pertains to attracting, training, and contracting cutting, sewing, digital design and machine operators for employment in the manufacturing industry via a mobile phone, tablet and web browser-based software applications.

BACKGROUND OF THE INVENTION

Most unemployed individuals have probably never considered working in a garment factory. Garment factories have a stigma attached to them: dingy, hot, thankless, and an impediment to receiving public benefits. In reality, garment factories of today are clean, well lit, and often in up-and-coming urban areas. Today's garment factories house a mixture of traditional machines, digital technologies, and new automated equipment run by entrepreneurial owners who share millennial and Generation Z values of continuous improvement, sustainability, and collaborative decision-making throughout all levels of the company.

People often learn about new career opportunities from their family members', neighbors', and friends' experiences and often do not explore career paths outside what is familiar. Beyond this, tackling a new career path takes courage and the ability to imagine oneself in a new work environment, potentially with a new schedule, and performing new unfamiliar tasks. The current pandemic crisis has upended the career trajectories many held prior to February 2020 and workers need ways to explore what a new job would be like and build confidence as they learn the fundamental operations that would underpin the tasks in their new profession.

Citation or identification of any document in this application is not an admission that such document is available as prior art to the present invention.

SUMMARY OF THE INVENTION

The present invention relates to a digital learning and recruitment paradigm delivered over mobile phones to upskill workers with manufacturing skills while they are sheltering in place in the short term and then staff a newly reshored manufacturing industry over time. This invention pilots in sewn goods manufacturing with an aim to train workers for other manufacturing subsegments later.

The mobile application is downloaded onto iOS and Android devices via app stores. Users log into the application using dual authentication with their mobile numbers and email addresses.

Once downloaded, the application takes users through a series of questionnaires and game-based trainings that test interest, aptitude, and willingness to pursue training (see, e.g., FIGS. 12-18).

As users complete active learning games such as sewing machine trainings, the application capture users' decisions and collects a dataset for training future sewing equipment and robotics mental models.

Alongside the software services presented to job seekers, factory hiring managers also have the ability to advertise open positions, learn about candidates' skill levels, predict shift attendance, and help workers predict take-home pay.

Embodiments provided herein include systems and methods for training a user to label and code digital files for three-dimensional garment design. Embodiments provided herein also include system and methods for collaborative refining of digital and/or physical garment prototypes.

An embodiment includes a system for training a user to label and code digital files for three-dimensional garment design. The system includes: a database storing at least one digital file including a pattern having multiple pattern pieces; a user interface implemented through a computing device, the user interface configured to provide visual and auditory instructions in a local language of the user for each module in a plurality of learning modules; and computer executable instructions that when executed by one or more processors implement the plurality of learning modules including a setup for cutting module. The setup for cutting module: displays a visual representation of each of the multiple pattern pieces for identification of types of pattern pieces and numbers of pieces to cut; displays identifiers of different types of pattern pieces, each identifier including a name of the type of pattern piece in the local language; displays identifiers for numbers of pattern pieces to cut, each identifier including a name of the number of pattern pieces in the local language; for each pattern piece, receives a selection of the visual representation of the pattern piece, receives a selection of a corresponding identifier for the type of pattern piece, and provides a visual indication of whether the selection of the corresponding identifier for the type of pattern piece is correct; and for each pattern piece, receives a selection of a number of pattern pieces to cut and provides a visual indication of whether the selection of the number of pattern pieces to cut is correct.

In some embodiments, the system also includes computer executable instructions that when executed by the one or more processors implement a creation of markers for layout module that: provides a visual representation of each of the multiple pattern pieces for layout for cutting with each visual representation including a grain line for the pattern piece; provides a visual representation of material on which to lay out the pattern pieces; displays controls for different types of transformation operations; receives a selection of at least one of the multiple pattern pieces, a selection of a control for a transformation operation on the selected at least one pattern piece, and displays a visual representation of the transformation performed on the at least one pattern piece; and for each of the multiple pattern pieces, receives a selection of the pattern piece and a movement of the selected pattern piece onto the visual representation of the material and rendering the movement and positioning of the selected pattern piece on a display of the user interface.

In some embodiments, the system also includes computer executable instructions that when executed by the one or more processors implement a digital assembly module that: displays a visual representation of a front side of a three-dimensional model, and a visual representation of a back side of a three-dimensional model for fitting the pattern to the model; displays a visual representation of each of the multiple pattern pieces for fitting on the three dimensional model; receives a selection of at least one of the multiple pattern pieces, a selection of a control for a transformation operation on the selected at least one pattern piece, and display a visual representation of the transformation performed on the at least one pattern piece; and for each of the multiple pattern pieces, receives a selection of the pattern piece and a movement of the selected pattern piece onto one of the visual representations of the three-dimensional model and rendering the movement and positioning of the selected pattern piece on the display of the user interface.

In some embodiments, the system also includes computer executable instructions that when executed by the one or more processors implement a pattern piece identification module that: displays examples of different types of pattern pieces each labeled with the type of pattern piece in the local language; for each example pattern piece, prompts the user to speak the name of the type of example pattern piece in the local language, and records the spoken name of the type of example pattern piece; and provides data representative of the spoken name of the example pattern along and an identification of the type of example pattern piece to a natural language processing system to improve natural language processing of garment-related language in the user's local language with the user's dialect.

In some embodiments, the pattern piece identification module further: displays a visual representation of each of the multiple pattern pieces for identification of the pattern pieces; displays identifiers of different types of pattern pieces, each identifier including a name of the type of pattern piece in the local language; and for each pattern piece, receives a selection of the visual representation of the pattern piece, receives a selection of a corresponding identifier for the type of pattern piece, and provides a visual indication of whether the selection of the corresponding identifier for the type of pattern piece is correct.

In some embodiments, the display of controls for different types of transformation operations includes display of schematic depictions of the transformation operations. In some embodiments, the display of identifiers of different types of pattern pieces and the display of the one or more identifiers for numbers of pattern pieces to cut is in response to receiving the selection of the visual representation of the pattern piece. In some embodiments, the display of controls for different types of transformation operations is in response to the selection of at least one of the multiple pattern pieces. In some embodiments, the transformation operations include rotate, reflect, and copy.

In some embodiments, the system further includes computer executable instructions that when executed by the one or more processors cause the user interface to: display a login interface to the user; and receive information regarding a username and a password from the user.

In some embodiments, the system further includes computer executable instructions that when executed by the one or more processors cause the system to access information regarding a mobile address of the computing device and store the accessed information regarding the mobile address and information associating the mobile address with a user.

In some embodiments, the system further includes computer executable instructions that when executed by the one or more processors cause the system to store information regarding the users' completion of each module associated with information identifying the user.

In some embodiments, the system further includes computer executable instructions that when executed by the one or more processors cause the system to record information regarding correct and incorrect selections by the user, regarding correct and incorrect positioning of pattern pieces on the visual representation of the material, regarding correct and incorrect movements of pattern pieces onto the visual representation of the material, and/or regarding correct and in movements of pattern pieces onto the visual representations of the three-dimensional model.

In some embodiments, the system further includes computer executable instructions that when executed by the one or more processors cause the system to transmit information to the user via the computing device after completion of one or more modules. In some embodiments, the information transmitted is based, at least in part, on one or more scores of the user's performance during one or more of the learning modules.

In some embodiments, the system further includes computer executable instructions that when executed by the one or more processors cause the user interface to display graphical indicators of successful completion of one or more modules within a training session and during one or more prior training sessions.

In some embodiments, the user interface is implemented and the plurality of learning modules is implemented as a web-based application on the computing device that is hosted by a remote server.

In some embodiments, the computing device includes a touch screen and at least some of the user selections are received via a touch screen interface of the computing device.

An embodiment includes method for training a user to label and code digital files for three-dimensional garment design. The method includes: providing visual and auditory instructions in a local language of the user on a computing device; displaying a visual representation of each of the multiple pattern pieces for identification of types of pattern pieces and numbers of pieces to cut; displaying identifiers of different types of pattern pieces, each identifier including a name of the type of pattern piece in the local language; displaying identifiers for numbers of pattern pieces to cut, each identifier including a name of the number of pattern pieces in the local language; for each pattern piece, receiving a selection of the visual representation of the pattern piece, receiving a selection of a corresponding identifier for the type of pattern piece, and providing a visual indication of whether the selection of the corresponding identifier for the type of pattern piece is correct; and for each pattern piece, receiving a selection of a number of pattern pieces to cut and providing a visual indication of whether the selection of the number of pattern pieces to cut is correct.

In some embodiments, the method also includes: providing a visual representation of each of the multiple pattern pieces for layout for cutting with each visual representation including a grain line for the pattern piece; providing a visual representation of material on which to lay out the pattern pieces; displaying controls for different types of transformation operations; receiving a selection of at least one of the multiple pattern pieces, a selection of a control for a transformation operation on the selected at least one pattern piece, and displaying a visual representation of the transformation performed on the at least one pattern piece; and for each of the multiple pattern pieces, receiving a selection of the pattern piece and a movement of the selected pattern piece onto the visual representation of the material and rendering the movement on a display of the computing device.

In some embodiments, the method also includes: displaying a visual representation of a front of a three-dimensional model and a visual representation of a back of a three-dimensional model for fitting the pattern to the model; displaying a visual representation of each of the multiple pattern pieces for fitting on the three-dimensional model; receiving a selection of at least one of the multiple pattern pieces, a selection of a control for a transformation operation on the selected at least one pattern piece, and displaying a visual representation of the transformation performed on the at least one pattern piece; and for each of the multiple pattern pieces, receiving a selection of the pattern piece and a movement of the selected pattern piece onto the visual representation of the material and rendering the movement on the display.

In some embodiments, the method also includes: displaying examples of different types of pattern pieces each labeled with the type of pattern piece in the local language; for each example pattern piece, prompting the user to speak the name of the type of example pattern piece in the local language, and recording the spoken name of the type of example pattern piece; and providing data representative of the spoken name of the example pattern along and an identification of the type of example pattern piece to a natural language processing system to improve natural language processing of garment-related language in the user's local language with the user's dialect.

In some embodiments, the method also includes: displaying a visual representation of each of the multiple pattern pieces for identification of the pattern pieces; displaying identifiers of different types of pattern pieces, each identifier including a name of the type of pattern piece in the local language; and for each pattern piece, receiving a selection of the visual representation of the pattern piece, receive a selection of a corresponding identifier for the type of pattern piece, and providing a visual indication of whether the selection of the corresponding identifier for the type of pattern piece is correct.

In some embodiments, displaying controls for different types of transformation operations includes displaying schematic depictions of the transformation operations. In some embodiments, the displaying of identifiers of different types of pattern pieces and the displaying of the one or more identifiers for numbers of pattern pieces to cut is in response to receiving the selection of the visual representation of the pattern piece. In some embodiments, the displaying of controls for different types of transformation operations is in response to the selection of at least one of the multiple pattern pieces. In some embodiments, the transformation operations include rotate, reflect, and copy.

In some embodiments, the method also includes: displaying a login interface to the user; and receiving information regarding a username and a password from the user.

In some embodiments, the method also includes: accessing information regarding a mobile address of the computing device and storing the accessed information regarding the mobile address and information associating the mobile address with a user.

In some embodiments, the method also includes storing information regarding the users' completion of each module associated with information identifying the user.

In some embodiments, the method also includes recording information regarding correct and incorrect selections by the user, regarding correct and incorrect positioning of pattern pieces on the visual representation of the material, regarding correct and incorrect movements of pattern pieces onto the visual representation of the material, and/or regarding correct and in movements of pattern pieces onto the visual representations of the three-dimensional model.

In some embodiments, the method also includes transmitting information to the user via the computing device after completion of one or more modules. In some embodiments, the information transmitted is based, at least in part, on one or more scores of the user's performance during one or more of the learning modules.

In some embodiments, the method also includes providing graphical indicators of successful completion of one or more modules within a training session and during one or more prior training sessions.

In some embodiments, the method is implemented as a web-based application on the computing device that is hosted by a remote server.

In some embodiments, at least some of the user selections are received via a touch screen interface of the computing device.

An embodiment includes a system for collaborative refining of digital and/or physical garment prototypes. The system includes: a database of a plurality of apparel computer aided design (CAD)-based models; and an application accessed via a computing device and communicatively coupled to the database. The application is configured to: receive information identifying a first selected apparel CAD-based model of the plurality of apparel CAD-based models; display a graphical representation of the first selected apparel CAD-based model; modify a view of the graphical representation of the first selected apparel CAD-based model based on user input received via a user interface of the computing device; display annotation tools for annotation of the first selected apparel CAD-based model and receive input for annotation from a user via the annotation tools or via speech processed via a natural language processing tool; and display an indication of the annotation on the display of the graphical representation of the identified apparel CAD-based model.

In some embodiments, the application is further configured to: store the annotation input associated with the first selected CAD-based modal in the database and store a time that the input for annotation was received or a time that the annotation input was stored; receive from a user, an identification of a file to be uploaded, associated with the first selected apparel CAD-based model; and store the identified file associated with the first selected apparel CAD-based model in the database.

In some embodiments, the application is further configured to provide a notification to one or more additional users regarding a change in or an addition to the stored information associated with the first selected apparel CAD-based model in the database.

In some embodiments the system also includes the application executing on a second computing device. The application executing on the second computing device is config-ured to: receive information identifying the first selected apparel CAD-based model; and display a graphical repre-sentation of the first selected apparel CAD-based model including an indication of the annotation.

In some embodiments, where the second computing device has a default language preference different than a language of the annotation input, the application executing on the second computing device is further configured to display the annotation input in the default language of the second computing device.

In some embodiments, the application executing on the second computing device is further configured to: receive a second annotation input from a user of the second comput-ing device; and store the second annotation input associated with the first selected CAD-based modal in the database.

In some embodiments, the information identifying a first selected apparel CAD-based model of the plurality of apparel CAD-based models obtained from image data acquired from an imaging device of the computing device.

In some embodiments, the application is further config-ured to: display information regarding the identified first selected apparel CAD-based model; and request confirma-tion of the selection of the identified first selected apparel CAD-based model.

In some embodiments, the application is further config-ured to guide a user through a fit session for the identified first selected apparel CAD-based model.

In some embodiments, guiding the user through the fit session for the identified first selected apparel CAD-based model includes: displaying a request for one or more photos of a garment corresponding to the first selected apparel CAD-based model on a fit model and enabling the user to select one or more photos for upload or displaying one or more previously uploaded photos of the garment on a fit model.

In some embodiments, guiding the user through the fit session for the identified first selected apparel CAD-based model includes: for each of a plurality of points of measure: providing a graphical description of the point of measure; receiving an audio input from a user regarding the point of measure; and displaying a numerical value corresponding to the user's audio input for the point of measure and graphical indicators for acceptance or rejection of the numerical value.

In some embodiments, guiding the user through the fit session for the identified first selected apparel CAD-based model includes: for each of the plurality of points of measure: displaying a graphical indication of whether the accepted numerical value corresponding to the user's audio input for the point of measure is within tolerance for the model.

In some embodiments, guiding the user through the fit session for the identified first selected apparel CAD-based model includes: displaying a prompt for the user to provide audio comments regarding the fit; and receiving audio input from the user regarding the fit and displaying comment text corresponding to the audio input, the audio input converted to text via natural language processing relying on a garment-specific corpus of language.

In some embodiments, guiding the user through the fit session for the identified first selected apparel CAD-based model includes: displaying comments of other users regard-ing the apparel CAD-based model or the fit.

In some embodiments, the application is implemented as a web-based application on the computing device that is hosted by a remote server.

Some embodiments include methods implemented by the systems described herein.

Accordingly, it is an object of the invention not to encompass within the invention any previously known prod-uct, process of making the product, or method of using the product such that Applicants reserve the right and hereby disclose a disclaimer of any previously known product, process, or method. It is further noted that the invention does not intend to encompass within the scope of the invention any product, process, or making of the product or method of using the product, which does not meet the written descrip-tion and enablement requirements of the USPTO (35 U.S.C. § 112, first paragraph) or the EPO (Article 83 of the EPC), such that Applicants reserve the right and hereby disclose a disclaimer of any previously described product, process of making the product, or method of using the product. It may be advantageous in the practice of the invention to be in compliance with Art. 53(c) EPC and Rule 28(b) and (c) EPC. All rights to explicitly disclaim any embodiments that are the subject of any granted patent(s) of applicant in the lineage of this application or in any other lineage or in any prior filed application of any third party is explicitly reserved. Nothing herein is to be construed as a promise.

It is noted that in this disclosure and particularly in the claims and/or paragraphs, terms such as "comprises", "com-prised", "comprising" and the like can have the meaning attributed to it in U.S. Patent Law; e.g., they can mean "includes", "included", "including", and the like; and that terms such as "consisting essentially of" and "consists essentially of" have the meaning ascribed to them in U.S. Patent Law, e.g., they allow for elements not explicitly recited, but exclude elements that are found in the prior art or that affect a basic or novel characteristic of the invention.

These and other embodiments are disclosed or are obvi-ous from and encompassed by, the following Detailed Description.

BRIEF DESCRIPTION OF THE DRAWINGS

The following detailed description, given by way of example, but not intended to limit the invention solely to the specific embodiments described, may best be understood in conjunction with the accompanying drawings.

FIG. 6A is a screenshot of a module for identification of pattern piece type and an interface for recording speech corresponding to the identified pattern piece type in the gamified training application, in accor-dance with some embodiments. FIG. 6B is a screenshot of a setup for cutting module for identification of pattern piece type and selection of a number of pieces to cut in the gamified training application in accordance with some embodiments. FIG. 6C is screenshot of a creation of markers for layout module for marking the pattern pieces for layout in the gamified training application in accordance with some embodiments. FIG. 6D is screenshot of the creation of markers for layout module illustrating a rotation transformation and movement of a pattern piece, in accordance with some embodiments. FIG. 6E is screenshot of a digital assembly module for assembling material pieces corresponding to the pattern pieces for a first garment on a three dimensional digital model or avatar, in accordance with some embodiments. FIG. 6F is screenshot of a digital assembly module for assembling material pieces corresponding to the pattern pieces on a three dimensional digital model or avatar for a second garment, in accordance with some embodiments. FIG. 6G is screenshot for a lesson regarding correct and incorrect tension in sewing in a gamified training application in accordance with an embodiment. FIG. 6H is screenshot for a lesson regarding button placemen in a gamified training application in accordance with an embodiment.

FIG. 8A illustrates a screen shot of the collaboration application displaying options for entering information for identification of a new sample in accordance with an exemplary embodiment. FIG. 8B illustrates obtaining information for identification of a new sample via an imaging device of a computing device (e.g., a mobile phone) in accordance with an exemplary embodiment. FIG. 8C illustrates a screen shot requesting confirmation of the identification of the new sample in accordance with an exemplary embodiment. FIG. 8D illustrates a screen shot of a display including options for entering additional information regarding the identified new sample in accordance with an exemplary embodiment. FIG. 8E illustrates a screen shot of a user interface for uploading photos of the identified sample in accordance with an exemplary embodiment. FIG. 8F illustrates a screen shot of a user interface for scheduling a fit date for the sample in accordance with an exemplary embodiment. FIG. 8G illustrates a screen shot of a user interface displaying information regarding the identified sample, the scheduled fit date and other relevant design deadlines associated with the sample in accordance with some embodiments. FIG. 8H illustrates a screen shot of a user interface enabling the user to select custom points of measurement (POM), which may be saved in the application for the user, or standard points of measurement, which may be standard for the type of garment, for the fit in accordance with some embodiments. FIG. 8I illustrates a screen shot of a user interface prompting the user to dictate a value for the displayed POM in accordance with some embodiments. FIG. 8J illustrates a screen shot of a user interface displaying a value corresponding to the dictated value for the point of measurement and requesting confirmation that the displayed value corresponds to the dictated value in accordance with some embodiments. FIG. 8K illustrates a screen shot of a user interface displaying a schematic graphical depiction of the point of measurement, the confirmed value of the measurement, and whether the confirmed value is within tolerance, and requesting confirmation that the confirmed value is correct for the point of measurement in accordance with some embodiments. FIG. 8L illustrates a screen shot of a user interface displaying entered values for the points of measurement and displaying a control button to submit the entered values for the points of measurement to be recorded in a database in accordance with some embodiments.

FIG. 9A illustrates a screen shot of a user interface of the application for selection of a garment in accordance with some embodiments. FIG. 9B illustrates a screen shot of a user interface of the application for selection of a type of information to be provided or displayed for the selected garment in accordance with some embodiments. FIG. 9C illustrates a screen shot of a user interface of the application for uploading and characterization of photos of the garment in accordance with some embodiments. FIG. 9D illustrates a screen shot of a user interface of the application for viewing photos of the garment by type of view in accordance with some embodiments. FIG. 9E illustrates a screen shot of a user interface of the application for providing comments and viewing comments of others in accordance with some embodiments. FIG. 9F illustrates a screen shot of an individual comment received via speech in accordance with some embodiments. FIG. 9G illustrates a screen shot of a summary or checklist of comments for review in accordance with some embodiments. FIG. 9H illustrates a screen shot of a list of garments for selection and tracking of garments that have already been reviewed and addressed in accordance with some embodiments.

DETAILED DESCRIPTION OF THE INVENTION

Figure 1:
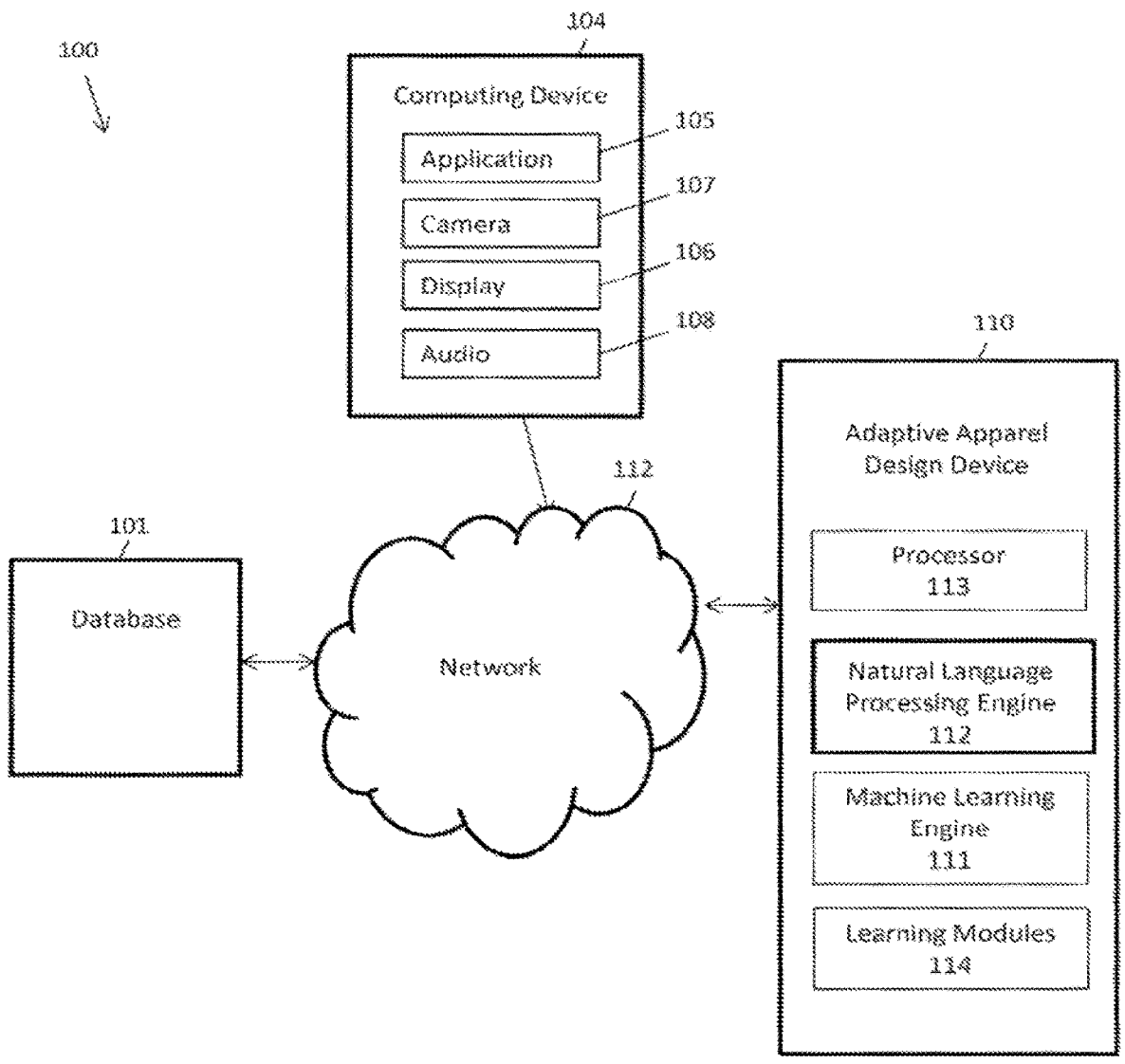
FIG. 1 illustrates an exemplary network for adaptive apparel design and apparel information architecture, in accordance with an exemplary embodiment.

Disclosed herein are methods and systems that can facilitate efficient and effective communication of design intent through into apparel design and manufacturing.

Apparel brand design teams, patternmakers, and production coordinators can benefit from automation in the form of 3-dimensional (3D) design algorithms. Incorporating these algorithms as part of the workflow lessens the costly product development cycles with physical sampling from factories. This assists in assessing the initial fit of a garment, experiment with trim placement, and visualizing what a material or print would look like.

A major barrier to 3D technology adoption in design departments is limited bandwidth for prep work that needs to be performed. Tasks, such as labeling digital pattern files and entering data that describes materials, trims, and stitches, are difficult. This set-up prep work or pre-work is necessary for implementation of many of these new technologies, but the pre-work is often an overwhelming addition to an already full plate.

The skills needed to do this set-up work include knowledge of garment construction, strengths, and limitations of certain sewing machines, different stitches, tension settings, and identification of pattern pieces. Sewing machine operators have this knowledge, but many do not have the technological skills and language skills to provide digital set-up services to apparel brands.

A digital platform designed especially for sewing machine operators, in accordance with some embodiments described herein, can overcome literacy and language barriers and enable workers to reskill in the face of growing automation in garment construction and to, in turn, enable manufacturers in emerging economies to unlock new service businesses when manufacturing jobs leave due to automation.

The described methods and systems enable and facilitate a transition to automated agile apparel manufacturing. The described methods and systems assist workers in gaining digital skills that allow them to transition into higher-skilled work in the factories or to move into other sectors. In some embodiments, the described methods and systems incorporate innovative cloud applications that drive efficiency and clear communication of design intent. In further embodiments, the described methods and systems incorporate a platform utilizing artificial intelligence (AI) to build on knowledge and performance over time. The described methods and systems utilize data that can be used to generate 3D blocks faster, speed up product development cycles, and bring more engineering and feasibility analysis into the design process. Furthermore, some embodiments can be used to train workers to set up datasets and processes that will yield multi-purpose digital models, which may drive brand continuity and feeling as well as speedy production across the chain.

Two pilot tests of the described training application (referenced as "Upskill") were conducted in Dhaka, Bangladesh, to determine whether garment workers in Bangladesh could effectively use Shimmy Upskill and to identify how the software could be tailored to them. These tests were conducted with the support of three local factories. The workers who participated in those pilots are referred to herein as a first group and a second group. The first group included 5 female employees, including 3 sewing operators, 1 overlock machine operator, and 1 quality assurance checker. The second group included 6 female employees including 4 sewing operators and 2 quality assurance checkers. Each pilot followed the same structure. Most of the participants (10 out of 11) did not own smartphones with touchscreen capability. Most of the participants (10 out of 11) had never used a computer. Despite their inexperience with these devices, all testers completed the four training modules within the allotted four-hour timeframe. All of the participants were comfortable with the first two modules, which tested them on pattern identification and cutting. On the other hand, many participants found the last module on digital assembly difficult to complete. The result of the pilot revealed that symbols, visualizations, and touch screens are key to addressing users' limited digital literacy. Upskill achieved its goal of creating a gamified learning tool. In addition to teaching digital skills, the software also helped users learn other languages and the apparel production process.

FIG. 1 illustrates an exemplary network for adaptive apparel design and apparel information architecture 100, in accordance with an exemplary embodiment. The system 100 includes at least one database 101, an application 105, and an adaptive apparel design computing device 110 with a processor 113 executing at least a machine learning engine 111, a natural language processing engine 112, and learning modules 114. The learning modules may include a setup for cutting module, a creation of markers for layout module, a digital assembly module, and a pattern piece identification module. In some embodiments, the adaptive apparel design computing device 110 may further include automation technology applications. The processor 113 may act as a server, for example, a web server or an application server. Although the database 101 is shown as remote from the computing device 110, in alternative embodiments, the at least one database 101 can exist within the computing device 110. Although the machine learning engine 111 is shown as included in the adaptive apparel design device 110, in some embodiments, at least some of or all of the machine learning engine 111 may be implemented in a separate device or system in communication with the adaptive apparel design device. Although the natural language processing engine 112 is shown as included in the adaptive apparel design device 110, in some embodiments, at least some of or all of the natural language processing engine 112 may be implemented in a separate device or system in communication with the adaptive apparel design device 110.

In some embodiments, the application 105 or "app" executes on a computing device 104 for users such as apparel technical designers. The application 105 may be a desktop application, a mobile application, and/or a web-based application. The computing device 104 may be, for example, a smartphone, a tablet, a desktop or laptop computer, or some other type of electronic device equipped with a display 106, a camera 107, and audio equipment 108. It will be appreciated that the engines 111 and 112 may be provided as a series of executable software and/or firmware instructions.

In some embodiments, the application 105 employs voice-to-text functionality, for example, to facilitate recording sample measurements and fit notes. For example, as described below, a user of the application 105 may use voice commands, e.g., speaking a name of garment pieces in both English and a local language. The data from the application 105 is transmitted to the adaptive apparel design computing device 110. In some embodiments, the application 105 is built in Angular and hosted on IBM's Bluemix and/or Microsoft Azure.

The adaptive apparel design computing device 110 turns unstructured patterns into coded digital elements that can be easily recalled, configured, and run through machine learning engine 111.

As the user inputs data into the application 105, the application 105 transmits the data to the adaptive apparel design computing device 110 that may analyze and/or save the data, as described herein. For example, the adaptive apparel design computing device 110 may save voice recordings and responses in the database 101. In some embodiments, the database 101 may be a Firebase database. The adaptive apparel design computing device 110 may further collect correlative data from the application 105 with the aim to enable future versions of the software to help fashion brands and manufacturers speed up design and production and improve product quality.

In some embodiments, the adaptive apparel design computing device 110 is configured to enable a user to efficiently label, code, and generate digital files ready for 3D design (e.g., digital stitching, etc.). In some embodiments, the application 105 and the adaptive apparel design computing device 110 are designed to accommodate users that are not English speakers, who have limited English-language skills, or that have varying literacy levels, by displaying vocabulary in English and a local language as well as using symbols when possible. For example, the application 105 uses translation to help with learning English and conducting learning activities, such as translating custom sewing instructions for workers with other languages than that used in the in-country factory.

In an exemplary embodiment, the application 105 is configured to train garment production workers on digital pattern making, rudimentary 3D modeling, and alternative transferable skills, as further described below. The adaptive apparel design computing device 110 may utilize natural language processing (via natural language processing engine 112) in order to expand into multiple countries/territories where garment manufacturers are located (e.g., Bangladesh, Cambodia, Vietnam, Indonesia, Sri Lanka, etc.).

The adaptive apparel design computing device 110 communicates, via a communications network 112, with the application 105. The communications network 112 can be any network over which information can be transmitted between devices communicatively coupled to the network. For example, the communication network 112 can be the Internet, an Intranet, virtual private network (VPN), wide area network (WAN), local area network (LAN), and the like.

In some embodiments, the adaptive apparel design computing device 110 and/or the application 105 incorporate automation technology applications. In some embodiments, these applications are cloud-based. In some embodiments, the applications are cloud-based with some local data collection in case of unstable or unreliable internet connection. In some embodiments, the applications at least partially cloud based. Non-limiting examples of such automation technology applications are mobile and web-based based applications for scanning, photography, voice transcription, and Bluetooth-enabled measurement to automate the process of processing, fitting, and analyzing physical garments in professional and commercial situations, speech-to-text capturing, and photo and depth sensing data capturing.

The adaptive apparel design computing device 110 and/or the application 105 may further incorporate shape recognition software to link patterns and shapes detected in physical garments. For example, if the garment has wearable technology affixed to, sewn, or woven in, the shape recognition software reads data from garment sensor, RFID, and other data collection tools to inform new design iterations.

Figure 2:
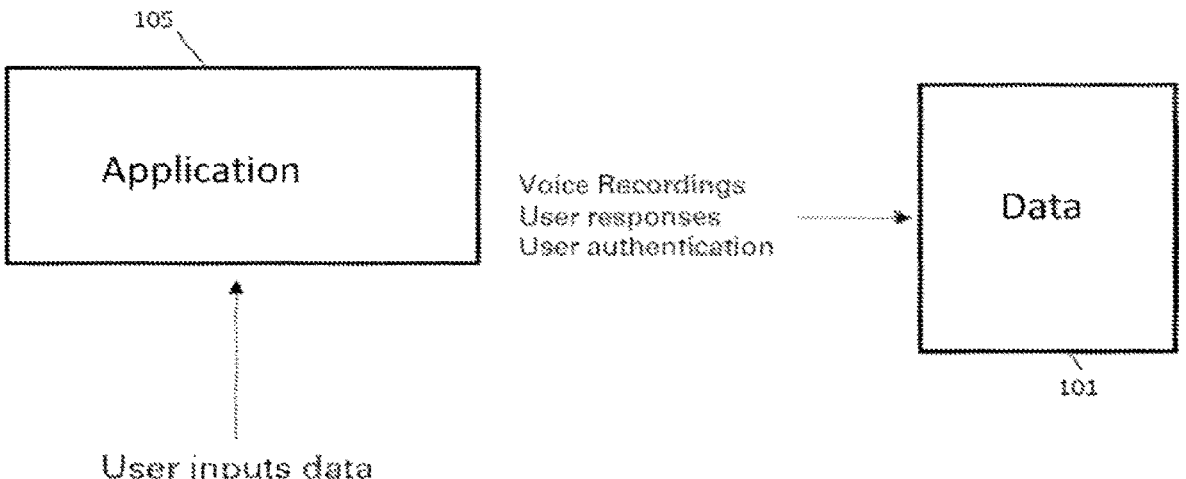
FIG. 2 illustrates user input data entered into the database via an application, in accordance with an exemplary embodiment.

FIG. 2 illustrates user input data entered into the database (e.g., database 101), in accordance with an exemplary embodiment. For example, a user enters input via user interface(s) displayed on an application (e.g., application 105). The input may include, for example, voice recordings, user responses, and user authentication. The application saves the input in the database (e.g., database 101), either directly or through a computing device (e.g., adaptive apparel design computing device 110).

Figure 3:
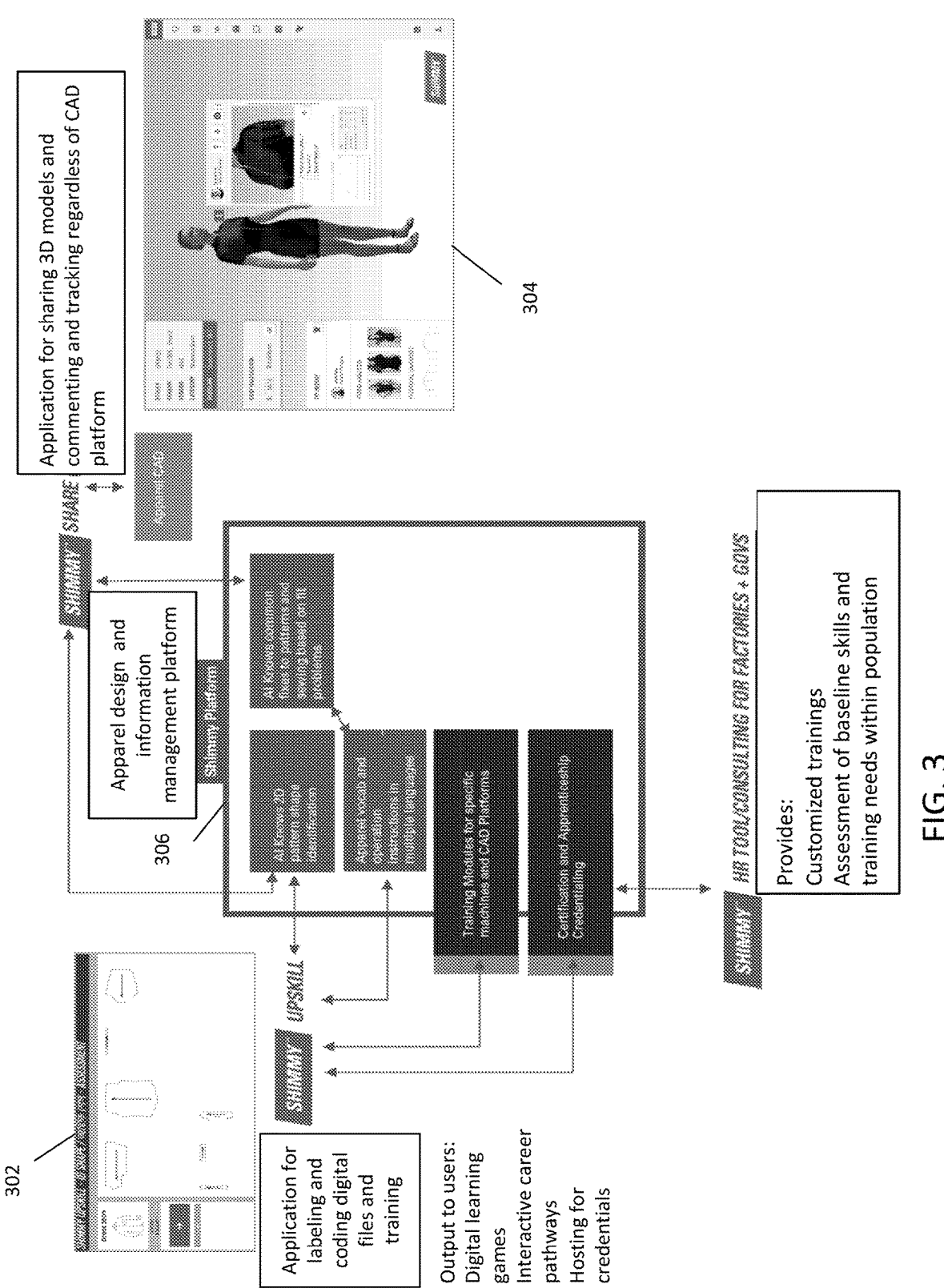
FIG. 3 illustrates a high level overview of the adaptive apparel design and apparel information system, in accor-dance with an exemplary embodiment.

FIG. 3 illustrates a high level overview of the adaptive apparel design and apparel information system, in accordance with an exemplary embodiment. The application 302 further described in FIGS. 6A-6F (also referenced as "Shimmy Upskill") provides a digital learning game to users. The application 304 further described in FIGS. 7A-7D (also referenced as "Shimmy Share") provides a platform to share 3D models and obtain user comments regardless of a particular computer aided design platform. Both applications 302 and 304 communicate with a central computing platform 306 (also referenced as "Shimmy Platform" and/or the adaptive apparel design computing device 110). The platform 306, for example, provides artificial intelligence to identify 2-D shapes and common fixes to patterns and sewing based on fit problems, apparel vocabulary, operation instructions in multiple languages, training modules for specific machines and CAD platforms, and certification and apprenticeship credentialing.

Figure 4:
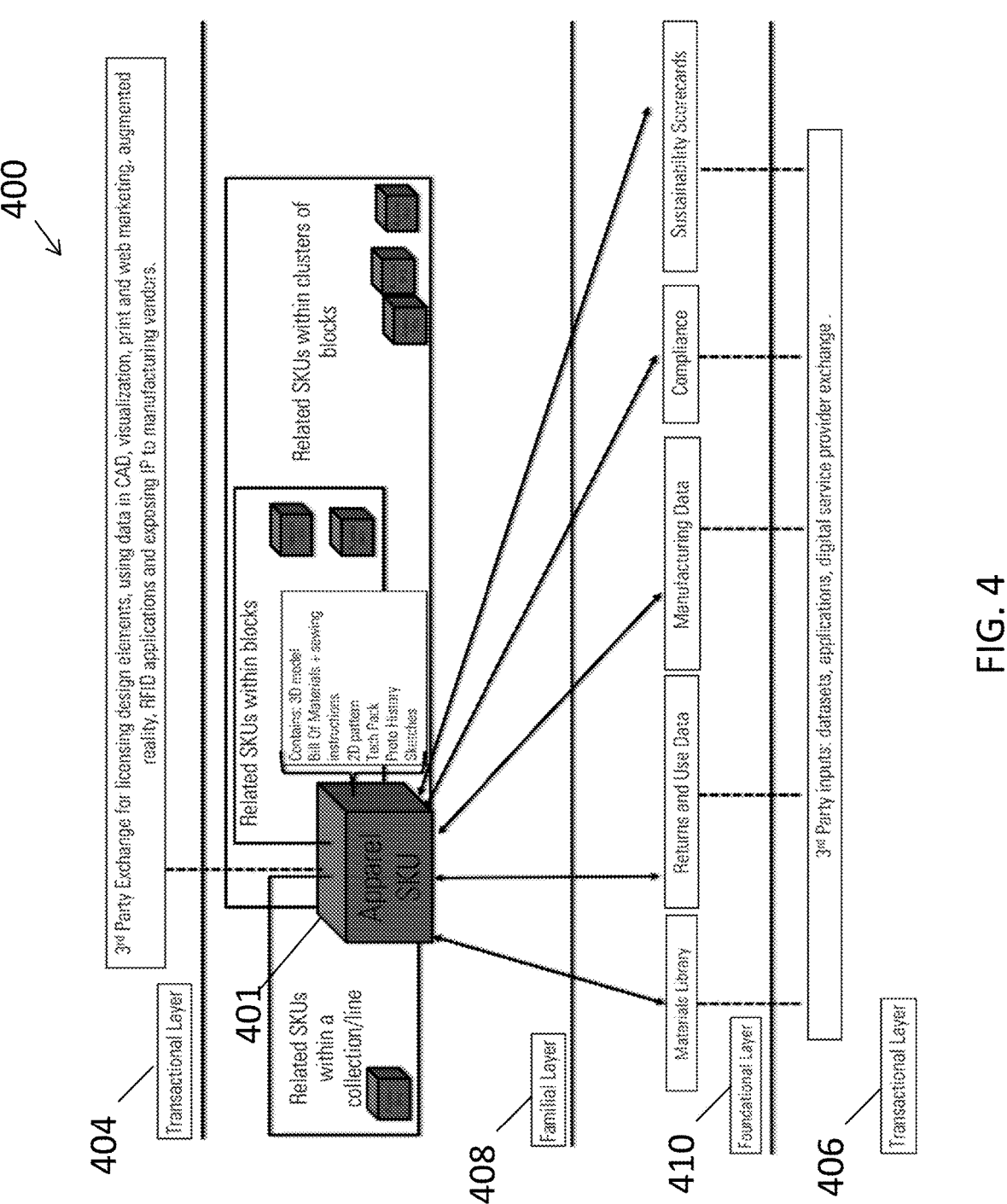
FIG. 4 illustrates the interaction of the apparel informa-tion architecture with different aspects and steps in the apparel design process, in accordance with an exemplary embodiment.

FIG. 4 illustrates the interaction of the apparel information architecture 400 with different aspects and steps in the apparel design process, in accordance with an exemplary embodiment. In some embodiments, the architecture 400 may be a data management platform. The architecture 400 further illustrates platform layers and how the platform layers interact with SKU container(s). In some embodiments, the architecture 400 may be a cloud-based data architecture. The architecture 400 reflects data taxonomy and descriptors that enable the apparel industry to achieve greater digitalization, automation of design processes, and automated garment manufacturing.

In some embodiments, within the described data management platform are containers, known as an Apparel SKU Container 401, for data pertaining to a particular stock keeping unit (SKU) of apparel. Each container holds information such as, but not limited to one or more of: a three-dimensional (3D) model, Bill of Materials, sewing instructions, two-dimensional (2D) pattern files, a tech pack, prototype history, sketches, photographs, texted and spoken comments, and other digital artifacts that aided in the design, planning, engineering, development, marketing, manufacture, transportation, sale, use, and end-of-life reclamation of the garment.

In some embodiments, each container serves as a single point of truth for the large teams who design, develop, market, sell, and reclaim garments. These various functions need to interact with this data at different levels of complexity and for different outcomes (for example, a 3D visualization needed for augmented reality versus a technical sizing grade rule needed for batch manufacturing). In some embodiments, the container can expose slices of data in ways that benefit different users while keeping track of versions, additions, and changes while tracing ancestry back to the Apparel SKU in the event of any downstream applications of the data within the platform or outside of it via a digital watermark within the code.

In some embodiments, the container is situated on the platform amongst other containers related to it (e.g., the SKUs were sold at the same time as part of a line, they originated from design elements within a particular apparel block, and they belong to a similar product class like "skirts").

The platform layers include upper transactional layers 404, a familial layer 408, a foundational layer 410, and a lower foundational layer 406.

The upper transactional layers 404 are externally facing layers where third parties can interact with the information within the apparel SKU container. The owner or controller of the apparel SKU container can limit which data is exposed and through which user interfaces and applications that the third party uses the data. The upper transactional layer 404 enables third parties to utilize product data, at the owner's discretion, to visualize it, market it, or build from it in a new design.

The lower transaction layer 406 allows third parties to supply data, digital services (e.g., 3D modeling, material science, digital simulations), and applications that are interoperable with this platform.

The familial layer 408 holds the SKU containers themselves and allows for recall, correlation between them, and data visualization.

The foundational layer 410 includes architecture that enables outside and inside datasets to pass into the platform and for that information to be represented within a particular apparel SKU container. The architecture forms the basis for multi-parameter decision-making and computational problem solving within 2D, 3D, and manufacturing and merchandizing planning software.

Some embodiments incorporate automation technology applications. In some embodiments, these applications are at least partially cloud based. In some embodiments, these applications interact with apparel SKU containers. Non-limiting examples of such automation technology applications are mobile and web-based based applications using scanning, photography, voice transcription, and Bluetooth-enabled measurement to at least partially automate the process of processing, fitting, and analyzing physical garments in professional and commercial situations (e.g., a front-end apparel sample measurement application). Non-limiting examples of tasks accomplished through automation technology applications and the platform technology are speech-to-text capturing, and photo and depth sensing data capturing.

Some embodiments further incorporate cloud-based application(s) that utilizes shape recognition software to link patterns and shapes detected in physical garments with Apparel SKU containers on the platform or accessed via the 3rd party exchange within the transactional layer 404/406. The cloud-based application analyzes user wear patterns through to grade rules within the Apparel SKU container. If the garment has wearable technology affixed to, sewn, or woven in, the application will read data from garment sensor, RFID, and other data collection tools to inform new design iterations. The cloud-based application routes end-customer return and fit impressions back from retailers, e-commerce shipping processors, and online comments through to the Apparel SKU Container and its related blocks and styles for grading adjustments.

The cloud-based application may further include a computational design engine that solves for optimal construction based on multiple parameters like cost, manufacturability, sustainability, and fit.

Figure 5:
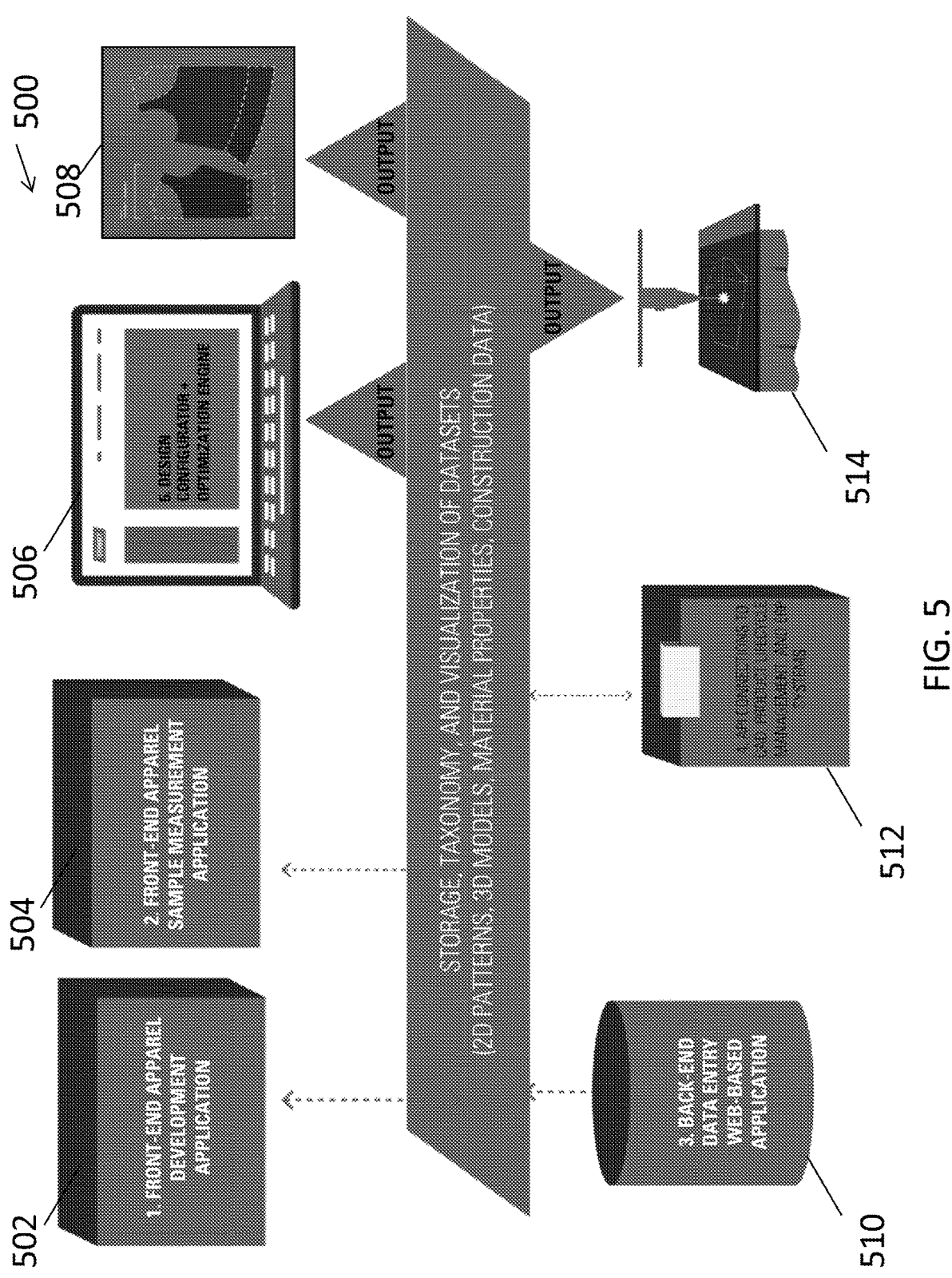
FIG. 5 illustrates components that may be included in a data management platform of the described methods and systems, in accordance with an exemplary embodiment.

FIG. 5 illustrates components that may be included in a data management platform 500 of the described methods and systems, in accordance with an exemplary embodiment.

The data management platform 500 includes a front-end apparel development application 502. The application 502 may be used, for example, for speech to text capturing, and photo and depth sensing data capturing during apparel development.

The data management platform 500 includes a front-end apparel sample measurement application 504. The application 504 may be used, for example, for speech to text capturing, and photo and depth sensing data capturing during apparel sample measurement.

Non-limiting examples of such applications 502 and 504 are mobile and web-based based application using scanning, photography, voice transcription, and Bluetooth-enabled measurement to automate the process of processing, fitting, and analyzing physical garments in professional and commercial situations.

The data management platform 500 includes a design configurator and optimization engine 506. The design configurator and optimization engine 506 performs shape recognition, correspondence identification, and configuration of pattern pieces.

The data management platform 500 includes generating and optimizing 2D pattern shapes for manufacturing 508.

The data management platform 500 includes a back-end data entry web-based application 510.

The data management platform 500 includes an application programming interface (API) connection(s) 510 to CAD, product lifecycle management, and ERP systems (e.g., an interface for the adaptive apparel design computing device 110 and/or the application 105 to communicate with CAD, product lifecycle management, and Enterprise resource planning (ERP) systems. The data management platform 500 includes controllers 514. The controllers 514 may include machine tool controllers. For example, the controllers 514 may control automated fabric spreading, sewing, and cutting machines (e.g., Sewbots® and other automated sewing robots).

One of ordinary skill in the art will appreciate that some embodiments may not include all components and some embodiments may not include all of the described features.

Further, in some embodiments, the functionality of multiple components may be incorporated into a single component or fewer components.

FIGS. 6A-6F are screenshots of a gamified training application (e.g., application 105) that teaches digital pattern-making and 3D modeling to garment workers, in accordance with an exemplary embodiment. The application utilizes a design user interface similar to apparel industry CAD systems to upskill and reskill garment workers in factories. The application addresses a significant challenge facing the apparel industry involving a lack of digital workers to make digital models. The application trains a user in apparel vocabulary and operation instructions in English and in a native language of the user, which may be referred to herein as a local language. The application further creates garment/apparel taxonomy using specific set of definitions and builds a corpus to be used in the application.

The application is a game that is also a learning and work tool. The application assists users develop cognitive and technical skills with digital patternmaking, 3D digital sewing assemblies, automated equipment operation and maintenance, and other digital literacy skills. Some of the advantages of some embodiments of this application include one on one feedback delivered immediately with adaptive rewards and constructive feedback. In addition, goals (e.g., in the form of training milestones and/or work milestones) in a game environment are defined and easier to understand than interpreting the meaning inside a teacher or manager's verbal directive. Upskill also provides the user with the opportunity to work in groups and create collective intelligence across geographies and cultural divides.

The application may use artificial intelligence (AI) to train garment workers on basic digital patternmaking, 3D digital sewing assemblies, and other digital literacy skills like English and interface use. In some embodiments, the main features of the application include voice narration in a local language of the user (e.g., Bangla), display of video instructions in the local language, voice-to-text functionality in recalling pattern pieces, symbols, and visualization to guide users, a backend database to save responses from users, and touch-screen functionality. In some embodiments, the application trains or provides input to train an artificial intelligence platform (e.g., Microsoft's artificial intelligence platform, Microsoft Cognitive Services), to recognize an apparel vocabulary in a foreign language, such as Bangla apparel vocabulary, and align it with shapes and English words.

In some embodiments, the application is designed around Bloom's Taxonomy, a learning framework that ensures learners apply what has been learned. The model consists of six educational objectives: remember, understand, apply, analyze, evaluate, and create. The application guides users through the levels of Bloom's Taxonomy with active learning and multimedia modules focused on 3D, cut planning, multi-skilled sewing, dexterity, machine maintenance, and digital patternmaking.

The application includes voice narration in the user's local language (e.g., Bangla) to help explain module instructions. In some embodiments, the application also includes video instructions to guide users on how to work through different learning modules. In some embodiments, the voice to text functionality mentioned above is integrated into the application to aid in recalling pattern pieces.

In some embodiments, the application may be a web-based application, and a user (e.g., a garment worker) may be provided with login information so that the user can access the web-based application. The user (e.g., garment worker) logs into the application and is guided through a series of learning modules, as shown in FIG. 6A-6F. In some embodiments, the application is provided to the user via a computing device that enables touch screen input. In some embodiments, the user selects a module via a display on the touch screen and follows the instructions displayed in words and symbols. The user (e.g., garment worker) can also select a displayed option to play a recorded voice with instructions. In some embodiments, a trainer/administrator may also log into a backend of the application to create accounts, reset passwords, and look at the results data being collected by the users (e.g., garment workers) using the interface.

In one embodiment, the application includes the following modules: apparel pattern identification, setup for cutting, creation of markers, and digital assembly.

In some embodiments, the application may be a cloud-based application that utilizes shape recognition software to link patterns and shapes detected in physical garments with Apparel SKU containers on the platform or accessed via the 3rd party exchange within the transactional layer.

Figure 6A:
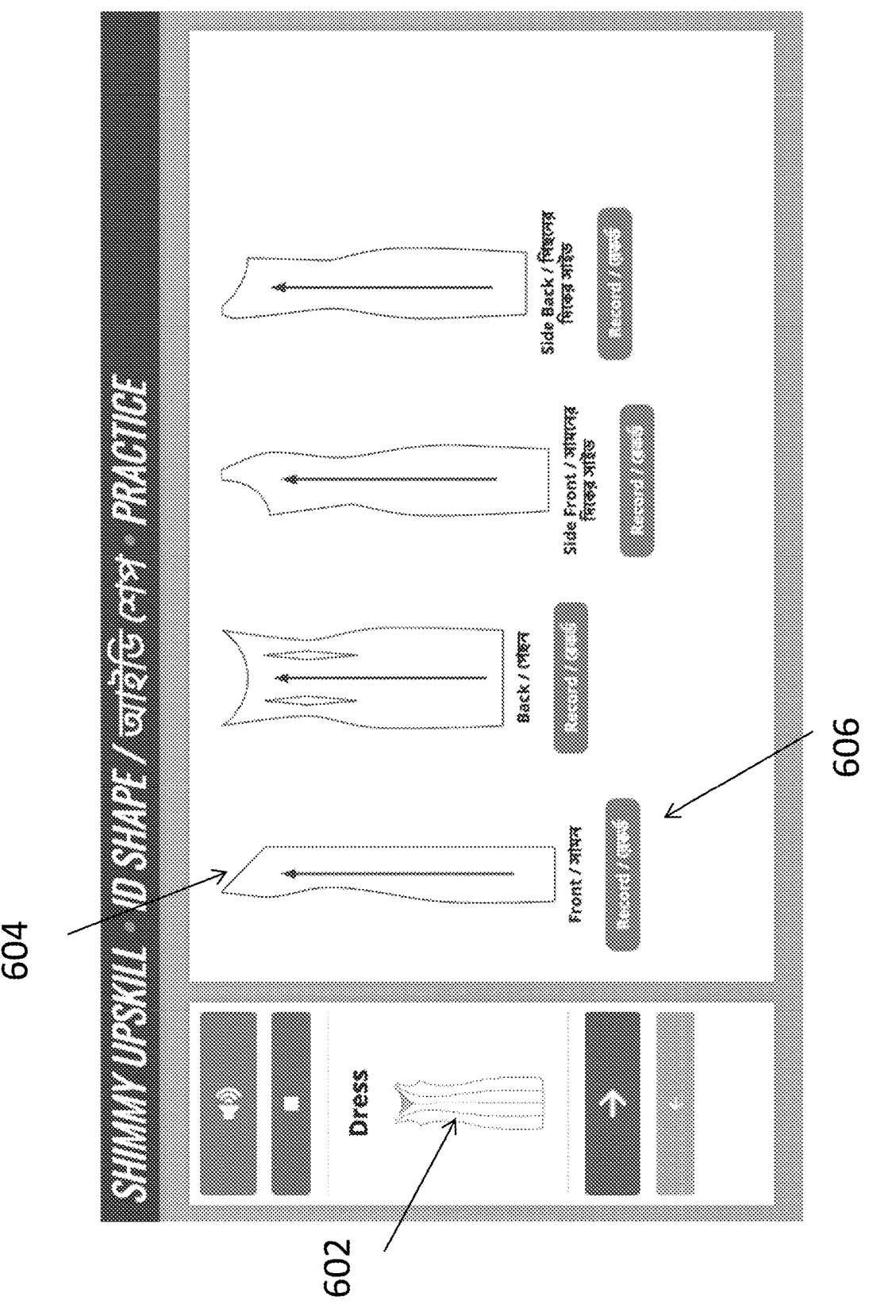
FIGS. 6A-6H are screenshots of a gamified training application that teaches digital patternmaking and 3D mod-eling to garment workers, in accordance with an exemplary embodiment.

FIG. 6A illustrates an interface of the application for apparel pattern identification. The user is shown a visual representation of a garment 602 (i.e., a dress shirt, dress, pants, etc.) and visual representations of types of pattern pieces 604 (e.g., shapes of pattern pieces needed to create the garment) that are included in a pattern for the garment 602 (i.e., front, back, collar band, sleeve, collar, cuff, yoke, etc.). Each type of pattern piece has an associated name that is shown in the local language, or in the local language and English. A record button 606 is associated with each type of pattern piece such that the user can record the pronunciation of the type of pattern piece in the local language, or in the local language and English. The pronunciation is stored in a database. In some embodiments, there is a visual indication when the recording has been saved (e.g., the record button 606 turns blue and/or shows ("Done") when the voice recording has been saved.) The user can use the record button 606 to record apparel vocabulary words spoken by the user. Once identification of all pieces for a pattern for a garment is completed, the user can select a button to move on to another garment to perform apparel pattern piece identification for that garment.

Figure 6B:
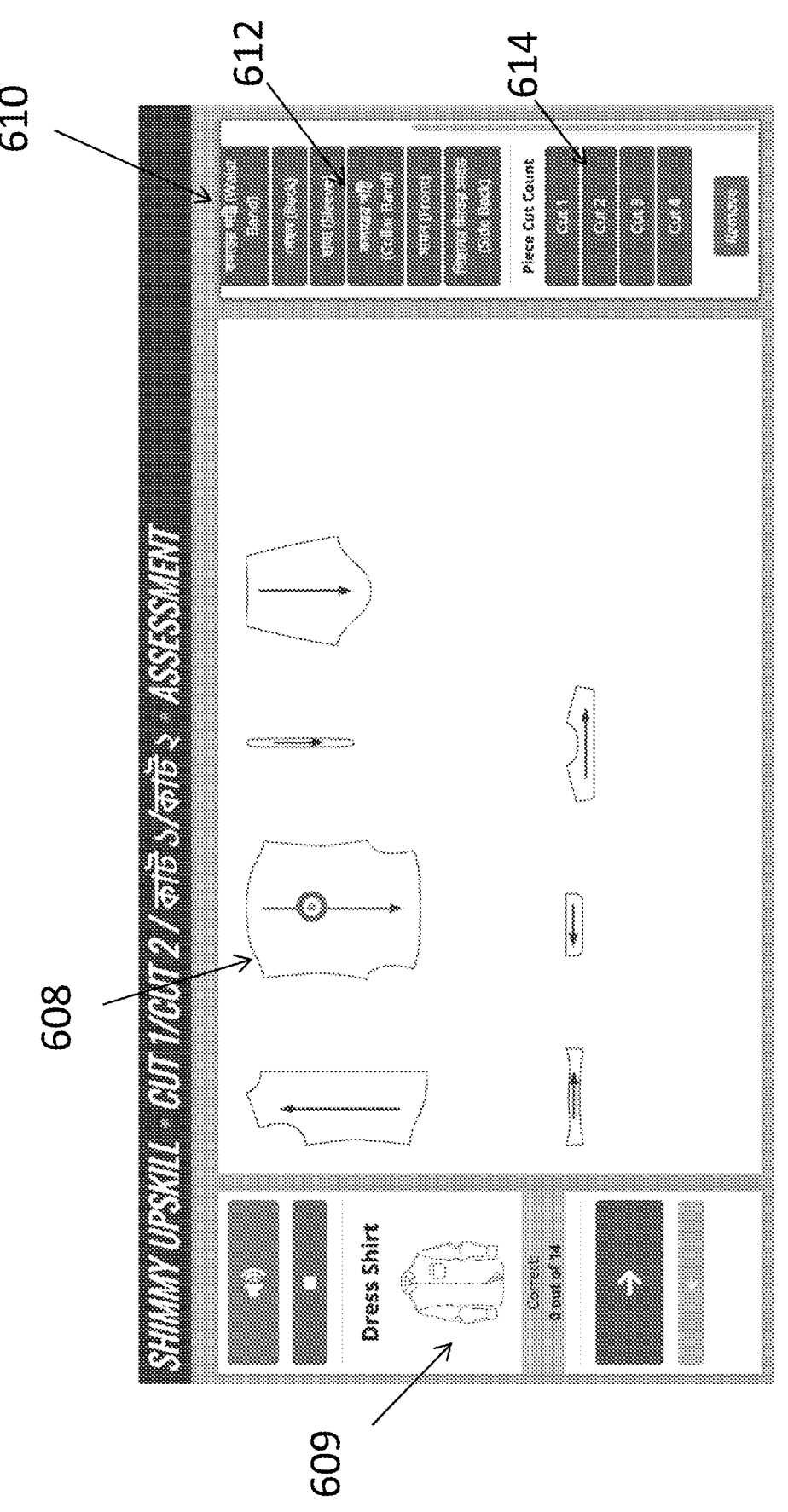

FIG. 6B illustrates an interface of the application for setup for cutting. The user is tasked with identifying the pattern pieces by name as performed in FIG. 6A. The user can also add the number of times the pattern piece is used to make a complete garment. The user can do this by voice or by touching the screen.

The user selects or clicks on a pattern piece 608 for a garment 609, which populates a sidebar or column 610 with potential names 612 of the pattern piece 608 and a potential number of times 614 the pattern piece 608 is used to make the garment 609. The user must user choose the correct name, which is also referred to as type, of the pattern piece 608 from the potential names (potential types) in the sidebar 610 and the number of times 614 the pattern piece 608 is used to make the garment 609 (for example, it may require cutting two sleeve pattern pieces to make the garment). The names may be presented in English and/or the local language (e.g., Bahasa and/or Bahasa Indonesian).

The user performs the above actions for all the presented pattern pieces and identifies the type of pieces from the column 610. In some embodiments, the user is assessed based on the number of correct answers. Once done, the user can select a button to move on to another garment to perform a setup for cutting for that garment.

In some embodiments, information regarding the performance of a user or of multiple users of the application may be provided to a supervisor, administrator, or employer via an analytics interface to get baseline skills assessment and training data/results. Employers may achieve a sustainable workforce by training factory workers, who will then transition to higher skilled, higher paying jobs and grow more dedicated to their company.

Figure 6C:
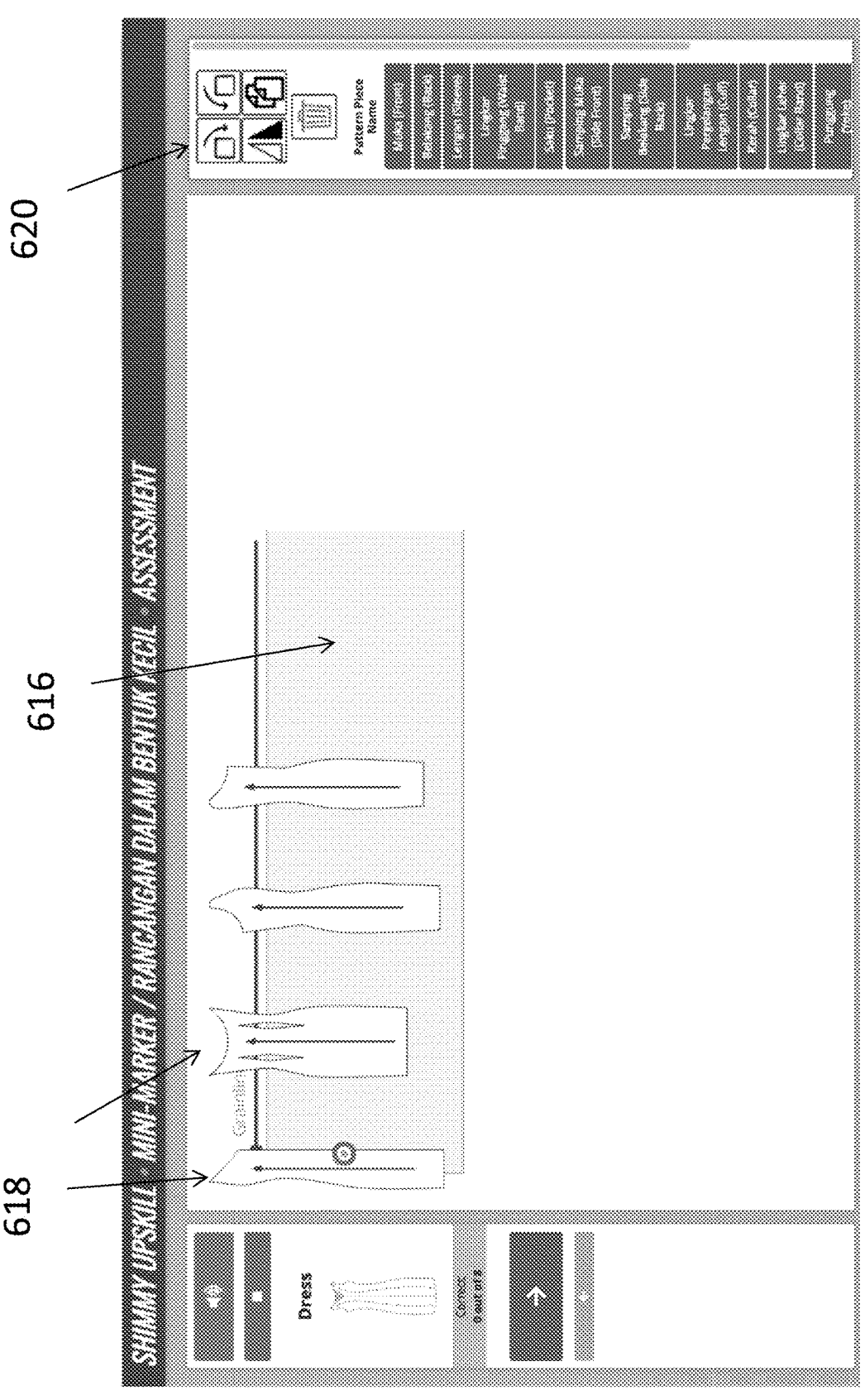

FIG. 6C illustrates an interface of the application for creation of markers. A plan for cutting the garment in the fabric is called a marker or a layout. Before any cutting begins, the marker is used to determine how much fabric is being used per garment. This calculation is called consumption and is tied to the cost of the garment. In the interface, the user creates a marker for cutting the pattern pieces out of the fabric. The user places pattern pieces on the cloth (represented by a grey rectangle 616) in a way that minimizes waste. The user selects the pattern pieces 618 to relocate on the grey rectangle 616) in a way that minimizes waste. The user can rotate, flip, and copy each pattern piece 618 by clicking the buttons 620 on the top right hand corner.

Figure 6D:
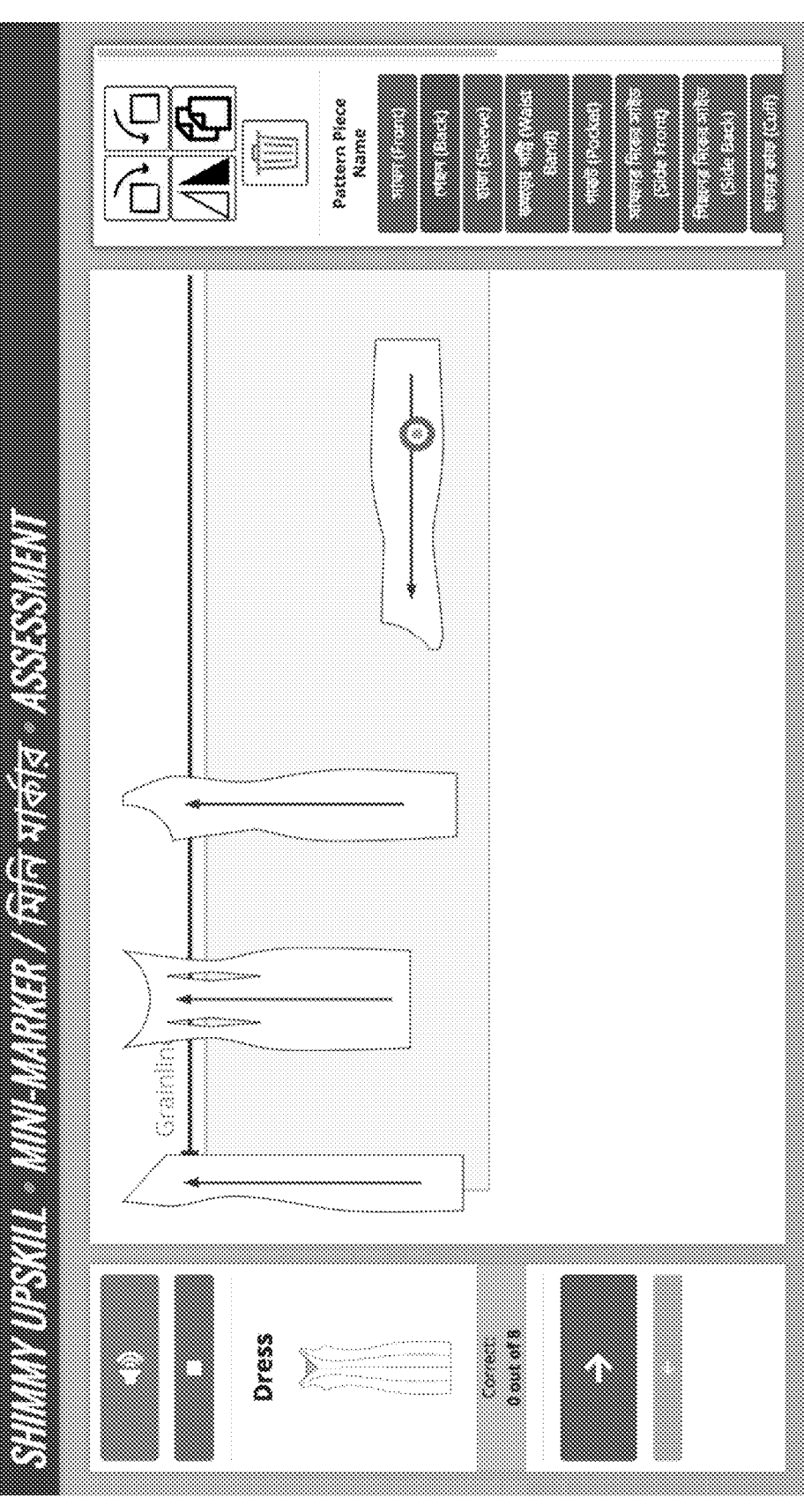

FIG. 6D illustrates another interface of the application for creation of markers.

Figure 6E:
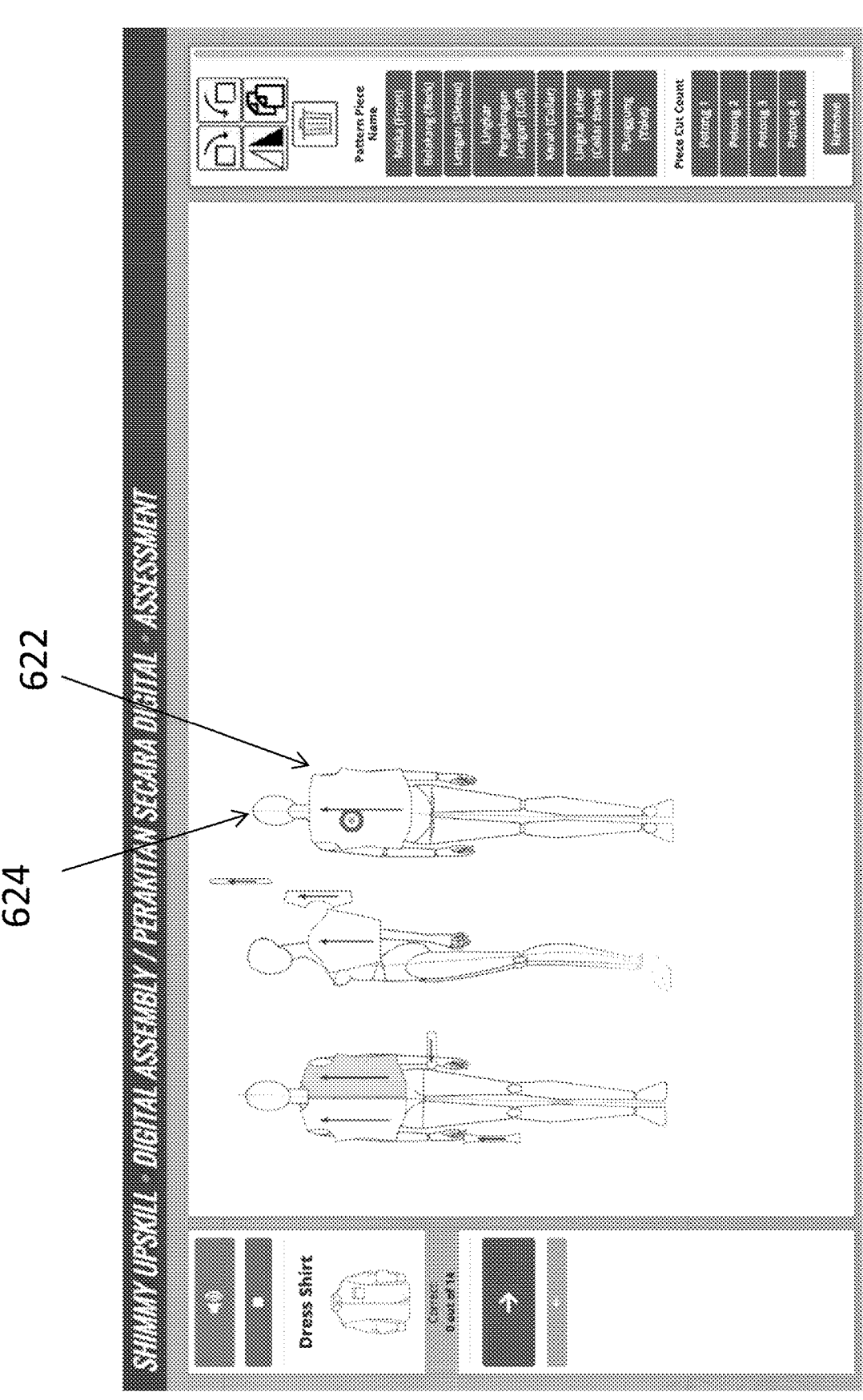

FIG. 6E illustrates an interface of the application for digital assembly. In the Digital Assembly module, the user lays down pattern pieces 622 on a three dimensional model or avatar 624. The user identifies the pattern pieces and the cut count. Users can also flip, rotate, and copy pieces to lay onto the avatar by clicking the buttons 620.

Figure 6F:
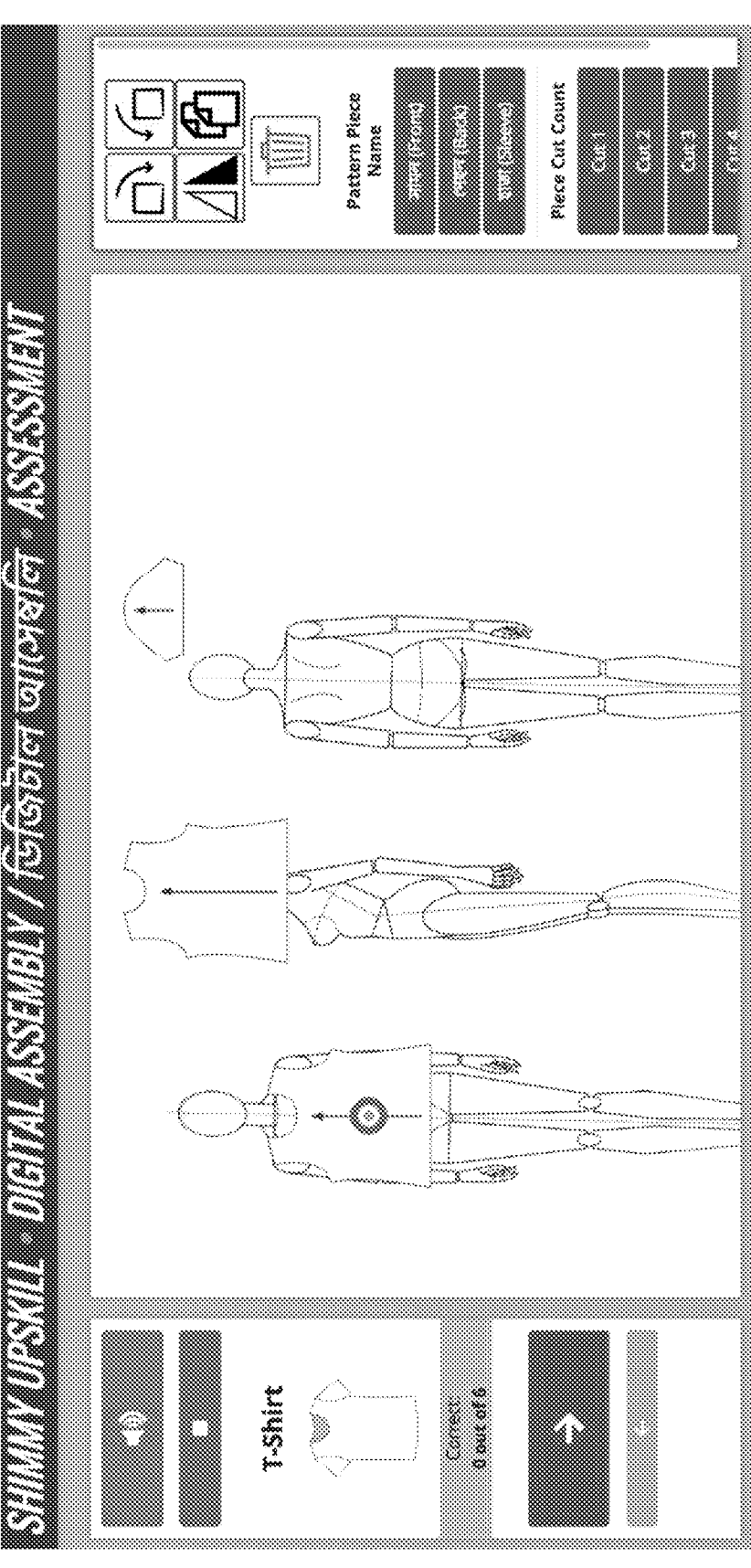

FIG. 6F illustrates another interface of the application for digital assembly.

Figure 6G:
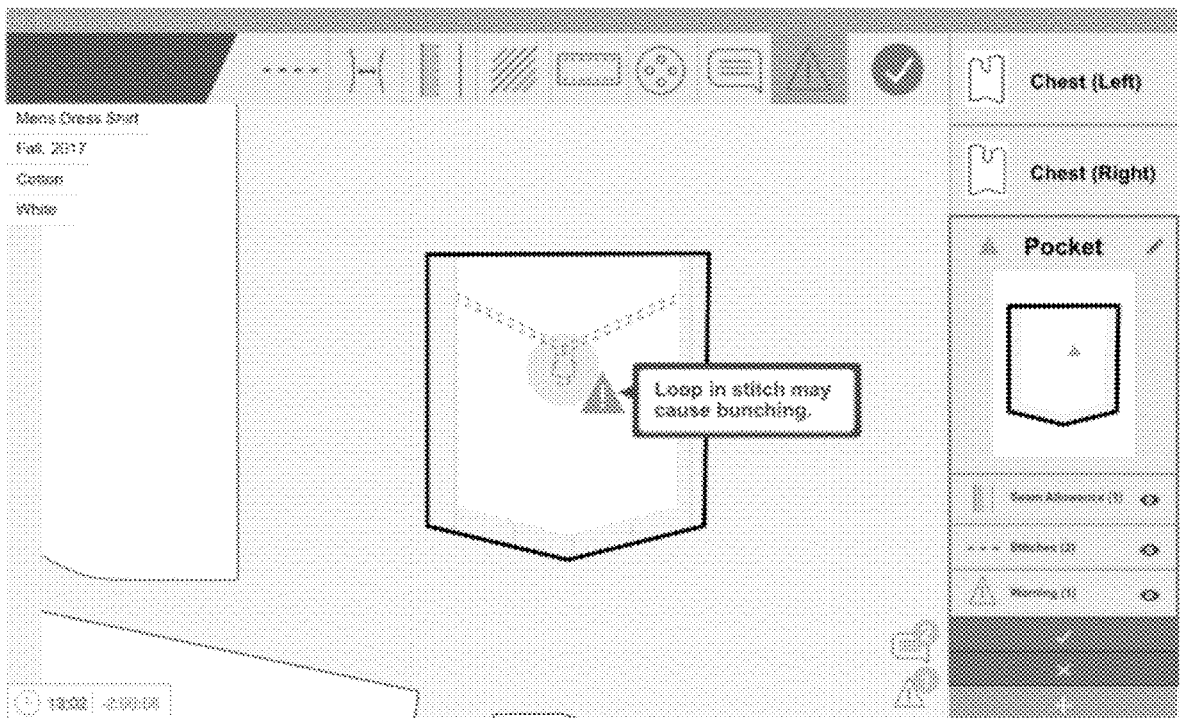
Figure 6H:
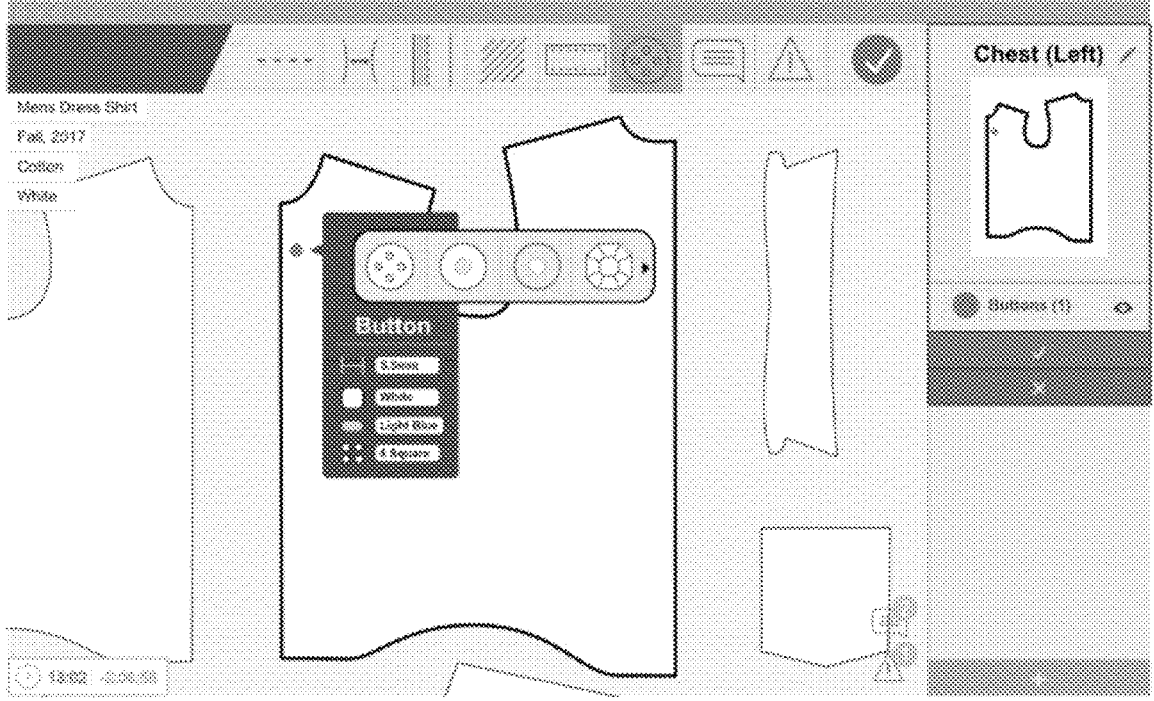

FIGS. 6G and 6H illustrate another interface of an application for digital assembly, in accordance with some embodiments. FIG. 6G is an interface for a lesson regarding correct and incorrect tension in sewing in accordance with an embodiment. FIG. 6H is an interface for a lesson regarding button placement in accordance with an embodiment.

In some embodiments, the user interface prompts the user to provide login information (e.g., a user name and password). In some embodiments, the user will log in using a mobile address. In some embodiments, the application will continue to engage the user in knowledge retention, incentives for continuing study, and useful technical tips after the training session is completed, e.g., by follow up messages in the application, via email, via text, or via other messaging applications or modes. The described systems and methods can be designed so that as a user of the training and work application (e.g., a garment worker) moves through exercises and operations, input from the user can be employed to build a dataset and train an AI that is useful for automating product design and development workflows. There is a technical demand for the institutional knowledge sewing machine operators possess. Some embodiments can leverage that knowledge and build upon it though the design of back end user interfaces that facilitate future work for current sewing machine operators to use their knowledge in turning unstructured patterns into digital files ready for 3D designs.

Figure 7A:
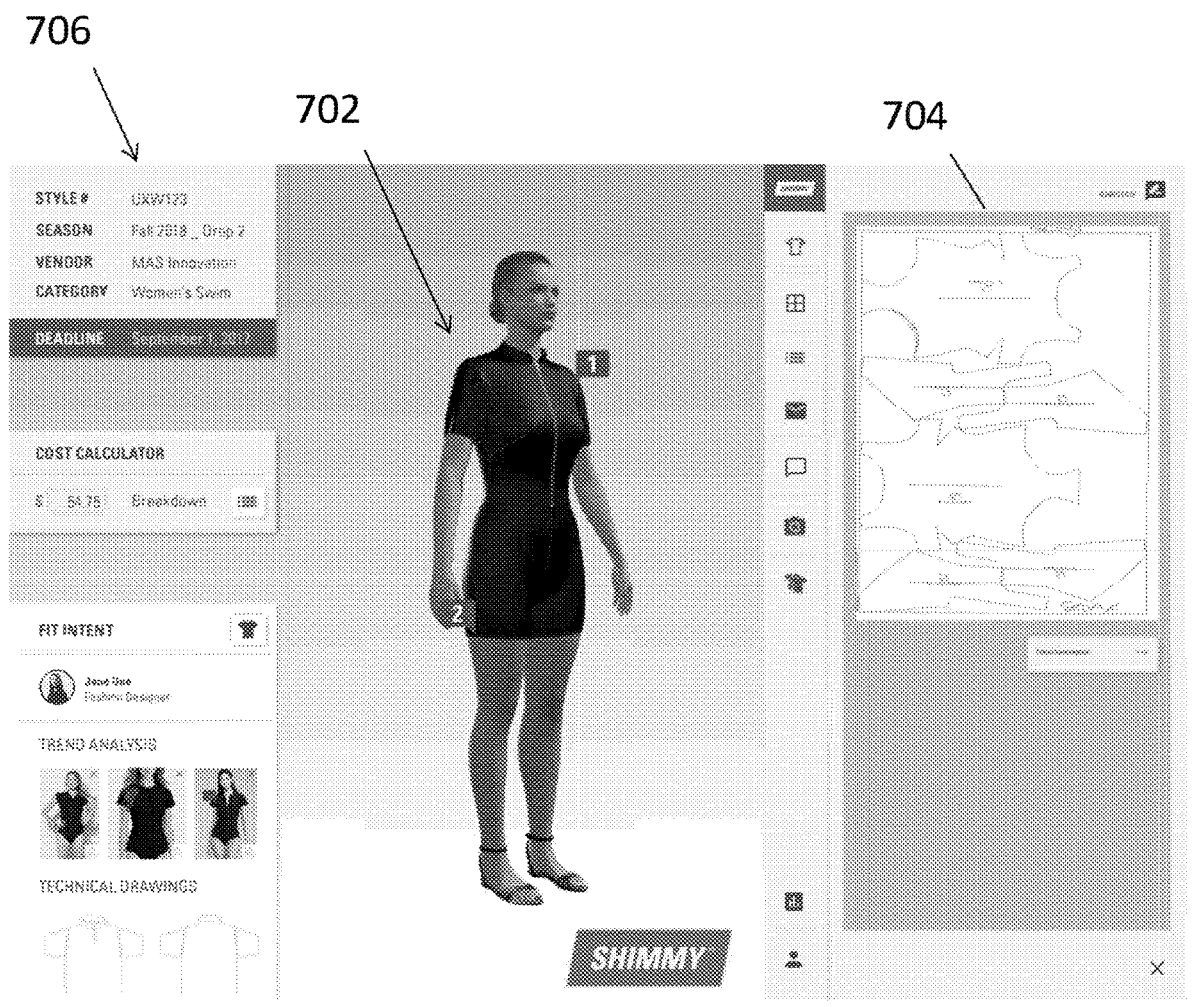
FIG. 7A is a screen shot illustrating a 3-dimensional (3D) digital model of a garment displayed on an application for collaborating and refining of digital and/or physical garment prototypes illustrating display of the digital model information and/or links to related digital assets, such as the two dimensional pattern pieces, cost information, technical drawings, material properties, in accordance with some embodiments.
Figure 7B:
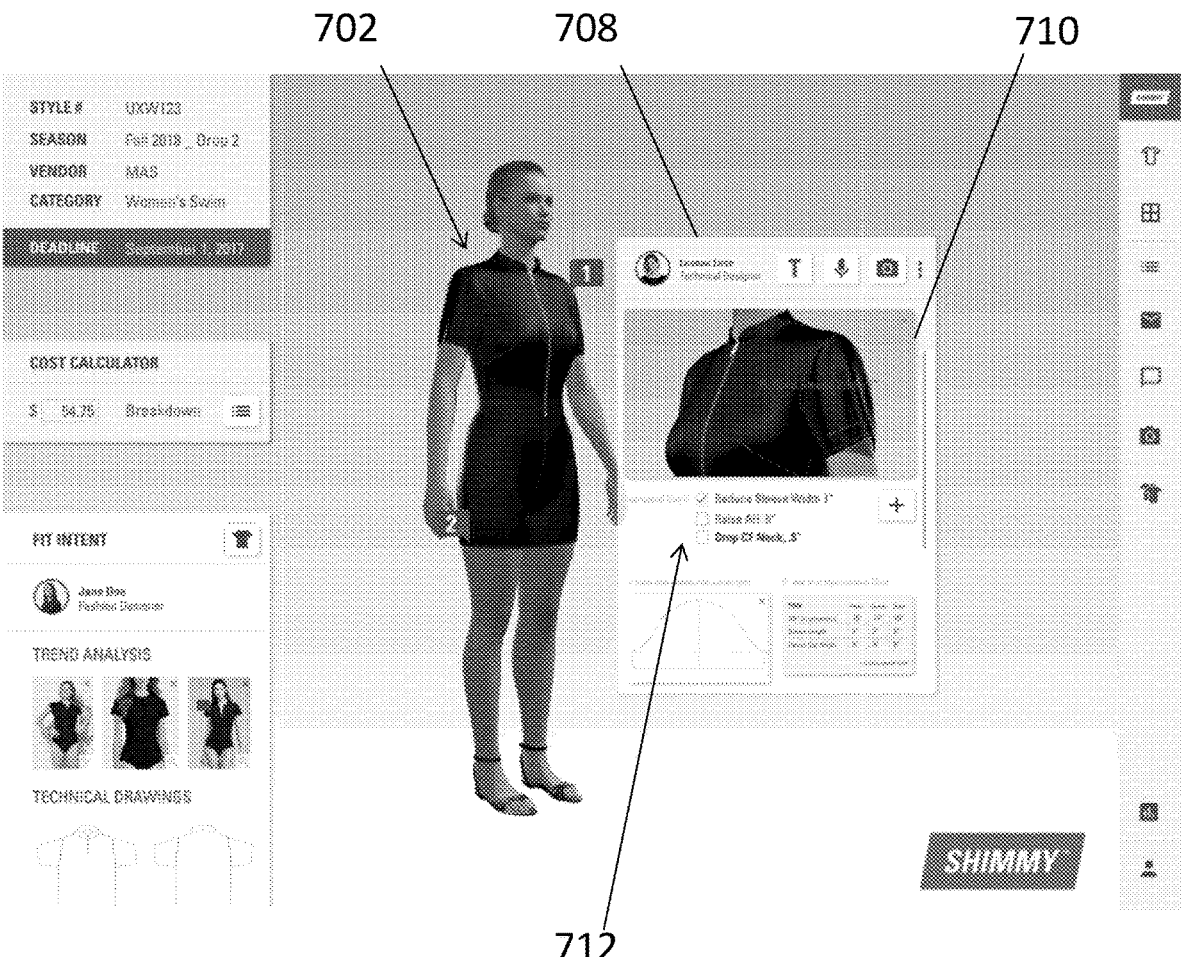
FIG. 7B is a screen shot illustrating the 3-dimensional (3D) digital model of the garment displayed on the application illustrating a localized comment associated with the digital model in accordance with some embodiments.

FIGS. 7A and 7B illustrate 3-dimensional (3D) digital model 702 of a garment displayed on an application, in accordance with an exemplary embodiment. For example, the garment may be the one of the garments designed in FIGS. 6A-6F. Pieces of material needed to create the displayed garment are shown within a section 704 associated with the digital model 702. Additional information about the displayed garment is shown within a section 706 associated with the digital model 702. FIG. 7A illustrates the interface where the digital model is being displayed with links to related digital assets, such as the two-dimensional pattern pieces, cost information, technical drawings, material properties, etc.

3D digital models are used to build digital prototypes of garments so the design can be evaluated without having to sew a physical prototype. 3D digital models can further be utilized to judge the fit of a garment on a digital body to make sure the pattern was made correctly. Apparel brands, manufacturers, and retailors in remote locations can also view and make decisions about the design without having to ship a physical prototype. 3D digital models can also be used to assist a consumer of clothing to view the garment as a 360-degree digital model on a website or in an AR/VR consumer experience. The described systems and methods can assist in building the capacity of garment workers to create digital models to enable these use cases over time. 3D design will increase time-to-market by building a common language that allows brands and manufacturers to reduce physical prototypes and design errors.

The application (e.g., application 105) is web-based collaboration application that assists in the process of refining digital and physical garment prototypes. In an exemplary embodiment, the application is a web-based 3D viewer, accessible from laptop, tablets, or a phone, that can consume a digital model 702 built in an apparel CAD program and display it for easy viewing, manipulation, and annotation. Utilizing the viewer, the digital model 702 can be spun 360 degrees, zoomed in or out, annotated, and drawn on using a stylus or fingertip. The users can make localized comments directly on the digital model and add pictures, video, and uploads of files like Excel documents, PDFs, or Illustrator files. The comments will display as tags on the 3D model 702 as well as in a time-stamped checklist where a user can indicate that the comment has been addressed. FIG. 7B illustrates a localized comment 708 placed in association with the digital model. The comment 708 includes an uploaded picture 710. The comment 708 will display as a tag on the 3D model 702 as well as in a time-stamped checklist 712 where a user can indicate that the comment has been addressed.

The comments are automatically translated into the user's preferred language by using Natural Language Processing and a corpus with apparel vocabulary and domain expertise. The corpus, in at least some languages, may be built or obtained, at least in part, from input from users of the training/learning and work tool application.

The 3D digital model 702 is displayed in the application on a computing device (e.g., computing device 104). In some embodiments, the adaptive apparel design computing device 110 is configured to enable a user to efficiently label, code, and generate digital file(s) ready for 3D design (e.g., digital stitching, etc.). The adaptive apparel design computing device 110 transmits the digital file(s) to a web-based 3D viewer. The web-based 3D viewer displays the 3D design based on the digital file(s).

In some embodiments, the computing device may further use artificial intelligence during digital product creation and/or during testing simulation, such as generating predictions on how material is affected by certain conditions such as stretching, heat, etc., and generating predictions regarding fit problems based on size, materials, pattern design.

FIGS. 8A-8L illustrates interfaces for identifying and designing a garment, in accordance with an exemplary embodiment. In particular, as explained further below, a user enters information on a first garment sample and schedules a date and a time to try on the first garment sample.

Figure 8A:
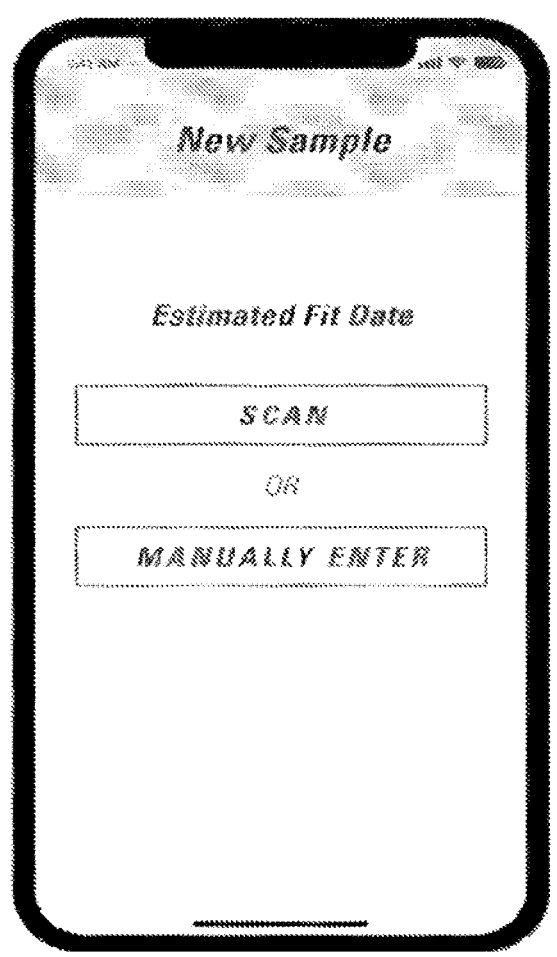
FIGS. 8A-8L illustrates interfaces for identifying and designing a garment using a collaboration application, in accordance with an exemplary embodiment.
Figure 8B:
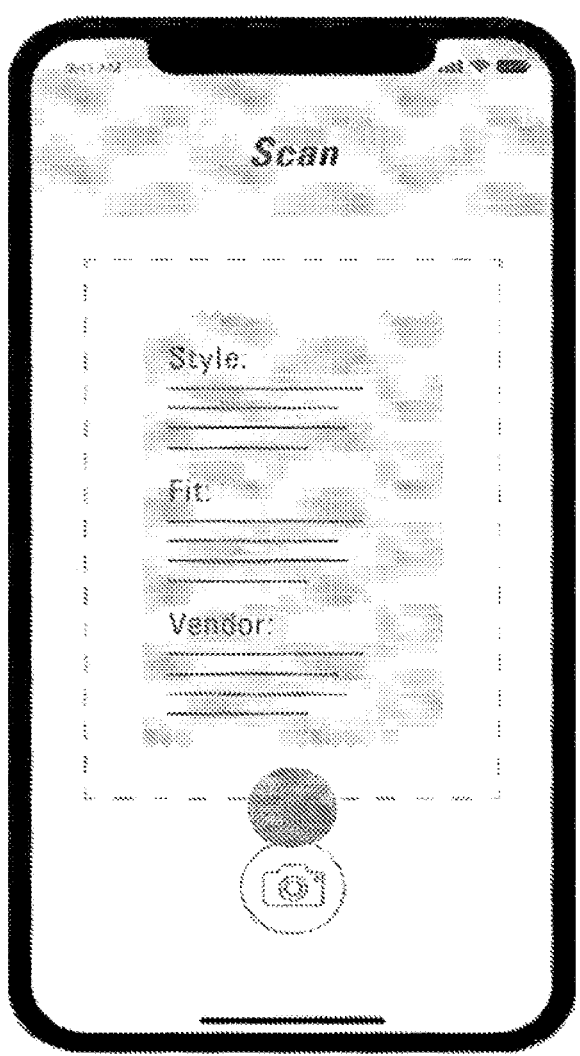
Figure 8C:
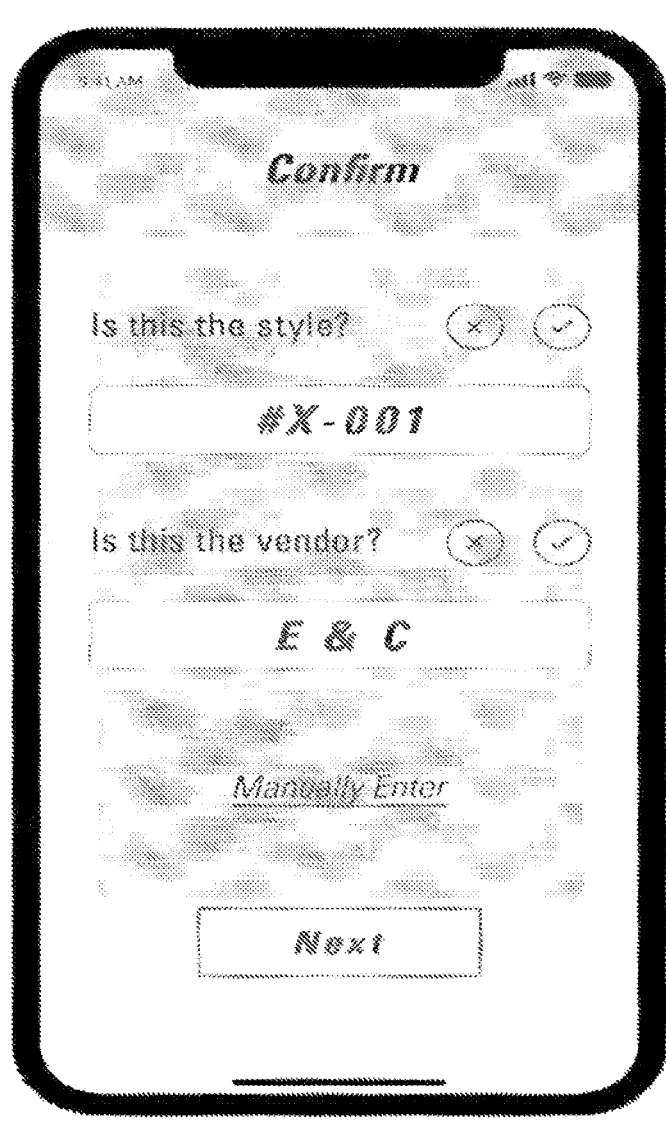
Figure 8D:
Figure 8E:
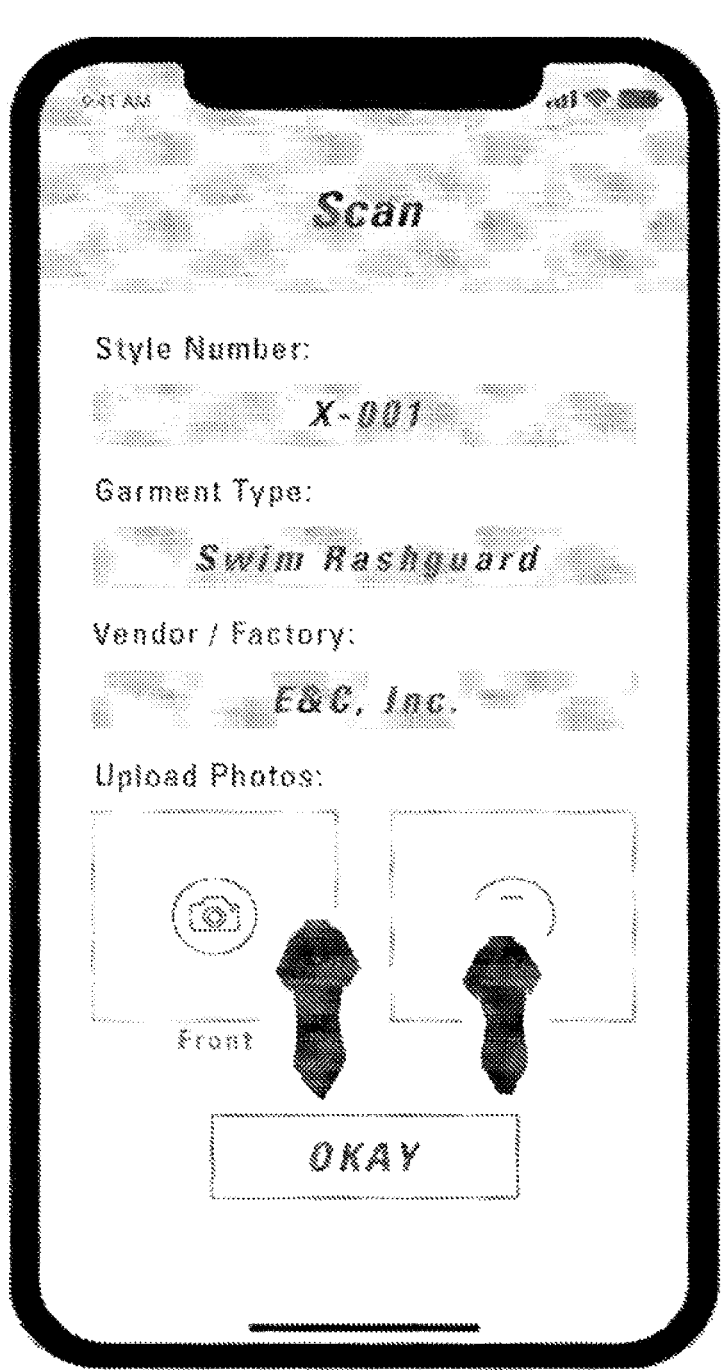

FIGS. 8A-8E illustrate interfaces on the application for entering information on a garment, for example, by scanning a garment tag or garment paperwork. The garment paperwork may include, for example, a style, a fit, and a vendor. A user may enter additional details on the garment, such as selecting the garment type, as shown in FIG. 8D.

Figure 8F:
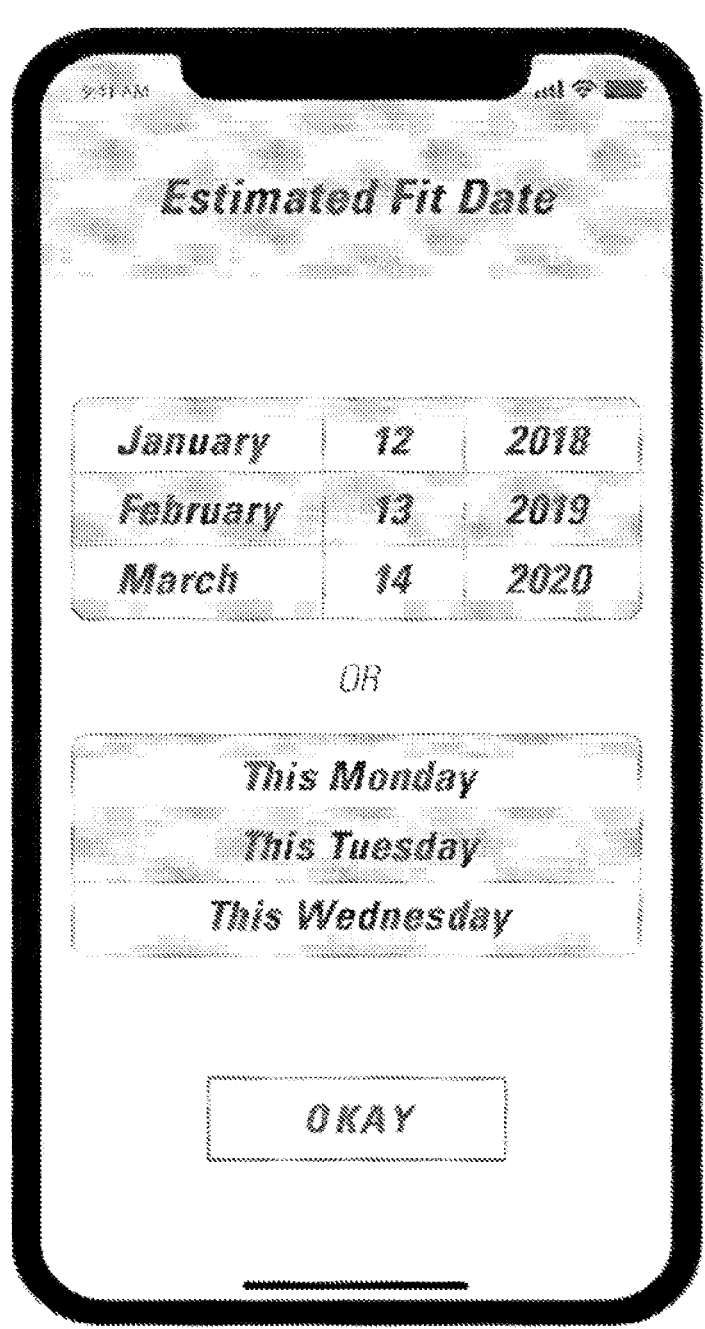

FIG. 8F illustrates an interface for selecting a fit date to try on the garment identified in FIGS. 8A-8C.

Figure 8G:
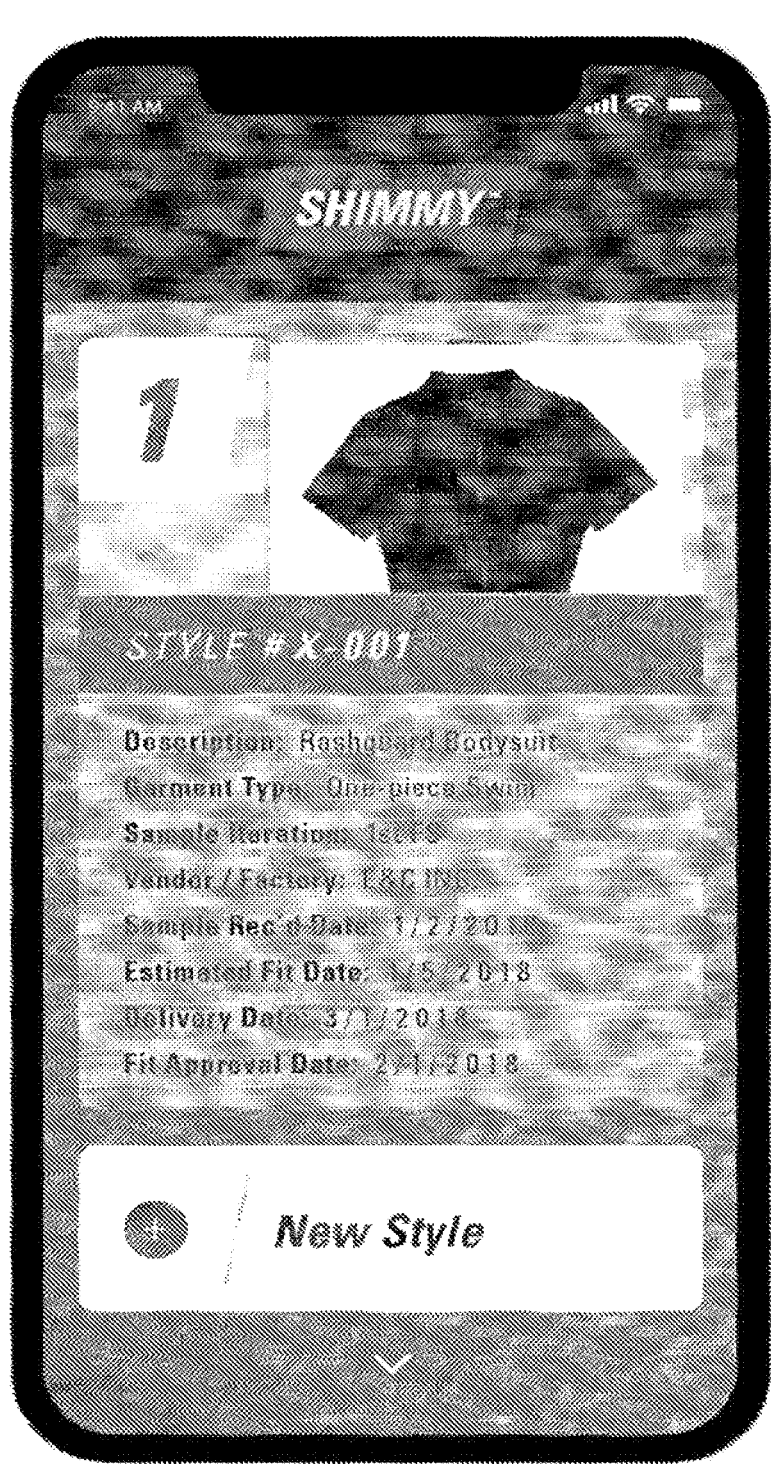
Figure 8H:
Figure 8I:
Figure 8J:
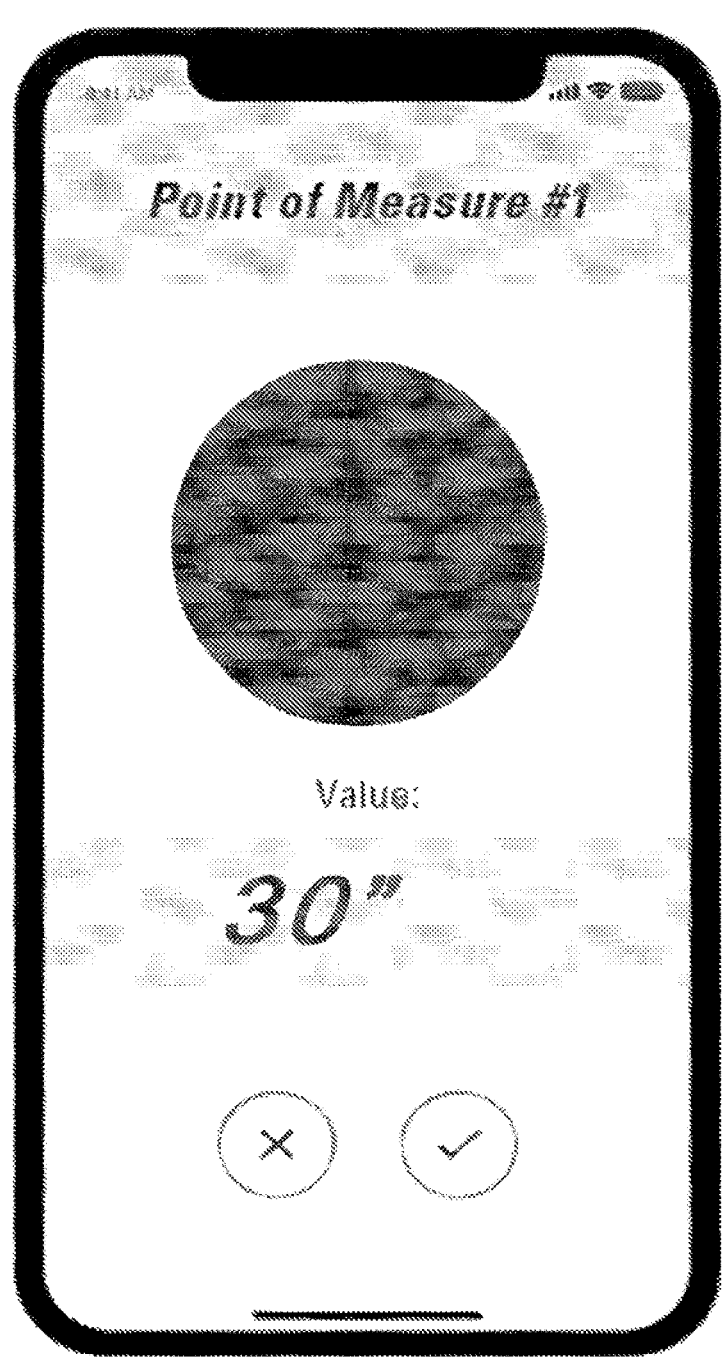
Figure 8K:

FIG. 8G illustrates an interface displaying a summary of the information from FIGS. 8A-8F. The information may include a description, garment type, sample iteration, vendor/factory, sample received date, estimated fit date, delivery date, and fit approval date.

FIGS. 8H-8K illustrate interfaces on the application for entering values for points of measurements for the garment identified in FIGS. 8A-8C. The points of measurements may be used to design the garment.

Figure 8L:
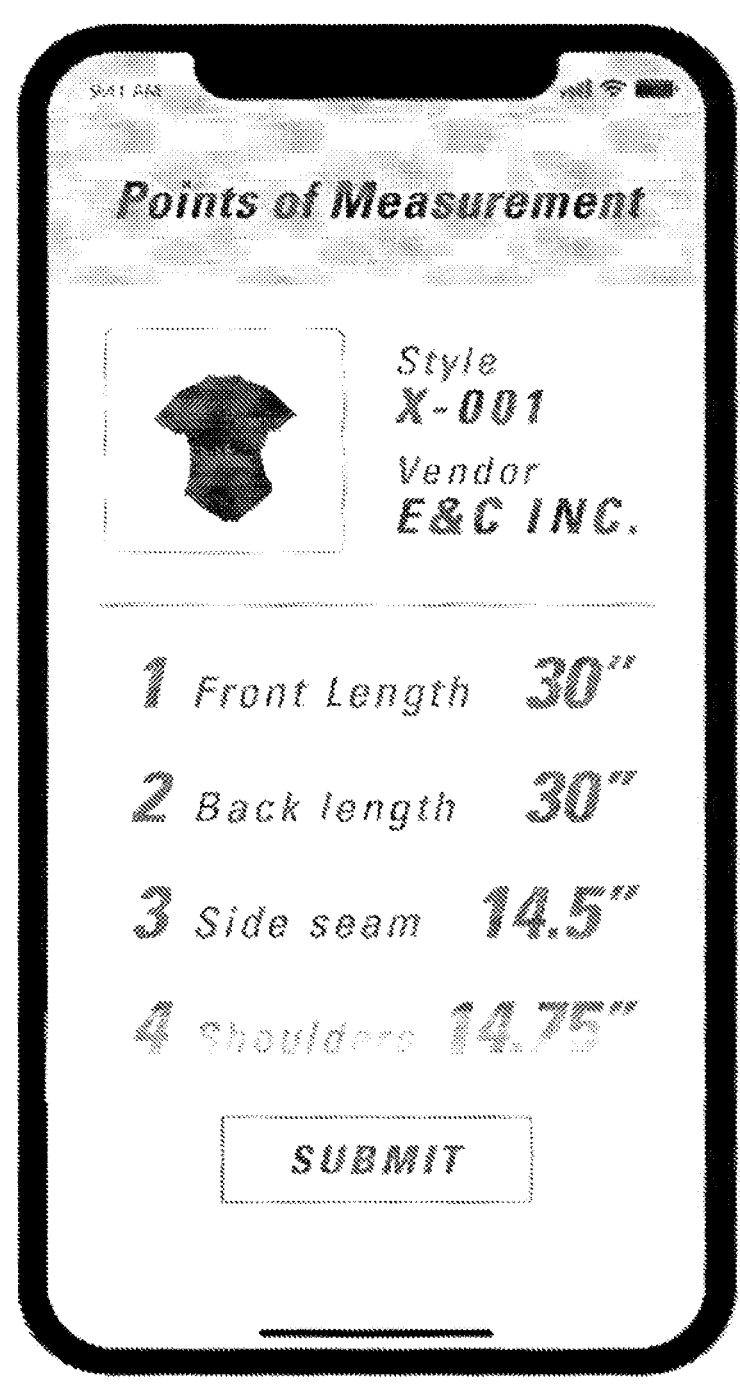

FIG. 8L illustrates an interface displaying a summary of the measurements from FIGS. 8H-8K.

FIGS. 9A-9H illustrate an interface for obtaining and incorporating feedback on the garment of FIGS. 8A-8L, in accordance with an exemplary embodiment. In particular, as explained further below, a user receives comments and/or feedback on the first garment sample, and creates a second garment sample based on the comments and feedback.

Figure 9A:
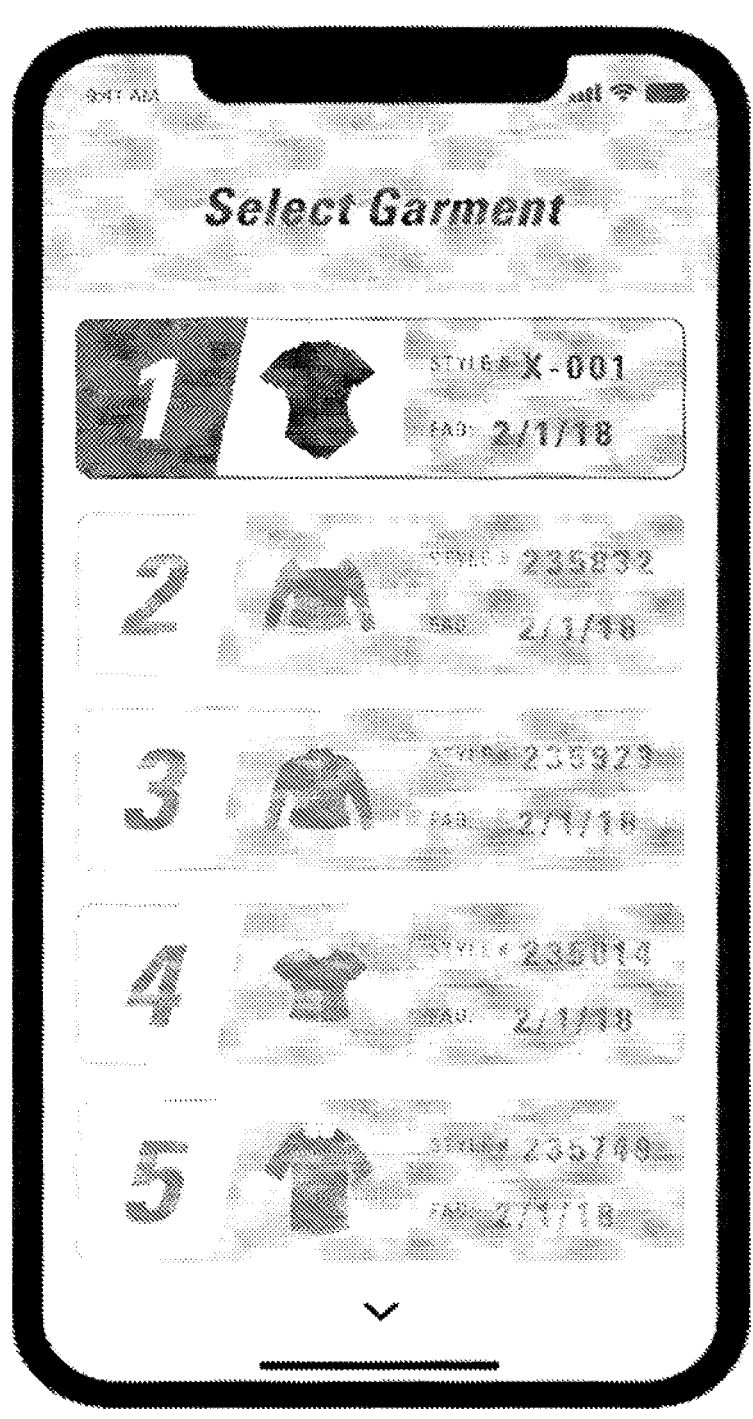
FIGS. 9A-9H illustrate an interface for obtaining and incorporating feedback provided by a collaborative application, in accordance with an exemplary embodiment.
Figure 9B:
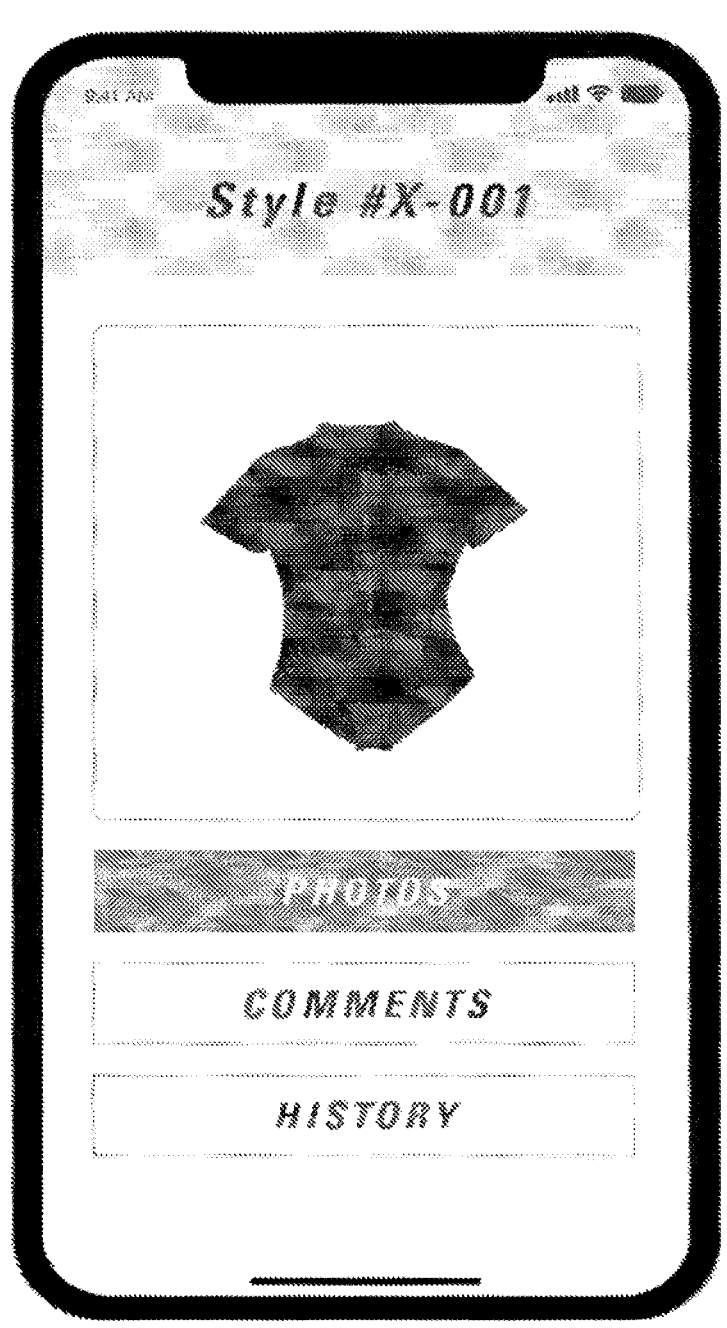

FIGS. 9A-9B illustrate an interface on the application enabling a user to selecting a garment for the fitting.

Figure 9C:
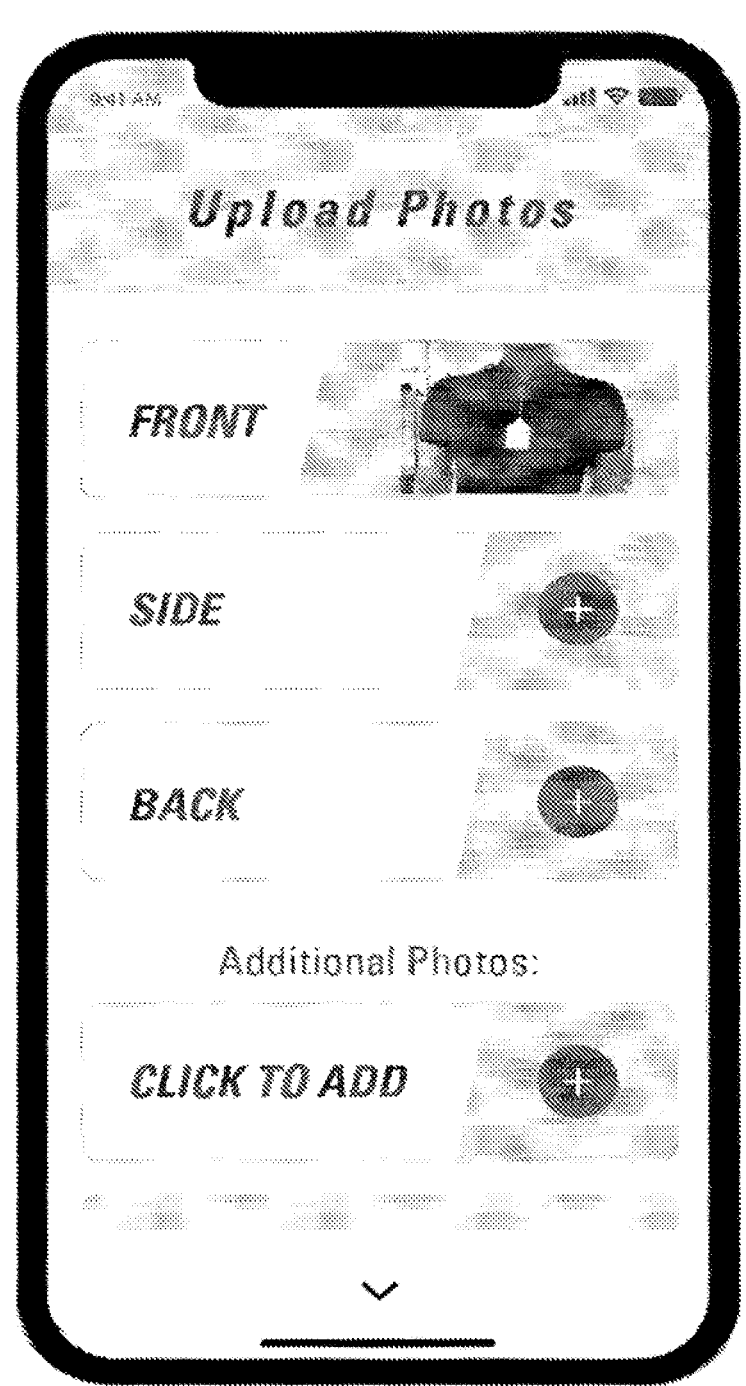
Figure 9D:
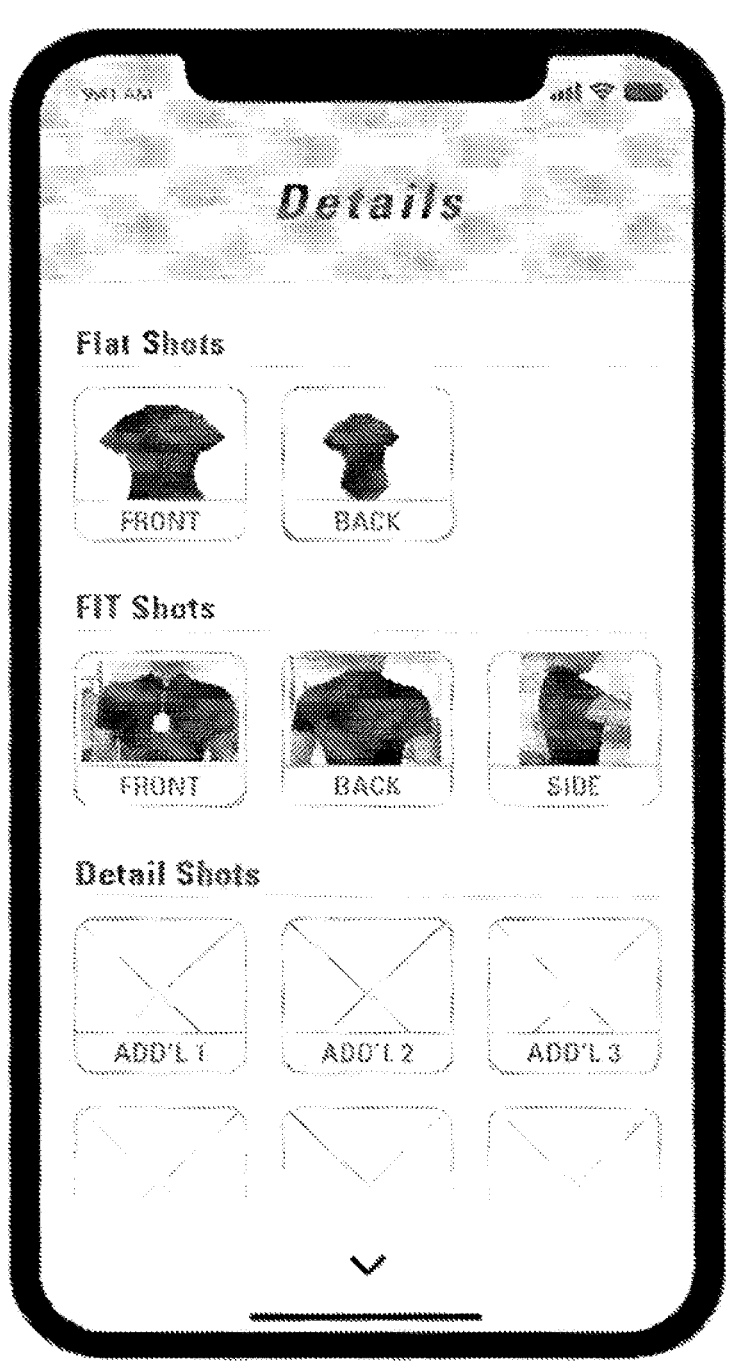

FIGS. 9C-9D illustrate an interface on the application enabling the user to add images of the garment during the fitting to the application.

Figure 9E:
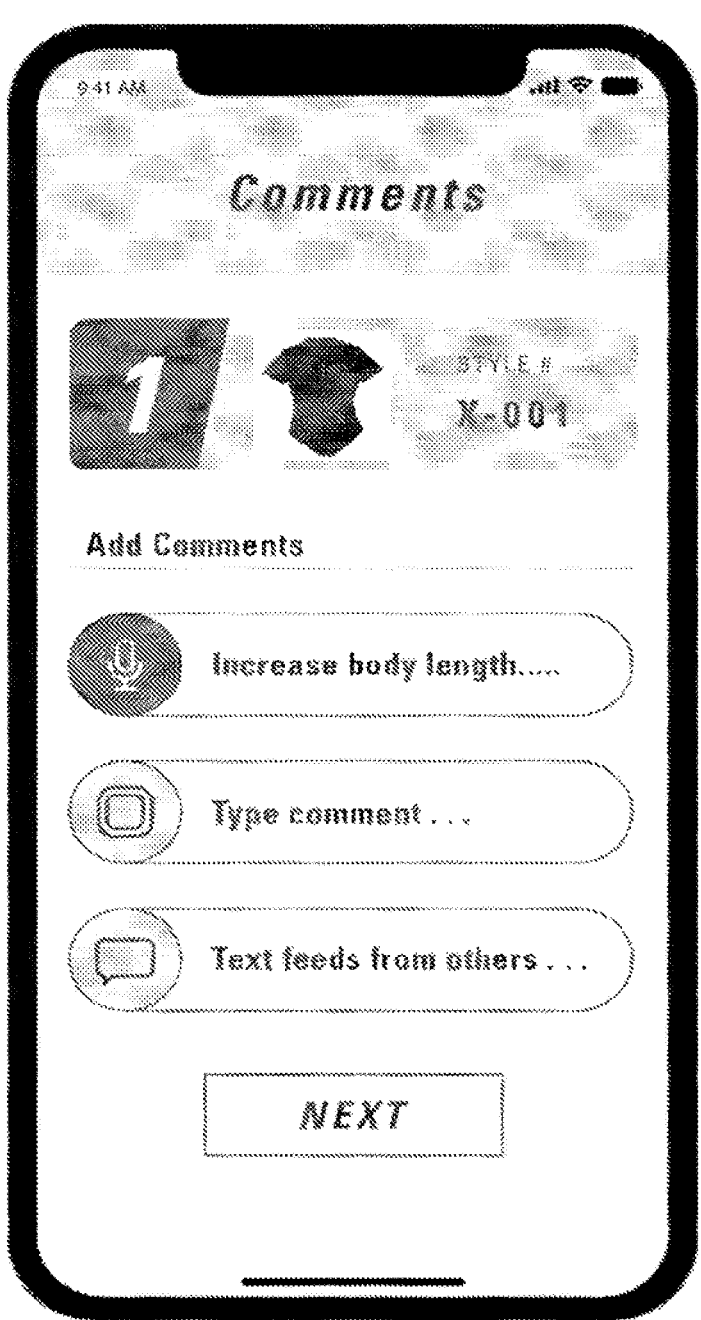
Figure 9F:
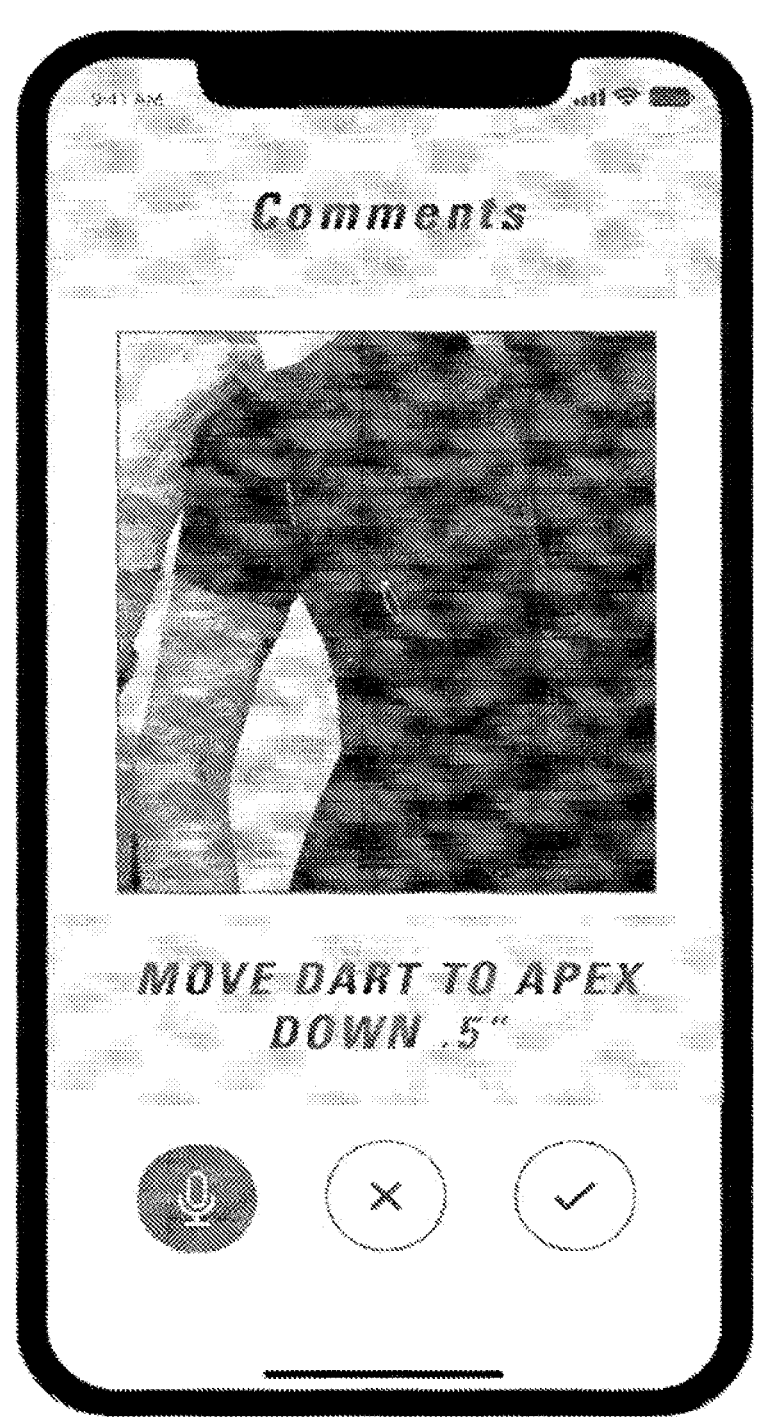
Figure 9G:
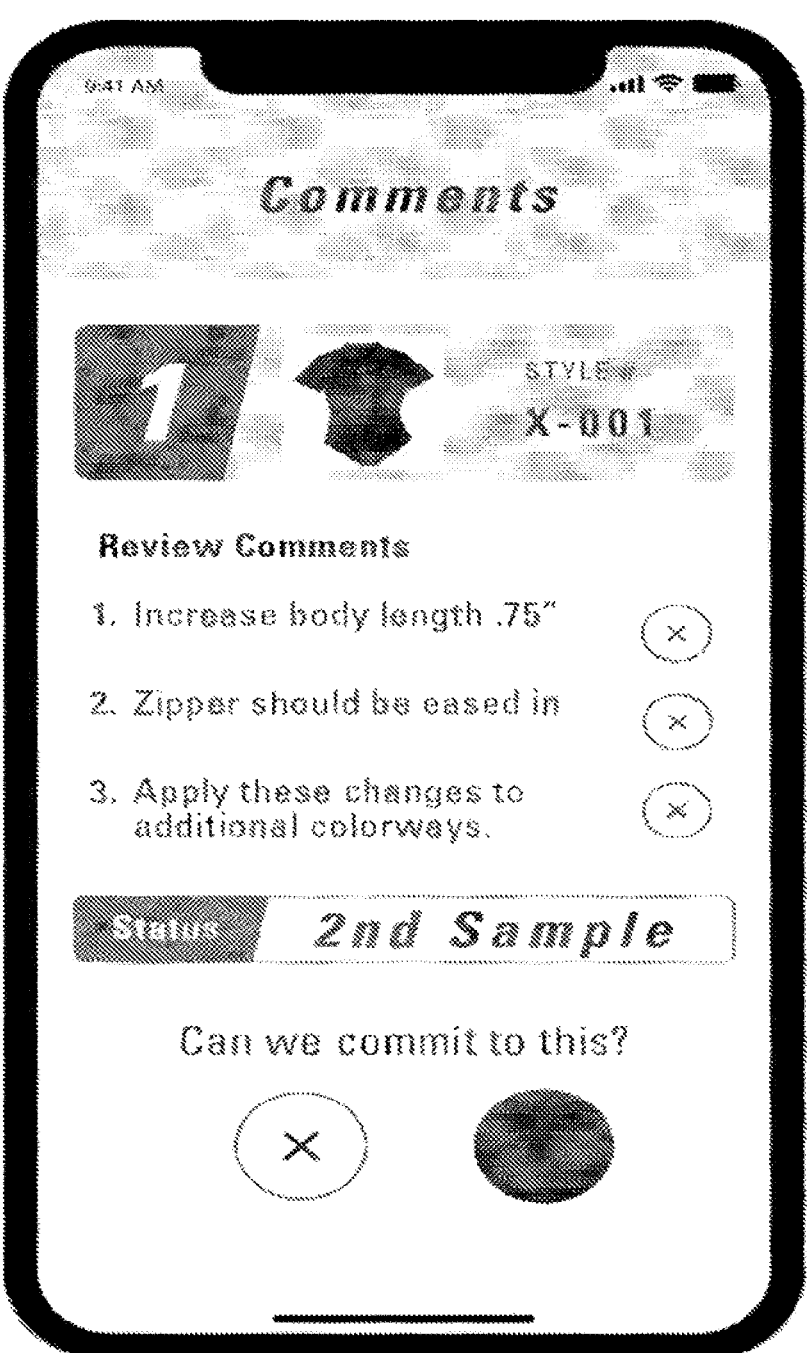

FIGS. 9E-9G illustrate an interface on the application enabling users to enter comments on the garment. Team members can add comments to the feed remotely. Shimmy data capsule is ready to push to PLM, Excel, material or job-tracking software, or email. An application records sample measurements and fit notes, for example in sample rooms, sessions with fit models, and on the factory floor.

Figure 9H:

FIG. 9H illustrates an interface on the application for selecting a next garment.

Figure 10:
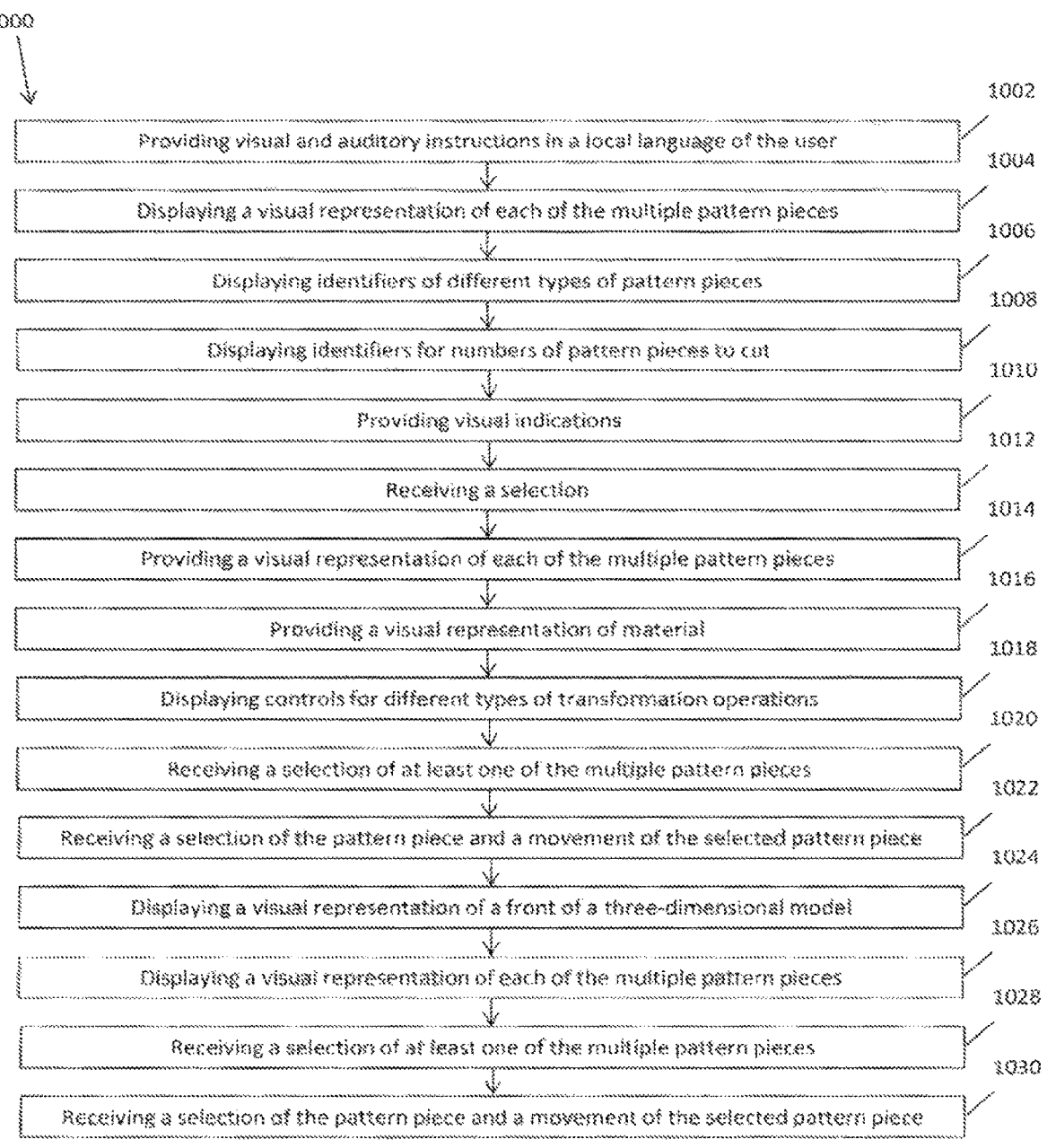
FIG. 10 schematically depicts a method for training a user to label and code digital files for three-dimensional garment design, in accordance with an exemplary embodiment.

FIG. 10 is a method 1000 for training a user to label and code digital files for three-dimensional garment design, in accordance with an exemplary embodiment. At step 1002, the method includes providing visual and auditory instructions in a local language of the user. At step 1004, the method includes displaying a visual representation of each of the multiple pattern pieces for identification of types of pattern pieces and numbers of pieces to cut. At step 1006, the method includes displaying identifiers of different types of pattern pieces, each identifier including a name of the type of pattern piece in the local language. At step 1008, the method includes displaying identifiers for numbers of pattern pieces to cut, each identifier including a name of the number of pattern pieces in the local language. For each pattern piece, at step 1010, the method includes receiving a selection of the visual representation of the pattern piece, receiving a selection of a corresponding identifier for the type of pattern piece, and providing a visual indication of whether the selection of the corresponding identifier for the type of pattern piece is correct. For each pattern piece, at step 1012, the method includes receiving a selection of a number of pattern pieces to cut and providing a visual indication of whether the selection of the number of pattern pieces to cut is correct. At step 1014, the method includes providing a visual representation of each of the multiple pattern pieces for layout for cutting with each visual representation including a grain line for the pattern piece. At step 1016, the method includes providing a visual representation of material on which to lay out the pattern pieces. At step 1018, the method includes displaying controls for different types of transformation operations. At step 1020, the method includes receiving a selection of at least one of the multiple pattern pieces, a selection of a control for a transformation operation on the selected at least one pattern piece, and displaying a visual representation of the transformation performed on the at least one pattern piece. For each of the multiple pattern pieces, at step 1022, the method includes receiving a selection of the pattern piece and a movement of the selected pattern piece onto the visual representation of the material and rendering the movement on the display. At step 1024, the method includes displaying a visual representation of a front of a three-dimensional model, and a visual representation of a back of a three-dimensional model for fitting the pattern to the model. At step 1026, the method includes displaying a visual representation of each of the multiple pattern pieces for fitting on the three-dimensional model. At step 1028, the method includes receiving a selection of at least one of the multiple pattern pieces, a selection of a control for a transformation operation on the selected at least one pattern piece, and displaying a visual representation of the transformation performed on the at least one pattern piece. For each of the multiple pattern pieces, at step 1030, the method includes receiving a selection of the pattern piece and a movement of the selected pattern piece onto the visual representation of the three-dimensional model and rendering the movement on the display.

Figure 11:
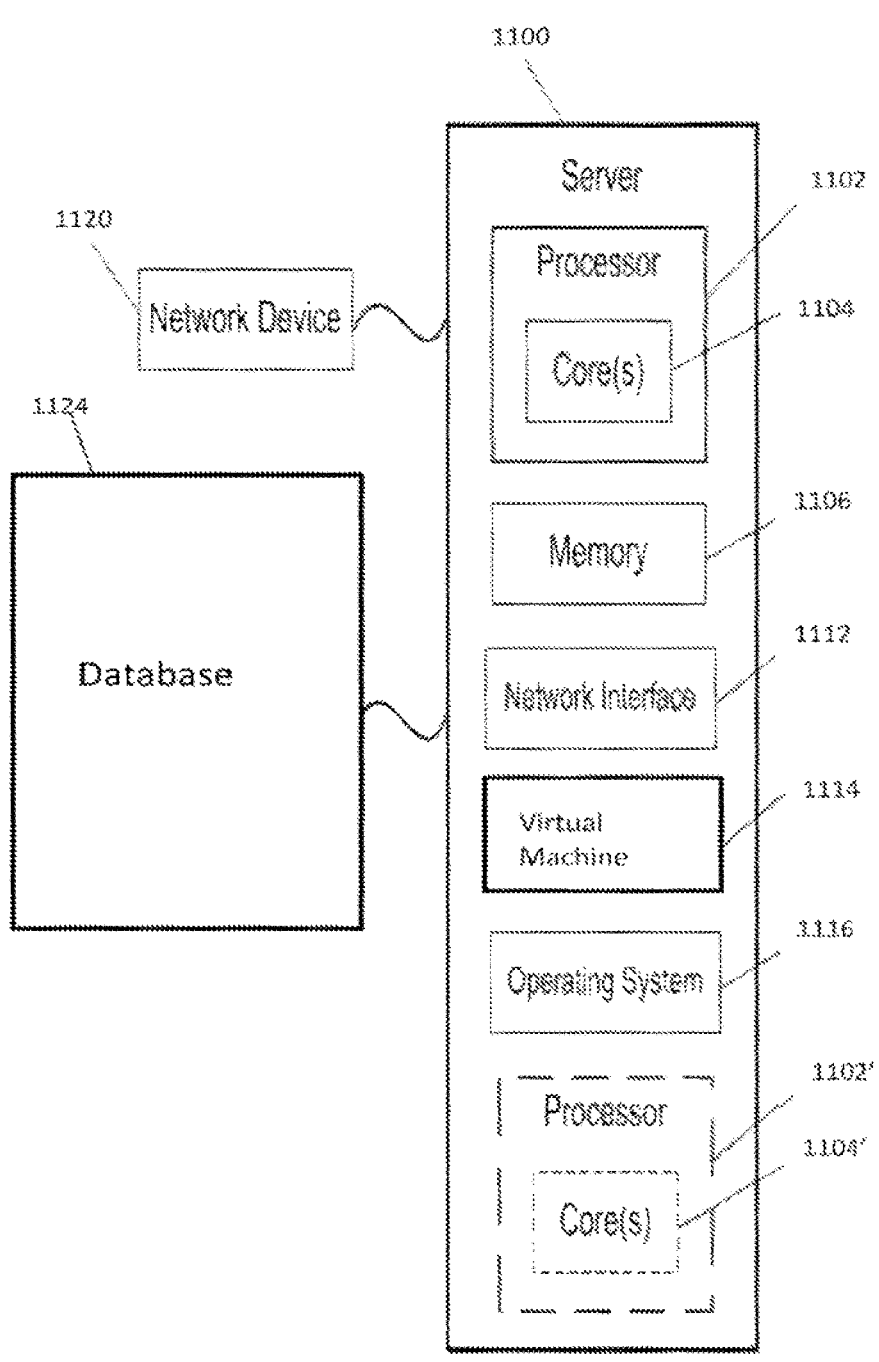
FIG. 11 is a block diagram of an example of a computing device that can be used to perform one or more steps provided by embodiments described herein.

FIG. 11 is a block diagram of an example computing device 1100 that can be used to perform one or more steps provided by embodiments described herein. In an exemplary embodiment, computing device 1100 is a computing device 104 and/or a computing device 110 shown in FIG. 1. Computing device 1100 includes one or more non-transitory computer-readable media for storing one or more computer-executable instructions or software for implementing embodiments described herein. The non-transitory computer-readable media can include, but are not limited to, one or more types of hardware memory, non-transitory tangible media (for example, one or more magnetic storage disks, one or more optical disks, one or more USB flash drives), and the like. For example, a memory 1106 included in computing device 1100 can store computer-readable and computer-executable instructions or software for implementing embodiments described herein. Computing device 1100 can also include a processor 1102 and an associated core 1104, and optionally, one or more additional processor(s) 1102' and associated core(s) 1104' (for example, in the case of computer systems having multiple processors/cores), for executing computer-readable and computer-executable instructions or software stored in memory 1106 and other programs for controlling system hardware. Processor 1102 and processor(s) 1102' can each be a single core processor or multiple core (1104 and 1104') processor. Computing device 1100 may further include an AR item generator engine.

Virtualization can be employed in computing device 1100 so that infrastructure and resources in the computing device can be shared dynamically. A virtual machine 1114 can be provided to handle a process running on multiple processors so that the process appears to be using only one computing resource rather than multiple computing resources. Multiple virtual machines can also be used with one processor.

Memory 1106 can include a computer system memory or random access memory, such as DRAM, SRAM, EDO RAM, and the like. Memory 1106 can include other types of memory as well, or combinations thereof. In some embodiments, a customer can interact with computing device 1100 through a visual display device, such as a touch screen display or computer monitor, which can display one or more customer interfaces that can be provided in accordance with embodiments. The visual display device may also display other aspects, elements and/or information or data associated with embodiments. Computing device 1100 may include other I/O devices for receiving input from a customer, for example, a keyboard or any suitable multi-point touch interface, such as a pointing device (e.g., a pen, stylus, mouse, or trackpad). The keyboard and pointing device may be coupled to visual display device. Computing device 1100 may include other suitable conventional I/O peripherals.

For example, where computing device 1100 is a mobile computing device (such as computing device 104), computing device 1100 may include a touch screen display, a camera, and a location module, and may execute an application that displays a map of the facility and displays virtual items in augmented reality.

Computing device 1100 can also include one or more storage devices 1124, such as a hard-drive, CD-ROM, or other computer-readable media, for storing data and computer-readable instructions and/or software. Exemplary storage device 1124 can also store one or more storage devices for storing any suitable information required to implement embodiments.

Computing device 1100 can include a network interface 1112 configured to interface via one or more network devices 1120 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. The network interface 1112 can include a built-in network adapter, network interface card, PCMCIA network card, card bus network adapter, wireless network adapter, USB network adapter, modem or any other device suitable for interfacing computing device 1100 to any type of network capable of communication and performing the operations described herein. Moreover, computing device 1100 can be any computer system, such as a workstation, desktop computer, server, laptop, handheld computer, tablet computer (e.g., the iPad® or Microsoft Surface® tablet computer), mobile computing or communication device (e.g., the iPhone® communication device), or other form of computing or telecommunications device that is capable of communication and that has sufficient processor power and memory capacity to perform the operations described herein.

Computing device 1100 can run any operating system 1116, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, any operating systems for mobile computing devices, or any other operating system capable of running on the computing device and performing the operations described herein. In exemplary embodiments, the operating system 1116 can be run in native mode or emulated mode. In an exemplary embodiment, the operating system 1116 can be run on one or more cloud machine instances.

In an advantageous embodiment, the present invention also relates to methods and systems that can facilitate efficient and effective hiring of new workers into manufacturing jobs aiding in growing the flexible, skilled workforce needed to reshore manufacturing. The method and systems described are made possible by a reciprocal apprenticing artificial intelligence engine that delivers adaptive training, but also captures worker inputs and feeds back a user's latent problem-solving instincts. These data points aid in the better design of user interfaces for machine controllers.

Sewn goods manufacturers have a difficult time recruiting new workforce entrants. This mobile application helps potential workers see 360 degree video of a sewing or other work station inside a garment manufacturing facility, hear the sounds of the space, watch testimonials from workers, and feel the vibration of the machine simulated through their phone.

Sewn goods skill trainers often suffer from trainees beginning their trainings and not seeing the course through to completion, wasting trainer resources, and not achieving the end goal of more fully-trained workers entering the job market.

Sewn goods skill trainers use outdated, manual methods to train new workers that rely on workers attending in-person training programs for up to 46 weeks of training to get a trainee to proficiency.

The application provides training, employment, and reminder content in multiple languages by utilizing artificial intelligence for dynamic language translation.

The application connects to employment sites and feeds in local job opportunities that match trainees' skill levels.

The application helps trainees understand wages, tax deductions, and the logistical realities of commuting to the job via partner APIs and publicly available datasets.

The application allows hired workers to indicate their commitment to attend the shift, aiding in better workforce predictions and better throughput estimates to a factory's customers.

The application enables factory hiring managers to predict how many workers will attend upcoming shifts.

The application enables factory hiring managers to vet candidates within the app and schedule interviews.

The application utilizes game interfaces to test hand-eye coordination, eyesight, and dexterity related to material handling.

The application teaches stitch identification and teaches trainees what the most common machines in a factory look like.

The application uses game mechanics to teach what kind of thread is used for various types of garments.

The application uses game mechanics to teach the difference between woven and knit fabrics.

The application uses game mechanics to teach which stitches are used for Knits: 504, 406, 401 and which are for Wovens: 301, 516 (401 & 504 combined). Users are able to ID the stitches by sight at mastery of the learning module.

The application uses game mechanics to teach stitch count and thread size selection for fabrics that impacts sewing output.

The application uses game mechanics to teach stitch quality standards and identify defects. I.e. what is a good balanced stitch vs. a bad imbalanced stitch.

The application uses game mechanics to teach machine adjustments and basic maintenance.

The application uses game mechanics to teach users what to do when a needle is damaged, causing stitch formation to be off standard.

Figure 12:
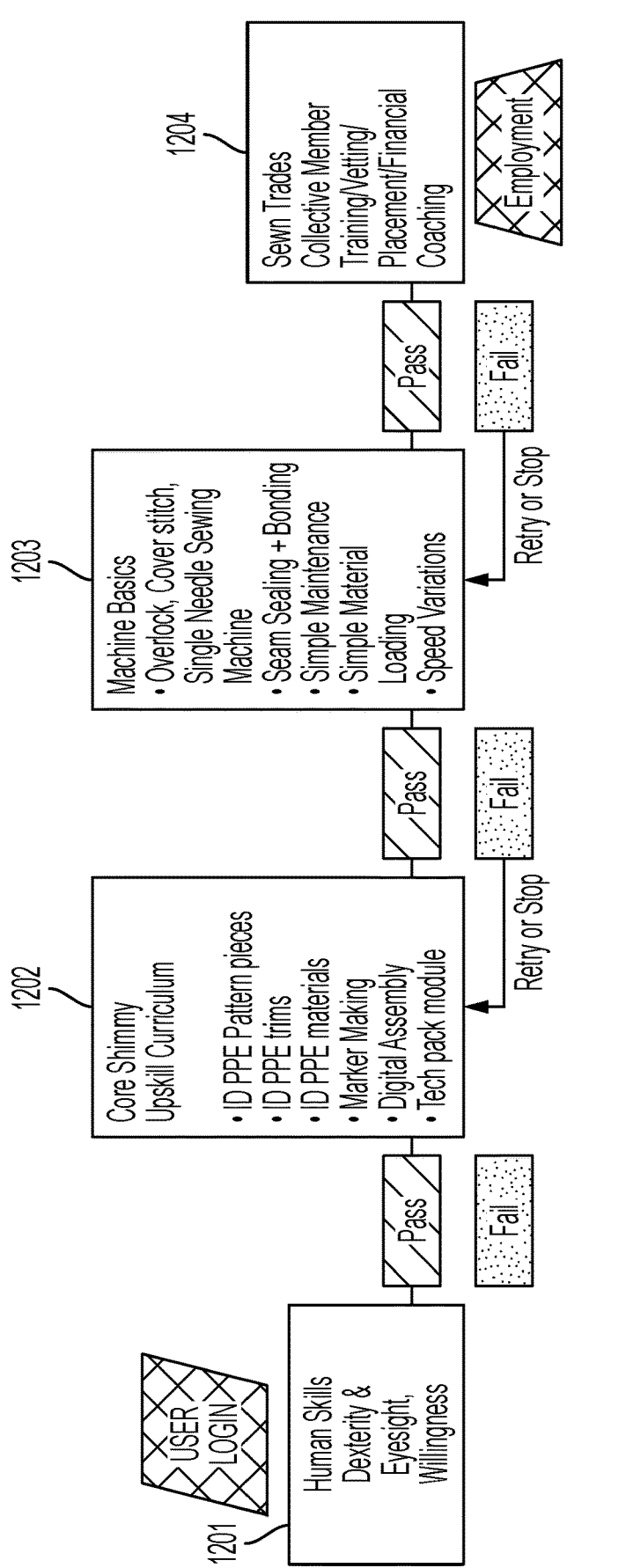
FIG. 12 illustrates the workflow of another embodiment.

FIG. 12 is a method for training a user to measure human skills 1201, provide the previously described training application (referenced as "Upskill") 1202, provide machine based training 1203 and deliver qualified trainees to in-person sewn trades practioners in training/vetting/placement financial coaching 1204 in accordance with an exemplary embodiment. Between each of 1201, 1202, 1203 and 1204, a user will either pass or fail the learning games. A "pass" enables the user to proceed to the next step and a "fail" enables the user to either retry or stop the previous step. Regardless of a "pass" or "fail" innate worker aptitude for tasks will be recorded to ensure that workers are directed towards career paths with work that aligns with their interests and abilities.

At step 1201, the application takes users through a series of questionnaires and game-based trainings that test interest, aptitude, and willingness to pursue training.

Step 1202 provides the core Shimmy Upskill curriculum which is adapted to include the design and manufacture of personal protective equipment ("PPE"), such as face masks, as a digital learning game to users. The platform 1202, for example, provides artificial intelligence to identify 2-D shapes and common fixes to patterns and sewing based on fit problems, apparel vocabulary, operation instructions in multiple languages, training modules for specific machines and CAD platforms, and certification and apprenticeship credentialing. The application utilizes a design user interface similar to apparel industry CAD systems to upskill and reskill garment workers in factories. The application addresses a significant challenge facing the apparel industry involving a lack of digital workers to make digital models. The application trains a user in apparel vocabulary and operation instructions in English and in a native language of the user, which may be referred to herein as a local language. The application further creates garment/apparel taxonomy using specific set of definitions and builds a corpus to be used in the application. The application is a game that is also a learning and work tool. The application assists users develop cognitive and technical skills with digital pattern-making, 3D digital sewing assemblies, automated equipment operation and maintenance, and other digital literacy skills. Some of the advantages of some embodiments of this application include one on one feedback delivered immediately with adaptive rewards and constructive feedback. In addition, goals (e.g., in the form of training milestones and/or work milestones) in a game environment are defined and easier to understand than interpreting the meaning inside a teacher or manager's verbal directive. Upskill also provides the user with the opportunity to work in groups and create collective intelligence across geographies and cultural divides.

Step 1203 provides machine basics. As users complete active learning games such as sewing, the application capture users' decisions and collects a dataset for training future sewing equipment and robotics mental models. The application utilizes game interfaces to test hand-eye coordination, eyesight, and dexterity related to material handling. The application teaches stitch identification and teaches trainees what the most common machines in a factory look like. The application uses game mechanics to teach what kind of thread is used for various types of garments. The application uses game mechanics to teach the difference between woven and knit fabrics. The application uses game mechanics to teach which stitches are used for Knits: 504, 406, 401 and which are for Wovens: 301, 516 (401 & 504 combined). Users are able to identify the stitches by sight at mastery of the learning module. The application uses game mechanics to teach stitch count and thread size selection for fabrics that impacts sewing output. The application uses game mechanics to teach stitch quality standards and identify defects, such as what is a good balanced stitch vs. a bad imbalanced stitch. The application uses game mechanics to teach machine adjustments and basic maintenance. The application uses game mechanics to teach users what to do when a needle is damaged, causing stitch formation to be off standard.

Step 1204 provides sewn trades workforce participants training/vetting/placement financial coaching. The application connects to employment sites, in-person training, and feeds in local job opportunities that match trainees' skill levels. The application helps trainees understand wages, tax deductions, and the logistical realities of commuting to the job. The application allows hired workers to indicate their commitment to attend the shift, aiding in better workforce predictions and better throughput estimates to a factory's customers. The application enables factory hiring managers to predict how many workers will attend upcoming shifts. The application enables factory hiring managers to vet candidates within the app and schedule interviews.

Figure 13:
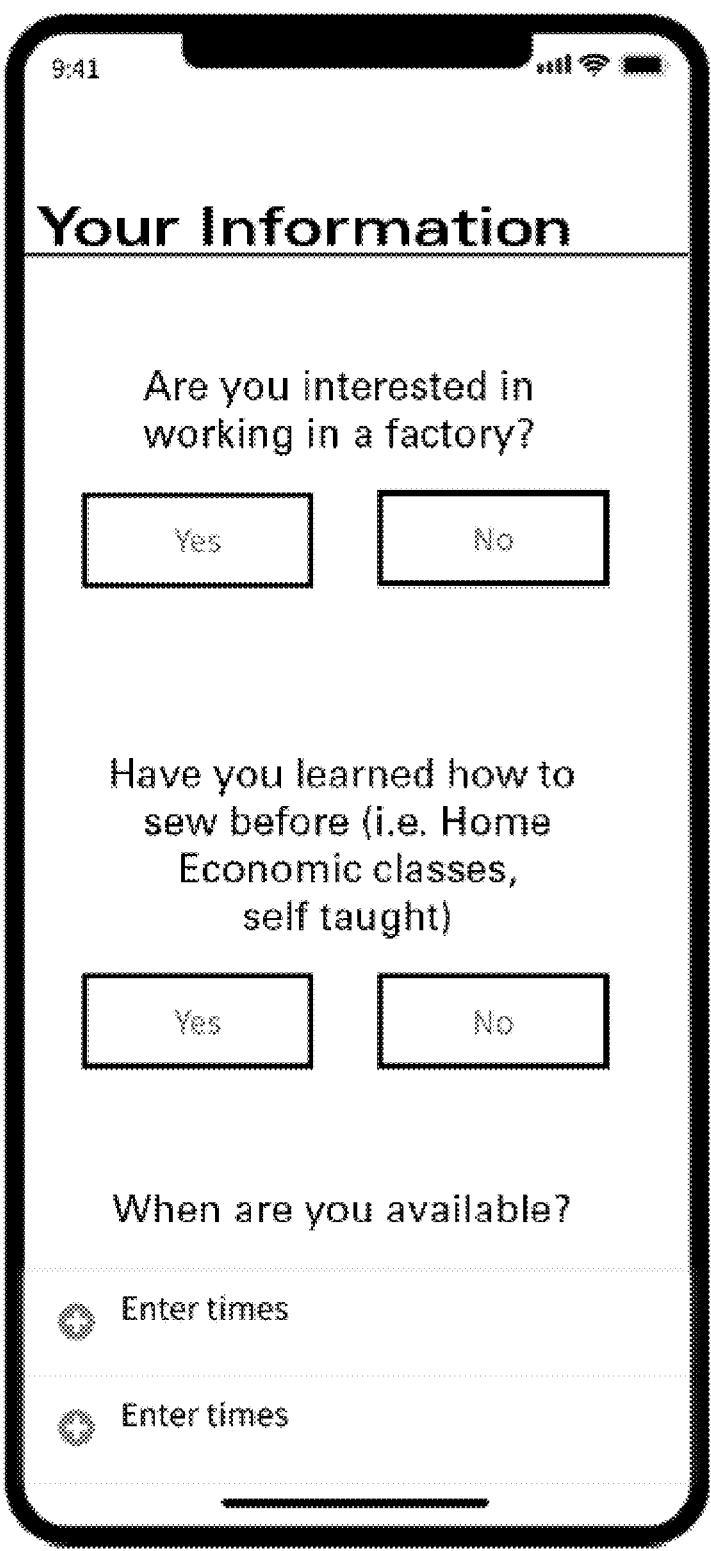
FIG. 13 provide a method for vetting candidates.

FIG. 13 provide a method for vetting candidates. FIG. 13 illustrates a screen shot of a user interface for asking users if they are interested in working in a factor, if they learned how to sew and to provide times in which a user is available to work.

Figure 14A:
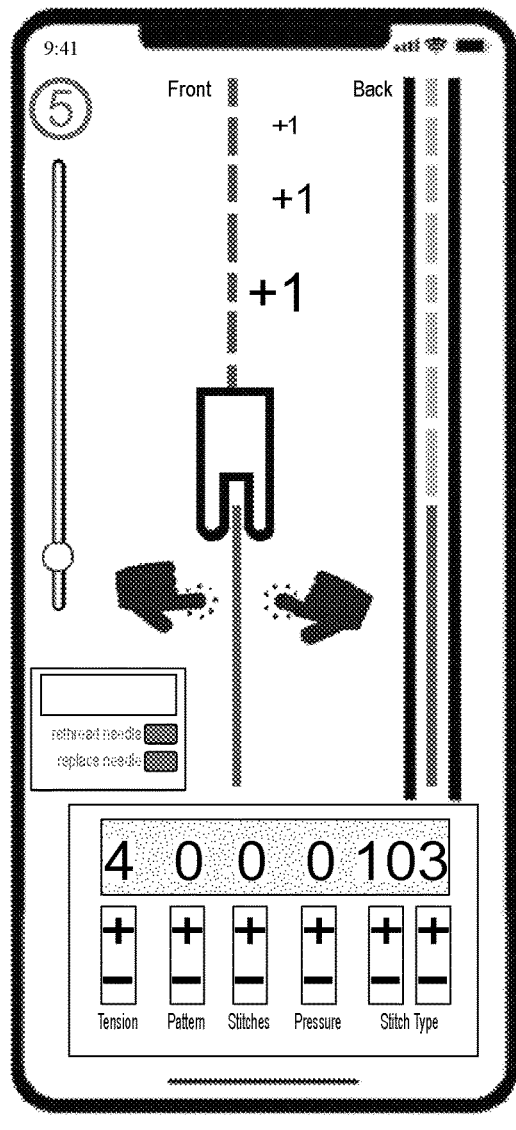
FIG. 14A provides a method for training hand eye coordination, stitch balancing, stitch quality, signs of needle damage.

FIG. 14A provides a method for training hand eye coordination, stitch balancing, stitch quality, signs of needle damage.

Figure 14B:
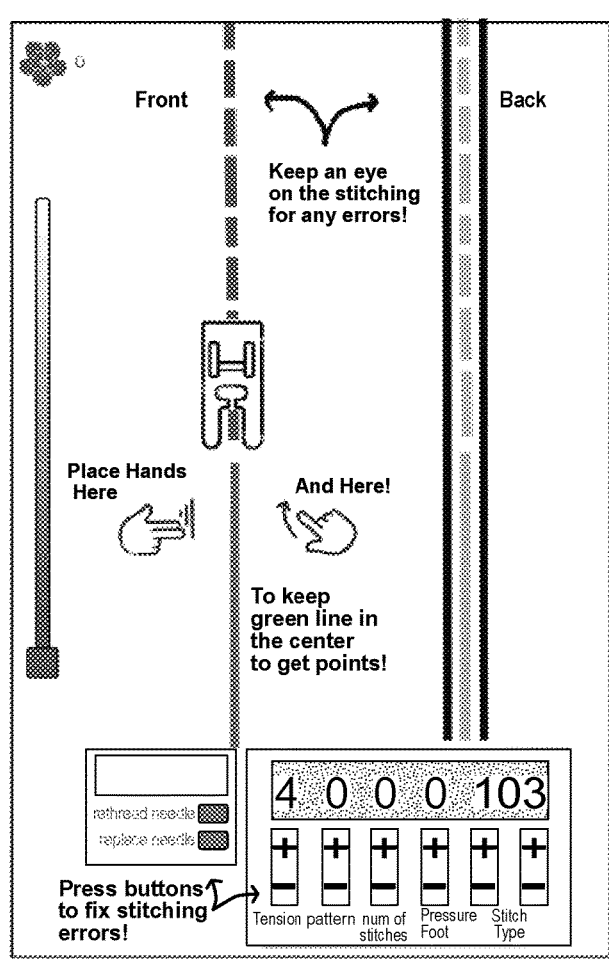
FIG. 14B provides a method for training hand eye coordination, stitch balancing, stitch quality, signs of needle damage related to game point accrual.

FIG. 14B illustrates a screen shot for a method for training hand eye coordination, stitch balancing, stitch quality, signs of needle damage related to game point accrual.

Figure 14C:
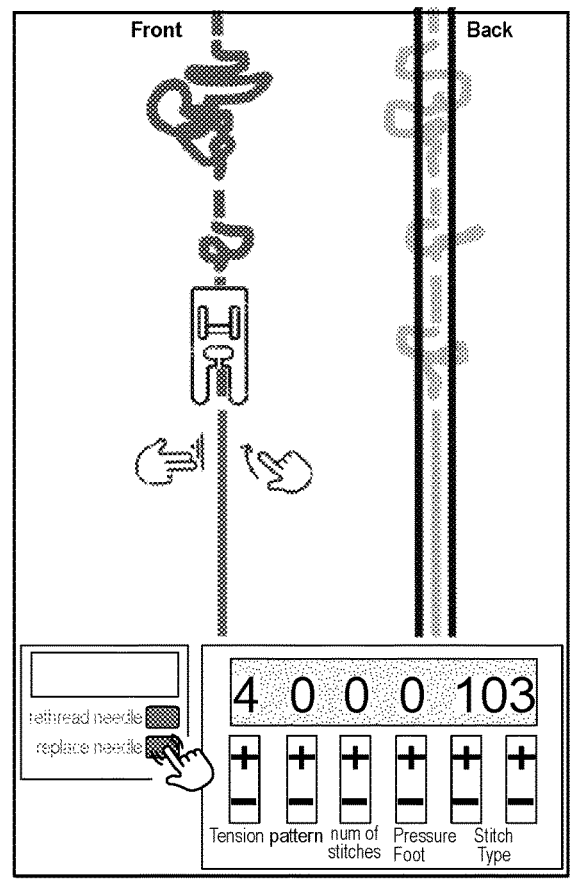
FIG. 14C provides a method for training identification of sewing needle damage and repair related to game point accrual.

FIG. 14C provides a method for training identification of sewing needle damage and repair related to game point accrual.

Figure 14D:
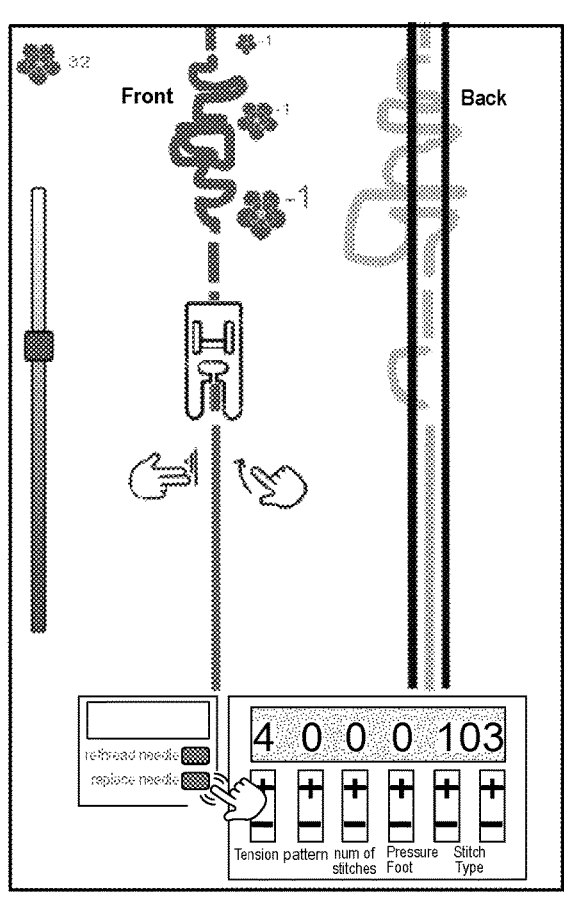
FIG. 14D provides a method for training identification of sewing needle damage and repair related to game point accrual.

FIG. 14D provides a method for training identification of sewing needle damage and repair related to game point accrual.

Figure 14E:
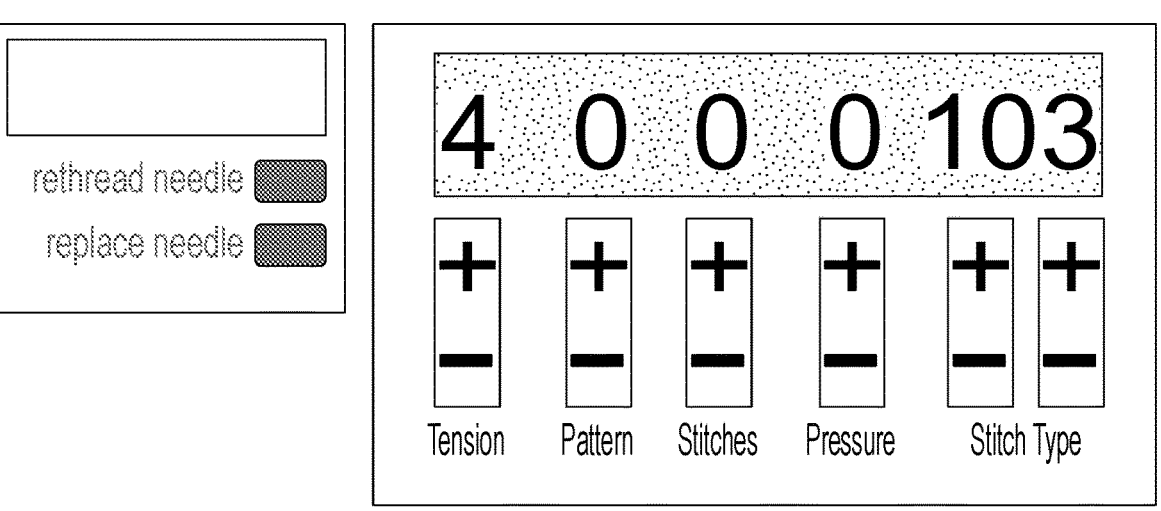
FIG. 14E provides a close-up on control panel interface to change factors and improve sewing output.

FIG. 14E provides a close-up on control panel interface to change factors and improve sewing output.

Figure 15:
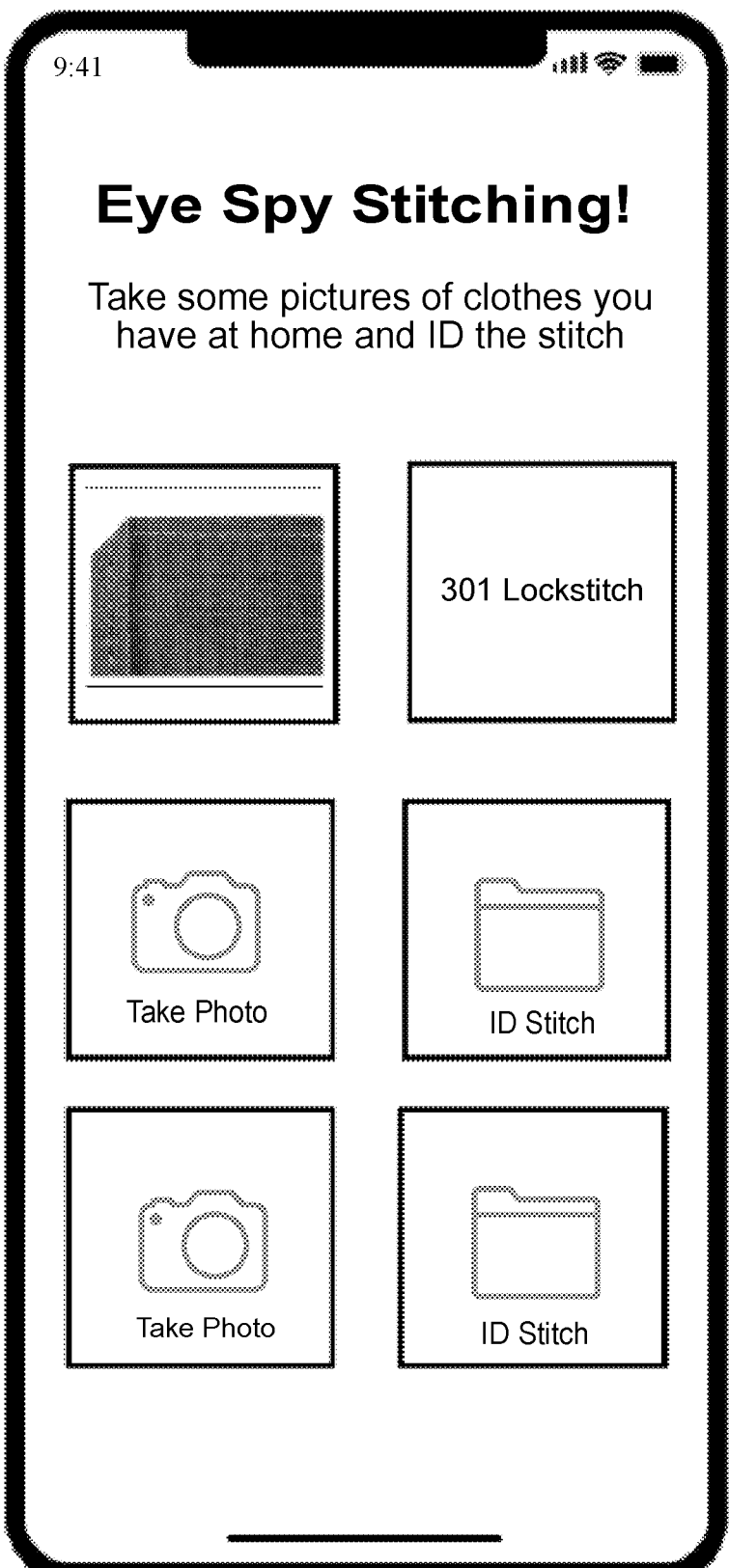
FIG. 15 provides a method for teaching remote players sewing stitch identification.

FIG. 15 provides a screen shot for a method for teaching remote players sewing stitch identification.

Figure 16A:
FIG. 16A provides a method for quantifying skill accrual and scheduling in-person machine-based training.

FIG. 16A provides a screen shot for provides a method for quantifying skill accrual and scheduling in-person machine-based training.

Figure 16B:
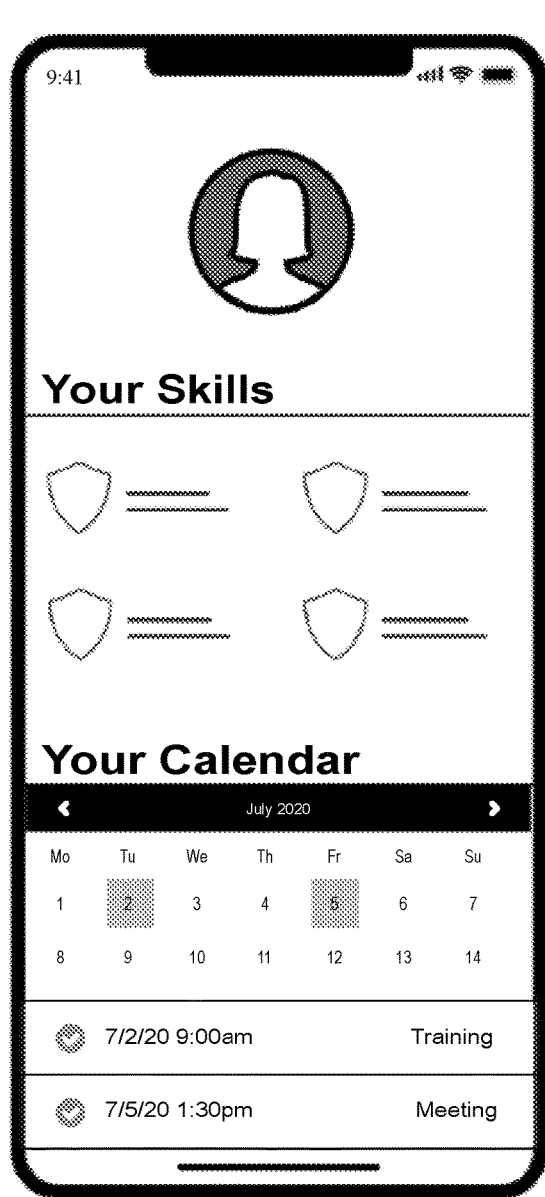
FIG. 16B provides a method for quantifying skill accrual, planning in-person machine based training and job interviews.

FIG. 16B provides a screen shot for provides a method for quantifying skill accrual, planning in-person machine based training and job interviews.

Figure 16C:
FIG. 16C provides a method for planning work events, notifying workers of open positions, and incentives for training.

FIG. 16C provides a screen shot for a method for planning work events, notifying workers of open positions, and incentives for training.

Figure 16D:
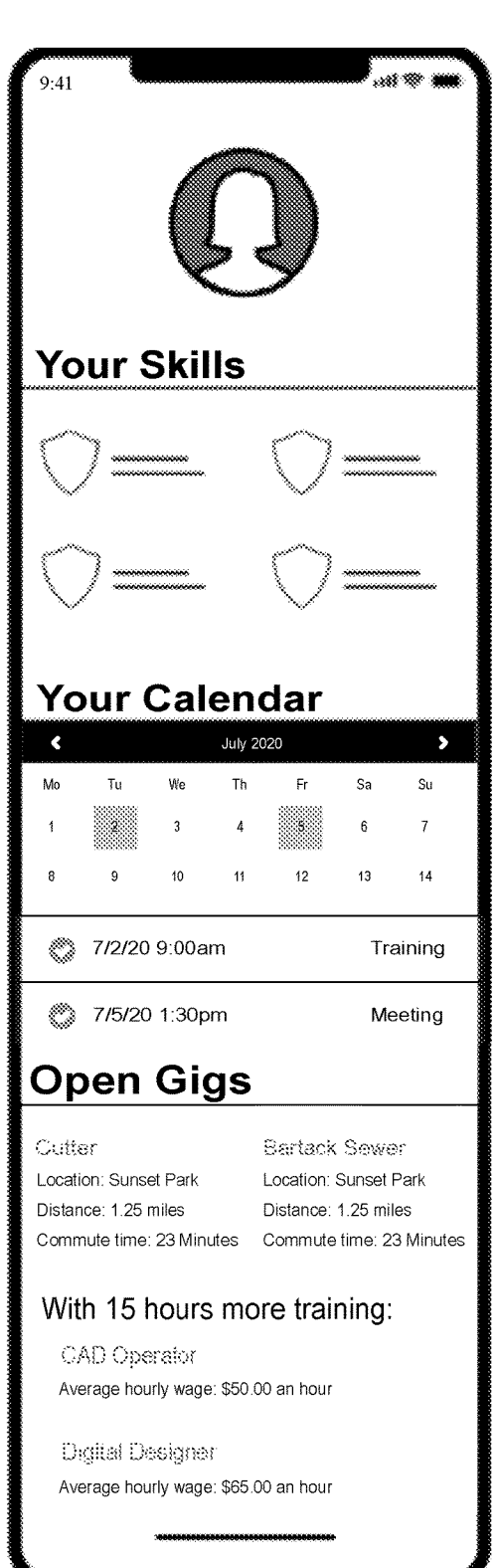
FIG. 16D shows the feature set of FIG. 16C as a scrolling, mobile interface.

FIG. 16D provides a screen shot for shows the feature set of FIG. 16C as a scrolling, mobile interface.

Figure 17C:
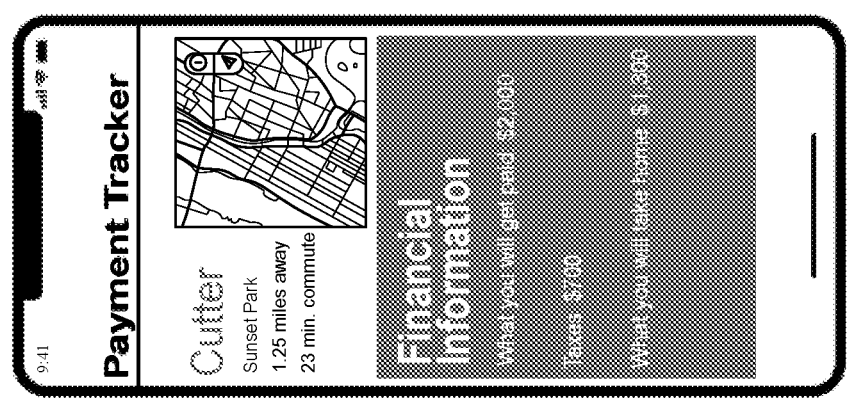
FIG. 17C provides an example of method for reminding trainee of shift brokered through the app and recording intent to come to work in non-English language.
Figure 17B:
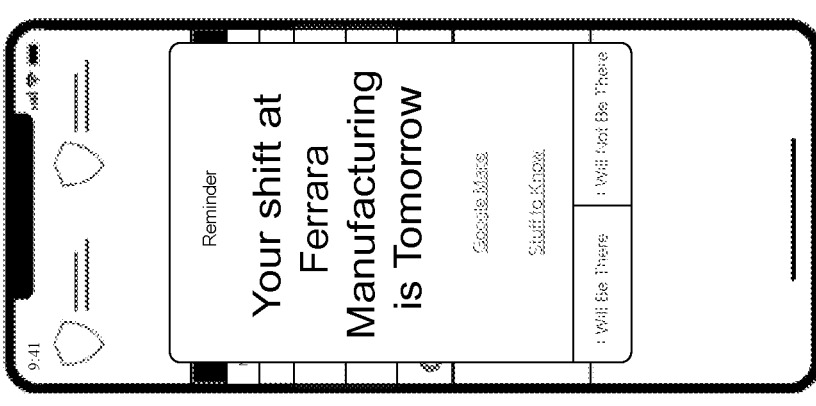
FIG. 17B provides a method for reminding trainee of shift brokered through the app and recording intent to come to work.
Figure 17A:
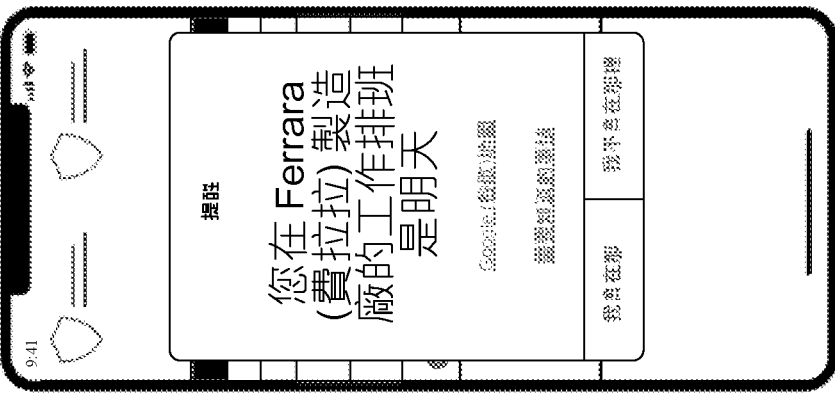
FIG. 17A provides a method for quantifying expected payment information and local tax deduction calculations.

FIG. 17A provides a screen shot for a method for quantifying expected payment information and local tax deduction calculations.

FIG. 17B provides a screen shot for a method for reminding trainee of shift brokered through the app and recording intent to come to work.

FIG. 17C provides a screen shot for an example of method for reminding trainee of shift brokered through the app and recording intent to come to work in non-English language.

Figure 18:
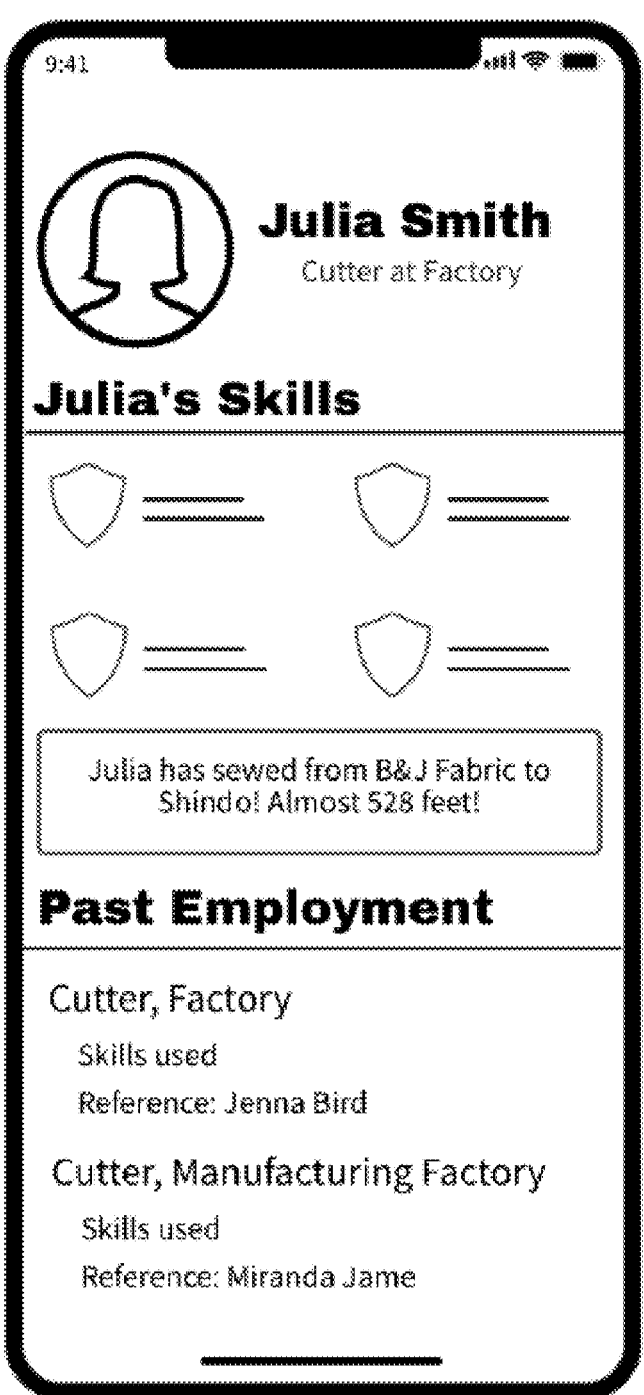
FIG. 18 provides a method for quantifying worker skills and experience for potential employers.

FIG. 18 provides a screen shot for a method for quantifying worker skills and experience for potential employers.

Figure 19A:
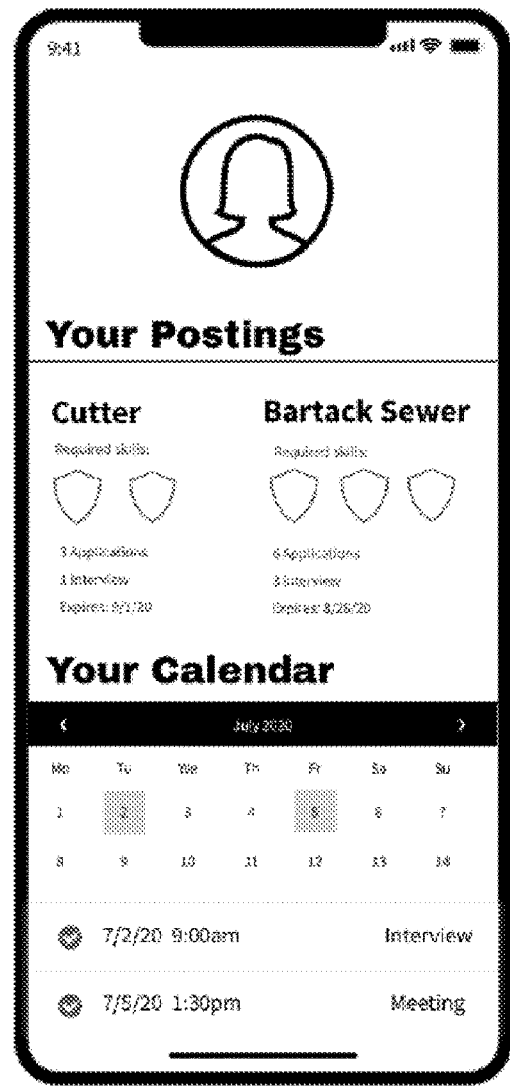
FIG. 19A provides a method for factory hiring manager to post, manage, and recruit for open jobs.

FIG. 19A provides a screen shot for a method for factory hiring manager to post, manage, and recruit for open jobs.

Figure 19B:
FIG. 19B provides a method for factory production worker planning and job posting management.

FIG. 19B provides a screen shot for a method for factory production worker planning and job posting management.

Figure 20:
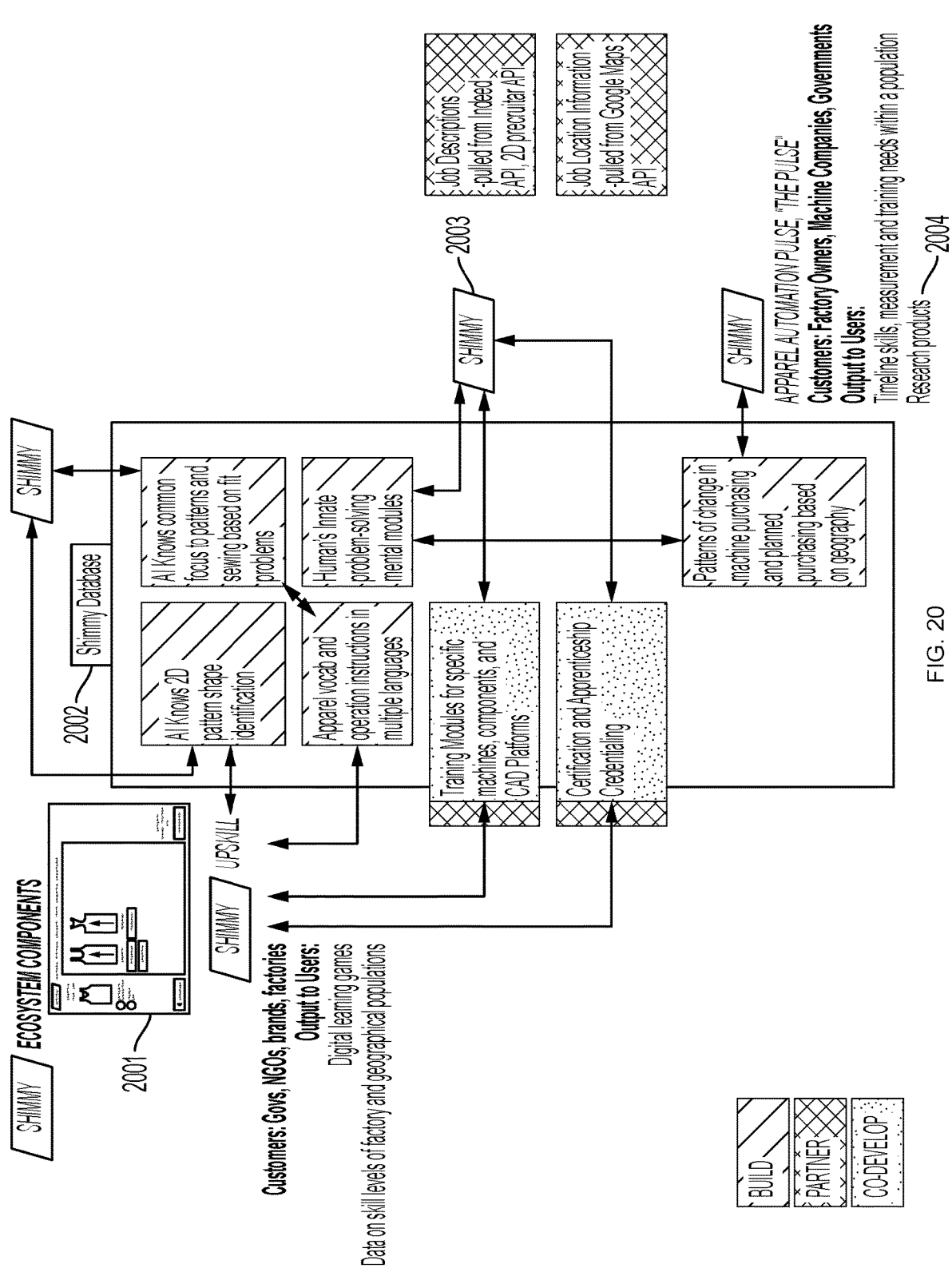
FIG. 20 provides an ecosystem map and the relationship between the embodiment set forth in FIGS. 12-19 and the other applications within the Shimmy product portfolio.

FIG. 20 provides an ecosystem map and the relationship between the embodiment set forth in FIGS. 12-19 and the other applications within the Shimmy product portfolio.

In particular, FIG. 20 illustrates a high level overview of the adaptive apparel design and apparel information system, in accordance with an exemplary embodiment. The application 2001 further described in FIGS. 6A-6F (also referenced as "Shimmy Upskill") provides a digital learning game to users. Application 2001 communicates with a central computing platform 2002 (also referenced as "Shimmy Platform" and/or the adaptive apparel design computing device 110). The platform 2002, for example, provides artificial intelligence to identify 2-D shapes and common fixes to patterns and sewing based on fit problems, apparel vocabulary, operation instructions in multiple languages, training modules for specific machines and CAD platforms, and certification and apprenticeship credentialing. Platform 2002 also includes a user's innate problem solving mental models and rates of change in machine purchasing and planned purchasing based on geography (in addition to platform 306). Platform 2003 includes an exemplary embodiment set forth in FIGS. 12-19 that includes job descriptions and job location information. Platform 2004 includes an apparel automation customers: factory owners, machine companies, governments output to users: baseline skills assessment and training needs within a population and research products.

The description herein is presented to enable any person skilled in the art to create and use a computer system configuration and related method and systems for generating virtual items within a facility. Various modifications to the example embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention may be practiced without the use of these specific details. In other instances, well-known structures and processes are shown in block diagram form in order not to obscure the description of the invention with unnecessary detail. Thus, the present disclosure is not intended to be limited to the embodiments shown, but is to be accorded the widest scope consistent with the principles and features disclosed herein.

In describing embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a multiple system elements, device components or method steps, those elements, components or steps can be replaced with a single element, component or step. Likewise, a single element, component or step can be replaced with multiple elements, components or steps that serve the same purpose. Moreover, while embodiments have been shown and described with references to particular embodiments thereof, those of ordinary skill in the art will understand that various substitutions and alterations in form and detail can be made therein without departing from the scope of the invention. Further still, other aspects, functions and advantages are also within the scope of the invention.

Exemplary flowcharts are provided herein for illustrative purposes and are non-limiting examples of methods. One of ordinary skill in the art will recognize that exemplary methods can include more or fewer steps than those illustrated in the exemplary flowcharts, and that the steps in the exemplary flowcharts can be performed in a different order than the order shown in the illustrative flowcharts.

Although the present invention and its advantages have been described in detail, it should be understood that various changes, substitutions and alterations can be made herein without departing from the spirit and scope of the invention as defined in the appended claims.

The present invention will be further illustrated in the following Examples which are given for illustration purposes only and are not intended to limit the invention in any way.

Having thus described in detail preferred embodiments of the present invention, it is to be understood that the invention defined by the above paragraphs is not to be limited to particular details set forth in the above description as many apparent variations thereof are possible without departing from the spirit or scope of the present invention.

What is claimed is:

1. A system for implementing a machine learning (ML)-based method for training a user to label, code, and generate digital three-dimensional garment files for measuring skills, three-dimensional garment design and three-dimensional model utilization, machine basics, maintenance and finding employment, the system comprising:

(a) a computing device comprising:

(i) a processor and a ML engine configured to analyze, optimize, and adaptively refine user training processes based on historical and real-time user interaction data to facilitate an adaptive refinement of user training processes; and (ii) a data storage unit communicatively coupled to the processor, the data storage unit storing:

(1) at least one digital file including a pattern having multiple pattern pieces;

(2) user interaction and training data, wherein the ML engine is configured to process said user interaction and training data, including recorded user progress and error information patterns, to facilitate a dynamic refinement of a training process presented to the user; and (3) ML models and natural language processing (NLP) data, wherein said ML models are trained to analyze user input, assess user performance, predict errors, and refine garment-related language processing;

(b) a user interface implemented through the computing device, the user interface configured to provide visual and auditory instructions in a local language of the user for each module in a plurality of learning modules; and (c) non-transitory computer executable instructions that when executed by the processor implement a sequence of learning modules, wherein user progression through a configuration of each module is dynamically adjusted by ML processing of the user's demonstrated proficiency in each of the learning modules, the learning modules including a setup for cutting module that:

(i) measures human skills comprising a series of questionnaires and game-based trainings that test interest, aptitude, and willingness to pursue training, wherein results of the questionnaires and game-based trainings provide a baseline dataset of user interaction and training data for processing by the ML engine;

(ii) displays a visual representation of each of the multiple pattern pieces for identification of types of pattern pieces and numbers of pieces to cut;

(iii) displays identifiers of different types of pattern pieces, each identifier including a name of the type of pattern piece in the local language;

(iv) displays identifiers for numbers of pattern pieces to cut, each identifier including a name of the number of pattern pieces in the local language;

(v) for each pattern piece, receives a selection of the visual representation of the pattern piece, receives a selection of a corresponding identifier for the type of pattern piece, and provides a visual indication of whether the selection of the corresponding identifier for the type of pattern piece is correct, wherein user selections are verified with assistance from ML-based pattern recognition models;

(vi) for each pattern piece, receives a selection of a number of pattern pieces to cut and provides a visual indication of whether the selection of the number of pattern pieces to cut is correct;

(vii) provides active learning games that capture decisions and collects a dataset for training future sewing equipment and robotics mental models, wherein the collected dataset is processed by the ML engine to dynamically refine the training process; and (viii) provides trainees collective member training/vetting/placement financial coaching via partner application programming interfaces (APIs) and publicly available datasets, wherein the providing is based on the user's demonstrated proficiency as determined by the ML engine.

2. The system of claim 1, further comprising computer executable instructions that when executed by the processor implement a creation of markers for layout module that:

(a) provides a visual representation of each of the multiple pattern pieces for layout for cutting with each visual representation including a grain line for the pattern piece, wherein the layout is provided with ML-driven optimization models that assess fabric efficiency and provide real-time recommendations for reducing material waste;

(b) provides a visual representation of material on which to lay out the pattern pieces;

(c) displays controls for different types of transformation operations;

(d) receives a selection of at least one of the multiple pattern pieces, a selection of a control for a transformation operation on the selected at least one pattern piece, and displays a visual representation of the transformation performed on the at least one pattern piece; and (e) for each of the multiple pattern pieces, receives a selection of the pattern piece and a movement of the selected pattern piece onto the visual representation of the material and rendering the movement and positioning of the selected pattern piece on a display of the user interface, and provides ML-driven real-time validation feedback indicating incorrect pattern selections and suggesting alternative pattern arrangements derived from learned user behaviors.

3. The system of claim 2, further comprising computer executable instructions that when executed by the processor implements a digital assembly module that:

(a) displays a visual representation of a front side of a three-dimensional model, and a visual representation of a back side of a three-dimensional model for fitting the pattern to the model, wherein the three-dimensional model is displayed with ML-assisted alignment guides generated by ML processing of common user error patterns;

(b) displays a visual representation of each of the multiple pattern pieces for fitting on the three dimensional model;

(c) receives a selection of at least one of the multiple pattern pieces, a selection of a control for a transformation operation on the selected at least one pattern piece, and displays a visual representation of the transformation performed on the at least one pattern piece; and (d) for each of the multiple pattern pieces, receives a selection of the pattern piece and a movement of the selected pattern piece onto one of the visual representations of the three-dimensional model and rendering the movement and positioning of the selected pattern piece on the display of the user interface, wherein placement accuracy is analyzed and validated by comparing user placement to stored garment construction data using ML-based computer processing algorithms trained on garment construction.

4. The system of claim 1, further comprising computer executable instructions that when executed by the processor implement a pattern piece identification module that:

(a) displays examples of different types of pattern pieces each labeled with the type of pattern piece in the local language;

(b) for each example pattern piece, prompts the user to speak the name of the type of example pattern piece in the local language, and records the spoken name of the type of example pattern piece; and (c) provides data representative of the spoken name of the example pattern piece along and an identification of the type of example pattern piece to a natural language processing system to improve natural language processing of garment-related language in the user's local language with the user's dialect, wherein the NLP system is an ML-trained NLP system that refines terminology recognition by correlating user dialect variations with stored garment terminology.

5. The system of claim 4, wherein the pattern piece identification module further:

displays a visual representation of each of the multiple pattern pieces for identification of the pattern pieces;

displays identifiers of different types of pattern pieces, each identifier including a name of the type of pattern piece in the local language; and for each pattern piece, receives a selection of the visual representation of the pattern piece, receives a selection of a corresponding identifier for the type of pattern piece, and provides a visual indication of whether the selection of the corresponding identifier for the type of pattern piece is correct.

6. The system of claim 2, wherein the display of controls for different types of transformation operations includes display of schematic depictions of the transformation operations.

7. The system of claim 1, wherein the display of identifiers of different types of pattern pieces and the display of the one or more identifiers for numbers of pattern pieces to cut is in response to receiving the selection of the visual representation of the pattern piece.

8. The system of claim 2, wherein the display of controls for different types of transformation operations is in response to the selection of at least one of the multiple pattern pieces.

9. The system of claim 2, wherein the transformation operations include rotate, reflect, and copy.

10. The system of claim 1, further comprising computer executable instructions that when executed by the one or more processors cause the user interface to:

display a login interface to the user; and receive information regarding a username and a password from the user.

11. The system of claim 1, further comprising computer executable instructions that when executed by the one or more processors cause the system to access information regarding a mobile address of the computing device and store the accessed information regarding the mobile address and information associating the mobile address with a user.

12. The system of claim 1, further comprising computer executable instructions that when executed by the one or more processors cause the system to store information regarding the users' completion of each module associated with information identifying the user.

13. The system of claim 3, further comprising computer executable instructions that, when executed by the one or more processors, cause the system to record information regarding correct and incorrect selections by the user, regarding correct and incorrect positioning of pattern pieces on the visual representation of the material, regarding correct and incorrect movements of pattern pieces onto the visual representation of the material, and/or regarding correct and incorrect movements of pattern pieces onto the visual representations of the three-dimensional model.

14. The system of claim 1, further comprising computer executable instructions that, when executed by the one or more processors, cause the system to transmit information to the user via the computing device after completion of one or more modules.

15. The system of claim 14, wherein the information transmitted is based, at least in part, on one or more scores of the user's performance during one or more of the learning modules.

16. The system of claim 1, further comprising computer executable instructions that, when executed by the one or more processors, cause the user interface to display graphical indicators of successful completion of one or more modules within a training session and during one or more prior training sessions.

17. The system of claim 1, wherein the user interface is implemented and the plurality of learning modules are implemented as a web-based application on the computing device that is hosted by a remote server.

18. The system of claim 1, wherein the computing device comprises a touch screen and at least some of the user selections are received via a touch screen interface of the computing device.

19. A method for training a user to label and code digital files for three-dimensional garment design, the method comprising:

(a) analyzing, by a machine learning (ML) engine, historical and real-time user interaction data to adaptively refine a training process;

(b) providing visual and auditory instructions in a local language of the user on a computing device;

(c) displaying a visual representation of each of the multiple pattern pieces for identification of types of pattern pieces and numbers of pieces to cut;

(d) displaying identifiers of different types of pattern pieces, each identifier including a name of the type of pattern piece in the local language;

(e) displaying identifiers for numbers of pattern pieces to cut, each identifier including a name of the number of pattern pieces in the local language;

(f) for each pattern piece, receiving a selection of the visual representation of the pattern piece, receiving a selection of a corresponding identifier for the type of pattern piece, and providing a visual indication of whether the selection of the corresponding identifier for the type of pattern piece is correct;

(g) for each pattern piece, receiving a selection of a number of pattern pieces to cut and providing a visual indication of whether the selection of the number of pattern pieces to cut is correct; and (h) dynamically adjusting, by the ML engine, a difficulty level of subsequent visual and auditory instructions based on an analysis of correct and incorrect selections received from the user.

20. The method of claim 19, further comprising:

(a) providing a visual representation of each of the multiple pattern pieces for layout for cutting with each visual representation including a grain line for the pattern piece, wherein the layout is provided with ML-driven optimization models that assess fabric efficiency and provide real-time recommendations for reducing material waste;

(b) providing a visual representation of material on which to lay out the pattern pieces;

(c) displaying controls for different types of transformation operations;

(d) receiving a selection of at least one of the multiple pattern pieces, a selection of a control for a transformation operation on the selected at least one pattern piece, and displaying a visual representation of the transformation performed on the at least one pattern piece; and (e) for each of the multiple pattern pieces, receiving a selection of the pattern piece and a movement of the selected pattern piece onto the visual representation of the material and rendering the movement on a display of the computing device, and providing ML-driven real-time validation feedback indicating incorrect pattern selections and suggesting alternative pattern arrangements derived from learned user behaviors.

21. The method of claim 20, further comprising:

(a) displaying a visual representation of a front of a three-dimensional model and a visual representation of a back of a three-dimensional model for fitting the pattern to the model, wherein the three-dimensional model is displayed with ML-assisted alignment guides generated by ML processing of common user error patterns;

(b) displaying a visual representation of each of the multiple pattern pieces for fitting on the three-dimensional model;

(c) receiving a selection of at least one of the multiple pattern pieces, a selection of a control for a transformation operation on the selected at least one pattern piece, and displaying a visual representation of the transformation performed on the at least one pattern piece; and (d) for each of the multiple pattern pieces, receiving a selection of the pattern piece and a movement of the selected pattern piece onto the visual representation of the material and rendering the movement on a display of the computing device, wherein placement accuracy is analyzed and validated by comparing user placement to stored garment construction data using ML-based computer processing algorithms trained on garment construction.

22. The method of claim 19, further comprising:

(a) displaying examples of different types of pattern pieces each labeled with the type of pattern piece in the local language;

(b) for each example pattern piece, prompting the user to speak the name of the type of example pattern piece in the local language, and recording the spoken name of the type of example pattern piece; and (c) providing data representative of the spoken name of the example pattern piece along and an identification of the type of example pattern piece to a natural language processing system to improve natural language processing of garment-related language in the user's local language with the user's dialect, wherein the NLP system is an ML-trained NLP system that refines terminology recognition by correlating user dialect variations with stored garment terminology.

23. The method of claim 19, further comprising:

displaying a visual representation of each of the multiple pattern pieces for identification of the pattern pieces;

displaying identifiers of different types of pattern pieces, each identifier including a name of the type of pattern piece in the local language; and for each pattern piece, receiving a selection of the visual representation of the pattern piece, receiving a selection of a corresponding identifier for the type of pattern piece, and providing a visual indication of whether the selection of the corresponding identifier for the type of pattern piece is correct.

24. The method of claim 20, wherein displaying controls for different types of transformation operations includes displaying schematic depictions of the transformation operations.

25. The method of claim 19, wherein the displaying of identifiers of different types of pattern pieces and the displaying of the one or more identifiers for numbers of pattern pieces to cut is in response to receiving the selection of the visual representation of the pattern piece.

26. The method of claim 20, wherein the displaying of controls for different types of transformation operations is in response to the selection of at least one of the multiple pattern pieces.

27. The method of claim 20, wherein the transformation operations include rotate, reflect, and copy.

28. The method of claim 19, further comprising:

displaying a login interface to the user; and receiving information regarding a username and a password from the user.

29. The method of claim 19, further comprising accessing information regarding a mobile address of the computing device and storing the accessed information regarding the mobile address and information associating the mobile address with a user.

30. The method of claim 19, further comprising storing information regarding the users' completion of each module associated with information identifying the user.

31. The method of claim 30, further comprising recording information regarding correct and incorrect selections by the user, regarding correct and incorrect positioning of pattern pieces on the visual representation of the material, regarding correct and incorrect movements of pattern pieces onto the visual representation of the material, and/or regarding correct and incorrect movements of pattern pieces onto the visual representations of the three-dimensional model.

32. The method of claim 19, further comprising transmitting information to the user via the computing device after completion of one or more modules.

33. The method of claim 32, wherein the information transmitted is based, at least in part, on one or more scores of the user's performance during one or more of the learning modules.

34. The method of claim 19, further comprising providing graphical indicators of successful completion of one or more modules within a training session and during one or more prior training sessions.

35. The method of claim 19, wherein the method is implemented as a web-based application on the computing device that is hosted by a remote server.

36. The method of claim 19, wherein at least some of the user selections are received via a touch screen interface of the computing device.

37. The method of claim 19, further comprising:

providing financial coaching for the sewn goods workforce, wherein said coaching is related to vetting and placement and enables factory hiring managers to vet candidates within the app and schedule interviews, and wherein the providing of said coaching is based on the user's demonstrated proficiency as determined by the ML engine.

38. The method of claim 37, wherein the active learning sewing game tests sewing skills.

39. The method of claim 38, wherein the active learning sewing game utilizes game interfaces to test hand-eye coordination, eyesight, and dexterity related to material handling.

40. The method of claim 39, wherein the active learning sewing game teaches stitch identification and teaches trainees what the most common machines in a factory look like.

41. The method of claim 40, wherein the active learning sewing game application uses game mechanics to teach what kind of thread is used for various types of garments.

42. The method of claim 41, wherein the stitches are used for Knits: 504, 406, 401 and which are for Wovens: 301, 516 (401 & 504 combined).

43. The method of claim 42, wherein users are able to identify the stitches by sight at mastery of the learning module in the active learning sewing game application.

44. The method of claim 43, wherein the active learning sewing game application uses game mechanics to teach stitch count and thread size selection for fabrics that impacts sewing output.

45. The method of claim 44, wherein the active learning sewing game application uses game mechanics to teach stitch quality standards and identify defects.

46. The method of claim 45, wherein the stitch quality standards is to identify what is a good balanced stitch versus a bad imbalanced stitch.

47. The method of claim 46, wherein the active learning sewing game application uses game mechanics to teach users what to do when a needle is damaged, causing stitch formation to be off standard.

48. The method of claim 47, wherein the sewn trades collective member training/vetting/placement financial coaching connects to employment sites and feeds in local job opportunities that match trainees' skill levels.

49. The method of claim 48, wherein the sewn trades collective member training/vetting/placement financial coaching helps trainees understand wages, tax deductions, and the logistical realities of commuting to the job.

50. The method of claim 49, wherein the sewn trades collective member training/vetting/placement financial coaching allows hired workers to indicate their commitment to attend the shift, aiding in better workforce predictions and better throughput estimates to a factory's customers.

51. The method of claim 50, wherein the sewn goods workforce practitioner/vetting/placement financial coaching enables factory hiring managers to predict how many workers will attend upcoming shifts.

52. The method of claim 51, wherein the sewn goods workforce practitioner/vetting/placement financial coaching enables factory hiring managers to vet candidates within the app and schedule interviews.

\* \* \* \* \*